(12) United States Patent
Norris et al.

(10) Patent No.: US 12,262,196 B2
(45) Date of Patent: Mar. 25, 2025

(54) LOCALIZING BINAURAL SOUND TO OBJECTS

(71) Applicants: Glen A. Norris, Lakewood, OH (US); Philip Scott Lyren, Rincon, PR (US)

(72) Inventors: Glen A. Norris, Lakewood, OH (US); Philip Scott Lyren, Rincon, PR (US)

(*) Notice: Subject to any disclaimer, the term of this patent is extended or adjusted under 35 U.S.C. 154(b) by 0 days.

(21) Appl. No.: 18/197,039

(22) Filed: May 13, 2023

(65) Prior Publication Data

US 2023/0283980 A1    Sep. 7, 2023

Related U.S. Application Data

(63) Continuation of application No. 17/531,761, filed on Nov. 21, 2021, now Pat. No. 11,659,348, which is a continuation of application No. 16/914,273, filed on Jun. 27, 2020, now Pat. No. 11,190,897, which is a continuation of application No. 16/510,922, filed on Jul. 14, 2019, now Pat. No. 10,701,510, which is a continuation of application No. 16/210,033, filed on Dec. 5, 2018, now Pat. No. 10,397,729, which is a continuation of application No. 15/944,798, filed on Apr. 4, 2018, now Pat. No. 10,178,493, which is a continuation of application No. 15/353,880, filed on Nov. 17, 2016, now Pat. No. 9,998,847.

(51) Int. Cl.
| | |
|---|---|
| *H04S 7/00* | (2006.01) |
| *H04M 1/60* | (2006.01) |
| *H04R 5/033* | (2006.01) |
| *H04R 5/04* | (2006.01) |
| *H04S 1/00* | (2006.01) |

(52) U.S. Cl.
CPC .............. *H04S 7/304* (2013.01); *H04S 1/007* (2013.01); *H04M 1/6033* (2013.01); *H04R 5/033* (2013.01); *H04R 5/04* (2013.01); *H04S 7/303* (2013.01); *H04S 7/40* (2013.01); *H04S 2400/01* (2013.01); *H04S 2400/11* (2013.01); *H04S 2400/15* (2013.01); *H04S 2420/01* (2013.01)

(58) Field of Classification Search
CPC .......... H04S 7/304; H04S 1/007; H04S 7/303; H04S 7/40; H04S 2400/01; H04S 2400/11; H04S 2400/15; H04S 2420/01; H04M 1/6033; H04R 5/033; H04R 5/04
See application file for complete search history.

(56) References Cited

U.S. PATENT DOCUMENTS

| | | | | |
|---|---|---|---|---|
| 9,998,847 | B2* | 6/2018 | Norris | H04S 7/304 |
| 10,178,493 | B2* | 1/2019 | Norris | H04S 1/007 |
| 10,397,729 | B2* | 8/2019 | Norris | H04S 7/304 |
| 10,701,510 | B2* | 6/2020 | Norris | H04S 7/304 |
| 11,190,897 | B2* | 11/2021 | Norris | H04S 1/007 |
| 11,659,348 | B2* | 5/2023 | Norris | H04S 7/304 381/1 |
| 2016/0240009 | A1* | 8/2016 | Lyren | H04N 13/398 |
| 2016/0313790 | A1* | 10/2016 | Clement | G02B 27/0093 |
| 2017/0011210 | A1* | 1/2017 | Cheong | A61B 5/681 |
| 2017/0372499 | A1* | 12/2017 | Lalonde | G06T 19/006 |
| 2018/0024286 | A1* | 1/2018 | Schubert | G02B 27/0172 362/553 |

* cited by examiner

*Primary Examiner* — Andrew Sniezek

(57) ABSTRACT

An electronic device identifies a location of a physical object that is away from a listener. The electronic device convolves sound so the sound externally localizes as binaural sound to the physical object. The sound plays to the listener through earphones so the listener hears the sound as emanating from the physical object.

18 Claims, 11 Drawing Sheets

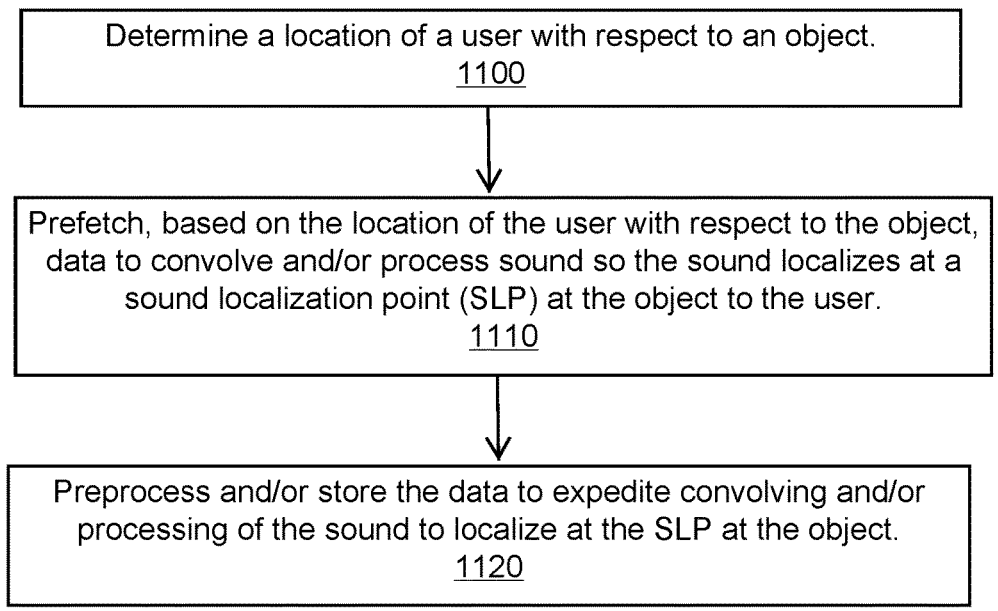

```
Determine a location of a user with respect to an object.
1100
          ↓
Prefetch, based on the location of the user with respect to the object,
data to convolve and/or process sound so the sound localizes at a
sound localization point (SLP) at the object to the user.
1110
          ↓
Preprocess and/or store the data to expedite convolving and/or
processing of the sound to localize at the SLP at the object.
1120
```

| Object | Identity | Location (R, θ, φ) | Distance to SLP | Sound Type | Sound Source | User Preference |
|---|---|---|---|---|---|---|
| 0001 | Computer display | (1.3, 22°, -10°) | 0.1m | Voice, music | All | Video, images |
| 0002 | Picture mother | (1.1, -5°, -10°) | On | Voice | Telephone | Telephone call ID "mother" |
| 0003 | Smart speaker | (6.1, 93°, -18°) | N/A | Voice, music | IPA (Hal) | IPA (Hal) |
| 0004 | Coffee cup | N/A | N/A | Voice | Internet | NPR radio |
| ... | | | | | | |
| 0269 | N/A | (1.0, 15°, -5°) | N/A | N/A | N/A | N/A |

Figure 12

LOCALIZING BINAURAL SOUND TO OBJECTS

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

One example embodiment is an electronic device or a computer system that determines a location of a physical object away from a listener and that convolves sound so the sound externally localizes as binaural sound to the physical object. The sound plays to a listener through earphones so the listener hears the sound as emanating from the physical object.

Other example embodiments are discussed herein.

BRIEF DESCRIPTION OF THE DRAWINGS

FIG. 11 is a method to expedite convolving and/or processing of sound to localize at a SLP that is at an object in accordance with an example embodiment.

FIG. 12 shows a table with example data for a few factors considered for sound localization in accordance with an example embodiment.

DETAILED DESCRIPTION

Figure 1:
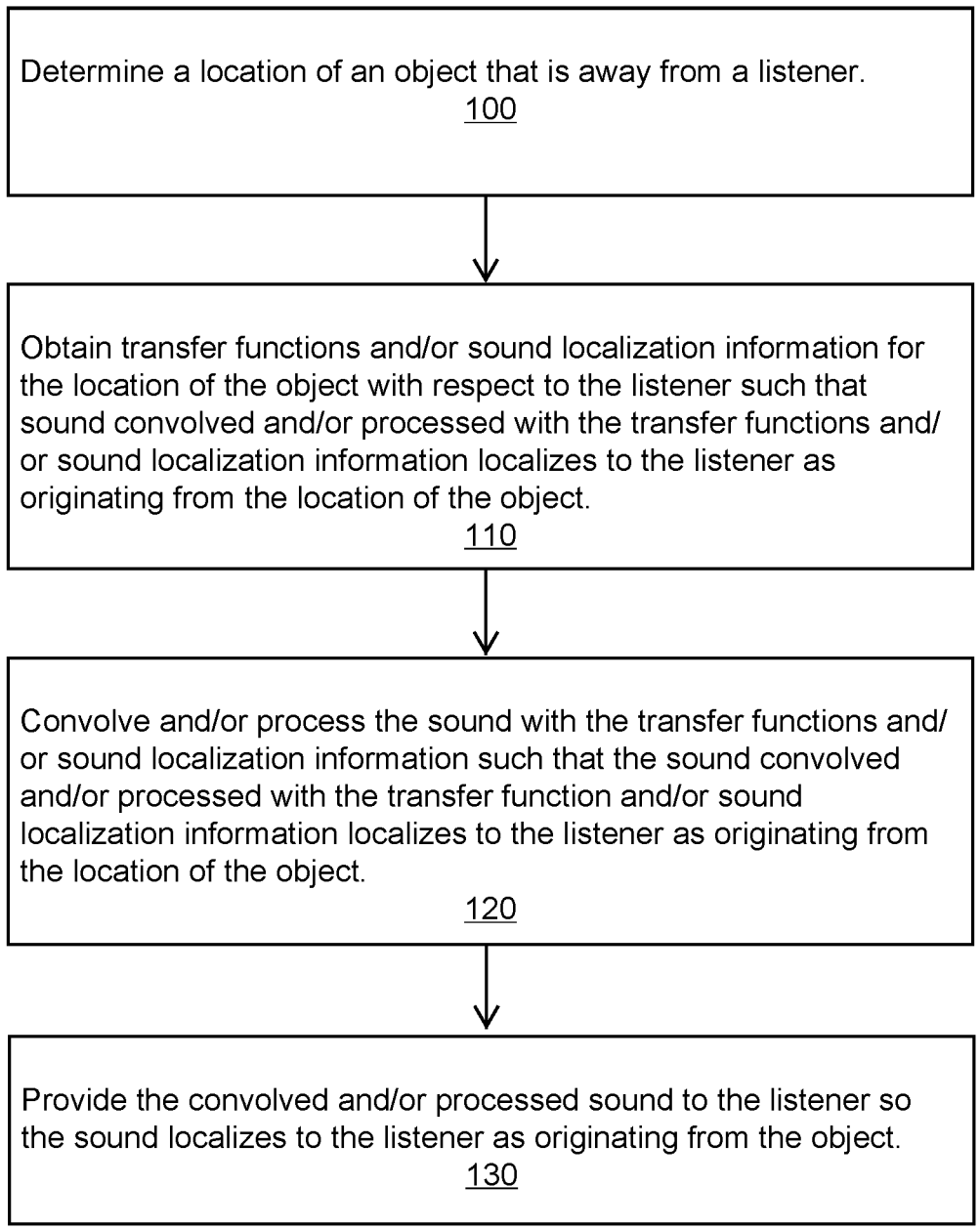
FIG. 1 is a method to provide binaural sound to a listener so the binaural sound localizes to an object that is away from the listener in accordance with an example embodiment.

Example embodiments include method and apparatus that provide binaural sound to objects.

By way of introduction, sound localization refers to the ability of a person to determine a location or an origin of sound in direction and distance (though the human auditory system has limits in determining direction and distances to some sounds). Sound localization also refers to methods to use artificial or computer generated auditory cues to generate an origin of sound in a virtual 3D space. Binaural sound (or 3D sound) and some forms of stereo sound provide a listener with the ability to localize sound; though binaural sound generally provides a listener with a superior ability to localize sounds in 3D space. In many instances, a person listening to binaural sound through an electronic device (such as earphones, headphones, or speakers with cross-talk cancellation) can determine a location from where the sound originates even when this location is away from the person. In some instances, a person listening to binaural sound can determine both a direction and a distance to an origin of the sound.

Binaural sound has amazing new technological opportunities in augmented reality (AR), virtual reality (VR), audio augmented reality (AAR), gaming, and telecommunications. For example, when talking to another person over a Voice over Internet Protocol (VoIP) call, a voice of the other person could appear to originate from a position that is several feet in front of the listener. As another example, sounds in a virtual reality (VR) software game can appear to originate at different locations around a user in 3D space when the user wears a head mounted display (HMD) or optical head mounted display (OH MD). As discussed herein, example embodiments advance these technologies and provide solutions to problems particular to binaural sound.

People use binaural auditory cues to localize origination points of sound. In physical reality and in situations that are not supplemented with electronically generated binaural sound, the origination of a sound often coincides with a visual event and/or a physical object that is producing or emanating the sound. People can ascertain the location of a sound origination with binaural cues alone, but visual cues often hasten the determination of a sound localization point, increase the accuracy of the determination, and increase the confidence in ascertaining the location of sound.

When an electronic device generates binaural sound and provides this sound to a listener (e.g., through earphones or headphones), this sound often does not have an accompanying visual object or event that the listener can use to confirm the location of the sound. The perception of an origin of sound without a visible object or event is contradictory to our everyday experience where sound impulses are caused by something we can see. When binaural sound is provided to a listener with earphones or headphones and this sound localizes to an empty point in space, the listener can experience difficulty or confusion when attempting to locate an origin of this sound. For example, a listener can have trouble determining from sound alone, the location of a sound localization point (SLP) playing an unexpected sound, such as a sound from an unfamiliar source, sound from an unknown location, sound in the listener's cone of confusion, or sound not in a line-of-sight of the listener. This difficulty can even occur if the sound is emanating from an expected area as the listener may have difficulty localizing the sound to a specific location or to a specific object. Example embodiments solve these problems and other new technical challenges with binaural sound.

Example embodiments provide a physical or virtual visual percept for a binaural sound by assigning a Sound Localization Point (SLP) to an object and also by providing a visual cue so the listener can visually perceive to which object the SLP is being assigned. The object to which the SLP is assigned can be a physical object or physical area near the listener (e.g., up to 2-3 meters) or far from the listener (e.g., greater than 3 meters). Additionally, the object can be a virtual object, such as a video or an image in augmented reality (AR) or virtual reality (VR).

In an example embodiment, the visual cue is a video or an image that assists the user in confirming or locating the object from which the binaural sound is perceived to emanate for the listener. The object is the location where the sound appears to originate to the listener, and the visual cue is a cue that informs the listener where the object is located. The visual cue instructs the listener from which object the sound is coming or will be coming and provides the listener with visual information that supplements or adds to the sound information. With the assistance of the visual cue, the listener can more accurately localize binaural sound to the correct object when this sound is provided to the listener through an electronic device, such as earphones, headphones, head mounted display, a helmet, electronic glasses, a smartphone, speakers, or a wearable electronic device.

FIG. 1 is a method to provide binaural sound to a listener so the binaural sound localizes to an object that is away from the listener.

Block 100 states determine a location of an object that is away from a listener.

An electronic device and/or a user can determine a location of a physical object with respect to a user in a real or actual environment or a location of a virtual object with respect to a user in an augmented reality (AR) environment or a virtual reality (VR) environment. Further, the object may be proximate to the user (e.g., within a few meters, such as zero to three meters) or farther away (e.g., ten meters, twenty meters, fifty meters, one hundred meters, several hundred meters, one kilometer, etc.).

By way of example, in order to determine a location of a physical object, an example embodiment executes or uses one or more of object recognition (such as software or human visual recognition), an electronic tag, global positioning satellite (GPS), indoor positioning system (IPS), Internet of things (I), sensors, network connectivity and/or network communication, or other software and/or hardware that recognize or locate an object (such as example embodiments discussed herein).

Location can include a general direction, such as to the right of the listener, to the left of the listener, above the listener, behind the listener, in front of the listener, etc. Location can be more specific, such as including a compass direction, an azimuth angle, an elevation angle, or a coordinate location (e.g., an X-Y-Z coordinate). Location can also include distance information that is specific or general. For example, specific distance information would be a number, such as 1.0 meters, 1.1 meters, 1.2 meters, etc. General distance information would be less specific or include a range, such as the distance being near-field, the distance being far-field, the distance being greater than one meter, the distance being less than one meter, the distance being between one to two meters, etc.

Additionally, the location may be in empty space but based on a location of a physical object. For example, the location in empty space is next to or near a physical object (e.g., within an inch, a few inches, a foot, a few feet, a meter, a few meters, etc. of the physical object). The physical object can thus provide a relative location or known location for the location in empty space since the location in empty space is based on a relative position with respect to the physical object.

Consider an example in which the physical object transmits a GPS location to a smartphone or wearable electronic device (WED) of a user. The smartphone or WED includes hardware and/or software to determine its own GPS location and a point of direction or orientation of the user (e.g., a compass direction where the smartphone or WED is pointed or where the user is looking or directed, such as including head tracking). Based on this GPS and directional information, the smartphone or WED calculates a location proximate to the physical object (e.g., away from but within one meter of the physical object). This location becomes the SLP. The smartphone or WED retrieves sound localization information (SLI) matching or approximating this SLP, convolves the sound with this SLI, and provides the convolved sound as binaural sound to the user so the binaural sound localizes to the SLP that is proximate to the physical object.

As one example, a portable electronic device (such as a handheld portable electronic device, HPED, or a WED) communicates with the physical object using radio frequency identification (RFID) or near-field communication (NFC). For instance, the portable electronic device includes a RFID reader or NFC reader, and the physical object includes a passive or active RFID tag or a NFC tag. Based on this communication, the portable electronic device determines a location and other information of the physical object with respect to the portable electronic device.

As another example, a portable electronic device reads or communicates with an optical tag or quick response (QR) code that is located on or near the physical object. For example, the physical object includes a matrix barcode or two-dimensional bar code, and the portable electronic device (PED) includes a QR code scanner or other hardware and/or software that enables the PED to read the barcode or other type of code.

As another example, the PED includes Bluetooth low energy (BLE) hardware or other hardware to make the PED a Bluetooth enabled or Bluetooth Smart device. The physical object includes a Bluetooth device and a battery (such as a button cell) so that the two enabled Bluetooth devices (i.e., the PED and the physical object) wirelessly communicate with each other and exchange information.

As another example, the physical object includes an integrated circuit (IC) or system on chip (SoC) that stores information and wirelessly exchanges this information with the PED (e.g., information pertaining to its location, identity, angles and/or distance to a known location, etc.).

As another example, the physical object includes a low energy transmitter, such as an iBeacon transmitter. The transmitter transmits information to nearby PEDs, such as smartphones, tablets, wearable electronic devices, and other electronic devices that are within a proximity of the transmitter. Upon receiving the transmission, the PED determines its relative location to the transmitter and determines other information as well.

As yet another example, an indoor positioning system (IPS) locates objects, people, or animals inside a building or structure using one or more of radio waves, magnetic fields, acoustic signals, or other transmission or sensory information that a PED receives or collects. In addition to or besides radio technologies, non-radio technologies can be used in an IPS to determine position information with a wireless infrastructure. Examples of such non-radio technology include, but are not limited to, magnetic positioning, inertial measurements, and others. Further, wireless technologies can generate an indoor position and be based on, for example, a Wi-Fi positioning system (WPS), Bluetooth, RFID systems, identity tags, angle of arrival (AoA, e.g., measuring different arrival times of a signal between multiple antennas in a sensor array to determine a signal origination location), time of arrival (ToA, e.g., receiving multiple signals and executing trilateration and/or multi-lateration to determine a location of the signal), received signal strength indication (RSSI, e.g., measuring a power level received by one or more sensors and determining a distance to a transmission source based on a difference between transmitted and received signal strengths), and ultra-wideband (UWB) transmitters and receivers. Object detection and location can also be achieved with radar-based technology (e.g., an object-detection system that transmits radio waves to determine one or more of an angle, distance, velocity, and identification of a physical object).

One or more electronic devices in the IPS, network, or electronic system collects and analyzes wireless data to determine a location of the physical object using one or more mathematical or statistical algorithms. Examples of such algorithms include an empirical method (e.g., k-nearest neighbor technique) or a mathematical modeling technique that determines or approximates signal propagation, finds angles and/or distance to the source of signal origination, and determines location with inverse trigonometry (e.g., trilateration to determine distances to objects, triangulation to determine angles to objects, Bayesian statistical analysis, and other techniques).

The PED determines information from the information exchange or communication exchange with the physical object. By way of example, the PED determines information about the physical object, such as a location of the physical object (e.g., a GPS coordinate, an azimuth angle, an elevation angle, a relative position with respect to the PED, etc.), a distance from the PED to the physical object, object tracking (e.g., continuous, continual, or periodic tracking movements or motions of the PED and/or the physical object with respect to each other), object identification (e.g., a specific or unique identification number or identifying feature of the physical object), time tracking (e.g., a duration of communication, a start time of the communication, a stop time of the communication, a date of the communication, etc.), and other information.

As yet another example, the PED captures an image of the physical object and includes or communicates with object recognition software that determines an identity and location of the object. Object recognition finds and identifies objects in an image or video sequence using one or more of a variety of approaches, such as edge detection or other CAD object model approach, a method based on appearance (e.g., edge matching), a method based on features (e.g., matching object features with image features), and other algorithms.

In an example embodiment, the location or presence of the physical object is determined by an electronic device (such as a HPED, or PED) communicating with or retrieving information from the physical object or an electronic device (e.g., a tag) attached to or near the physical object.

In another example embodiment, the electronic device does not communicate with or retrieve information from the physical object or an electronic device attached to or near the physical object (e.g., retrieving data stored in memory). Instead, the electronic device gathers location information without communicating with the physical object or without retrieving data stored in memory at the physical object.

As one example, the electronic device captures a picture or image of the physical object, and the location of the object is determined from the picture or image. For instance, when a size of a physical object is known, distance to the object can be determined by comparing a relative size of the object in the image with the known actual size.

As another example, a light source in the electronic device bounces light off the object and back to a sensor to determine the location of the object.

As yet another example, the location of the physical object is not determined by communicating with the physical object. Instead, the electronic device or a user of the electronic device selects a direction and/or distance, and the physical object at the selected direction and/or distance becomes the selected physical object. For example, a user holds a smartphone and points it at a compass heading of 270° (East). An empty chair is located along this compass heading and becomes the designated physical object since it is positioned along the selected compass heading.

Consider another example in which the physical object is not determined by communicating with the physical object. An electronic device (such as a smartphone) includes one or more inertial sensors (e.g., an accelerometer, gyroscope, and magnetometer) and a compass. These devices enable the smartphone to track a position and/or orientation of the smartphone. A user or the smartphone designates and stores a certain orientation as being the location where sound will localize. Thereafter, when the orientation and/or position changes, the smartphone tracks a difference between the stored designated location and the changed position (e.g., its current position).

Consider another example in which an electronic device captures video with a camera and displays this video in real time on the display of the electronic device. The user taps or otherwise selects a physical object shown on the display, and this physical object becomes the designated object. The electronic device records a picture of the selected object and orientation information of the electronic device when the object is selected (e.g., records an X-Y-Z position, and a pitch, yaw and roll of the electronic device).

As another example, a three-dimensional (3D) scanner captures images of a physical object or a location (such as one or more rooms), and three-dimensional models are built from these images. The 3D scanner creates point clouds of various samples on the surfaces of the object or location, and a shape is extrapolated from the points through reconstruction. The 3D generated image includes distances between points and enables extrapolation of 3D positional information for each object. Examples of non-contact 3D scanners include, but are not limited to, time-of-flight 3D scanners, triangulation 3D scanners, and others.

As another example, the computer system, electronic device, or software application executes photogrammetry algorithms that build and process 3D models of locations to determine physical objects in the locations. For example, videogrammetry or photogrammetry software analyzes patterns in images captured with a camera, identifies object points, and employs projective geometry to determine and assign 3D coordinates to the points. Videogrammetry software examines additional observations to improve or confirm the accuracy of the model, such as scale bars or fix points of known distances (e.g., the height of a doorway or table) to connect the scale of the model with basic measuring units.

As another example, an electronic device worn by a person monitors the gaze of the person wearing the electronic device. As a person focuses on an object, angles of the line-of-sight of the left eye and right eye of the person are measured in order to determine azimuth and elevation coordinates of the object in the focus of the person. The distance coordinate for objects within ten meters are calculated with the vergence angle (the relative angle between the left and right lines-of-sight) and the known interpupillary distance (IPD) of the person. An example embodiment extracts coordinates (r, θ, φ) of the object from the gaze of the person, retrieves HRTFs with coordinates corresponding to the coordinates of the object, and convolves sound with the HRTFs so the sound externally localizes to the object.

Other methods of measuring or determining a positional perception of an object with respect to a person can also be used. Examples of such methods include, but are not limited to, processing a known defocus blur or stereopsis or analysis of ciliary muscle contraction or eye lens thickness due to accommodation. As another example, the computer system or electronic system employs more than one of these methods and/or other methods to deduce, calculate, measure, or determine the distance and location of an object relative to the listener/viewer.

Block 110 states obtain transfer functions and/or sound localization information for the location of the object with respect to the listener such that sound convolved and/or processed with the transfer functions and/or sound localization information localizes to the listener as originating from the location of the object.

By way of example, the transfer functions and/or sound localization information are retrieved, obtained, or received from the physical object (e.g., stored in memory), the PED, or another electronic device (such as a server, cloud-based storage, memory, or another electronic device in the computer system or in communication with the PED through the network).

Sound is convolved or processed with a transfer function, such as a pair of head related transfer functions (HRTFs) so the sound localizes for a listener to a specific point (e.g., localizing to point (r, θ, φ)) or a general location or area (e.g., localizing to far-field location (θ, φ) or near-field location (θ, φ)). Each transfer function corresponds to coordinates of a location for the origination of the sound relative to a listener. These coordinates include a distance (r) or near-field or far-field designation, an azimuth angle (θ), and/or an elevation angle (φ).

Sound can also be convolved or processed with sound localization information (SLI), such as interaural time difference (ITD), interaural level difference (ITD), and other information (e.g., information extracted from images of a head or face of a person, information regarding sizes and shapes of facial or head features such as pinnae, and other information).

A corresponding transfer function is determined based on the location of the physical object determined in block 100. For example, the location information between the physical object and listener is used to obtain or retrieve a transfer function that matches or corresponds to this location information. For example, a PED calculates that the position of an object relative to the face of a listener is (θ, φ), and the PED executes a lookup for the pair of HRTFs corresponding to (θ, φ) in an AES69 HRTF file corresponding to the listener.

A HRTF is a function of frequency (f) and three spatial variables, by way of example (r, θ, φ) in a spherical coordinate system. Here, r (also written as R) is the radial distance from a recording point where the sound is recorded or a distance from a listening point where the sound is heard to an origination or generation point of the sound; θ (theta) is the azimuth angle between a forward-facing user at the recording or listening point and the direction of the origination or generation point of the sound relative to the user; and φ (phi) is the polar angle, elevation, or elevation angle between a forward-facing user at the recording or listening point and the direction of the origination or generation point of the sound relative to the user. By way of example, the value (r) can be a distance (such as a numeric value) from an origin of sound to a recording point (e.g., when the sound is recorded with microphones) or a distance from a SLP to a head of the listener (e.g., when the sound is generated with a computer program or otherwise provided to a listener).

When the distance (r) is greater than or equal to about one meter (1.0 m) as measured from the capture point (e.g., the head of the person) to the sound source, the sound attenuates inversely with the distance. One meter or thereabout defines a practical boundary between near field and far field distances and corresponding HRTFs. A "near field" distance is one measured at about one meter or less; whereas a "far field" distance is one measured at about one meter or more. Example embodiments can be implemented with near field and far field distances.

The coordinates are calculated or estimated from an interaural time difference (ITD) of the sound between two ears. ITD is related to the azimuth angle according to, for example, the Woodworth model that provides a frequency independent ray tracing methodology. The model assumes a rigid, spherical head and a sound source at an azimuth angle. The time delay varies according to the azimuth angle since sound takes longer to travel to the far ear. The ITD for a sound source located on a right side of a head of a person is given according to two formulas:

$$ITD=(a/c)[\theta+\sin(\theta)] \text{ for situations in which } 0 \leq \theta \leq \pi/2;$$

and $$ITD=(a/c)[\pi-\theta+\sin(\theta)] \text{ for situations in which } \pi/2 \leq \theta \leq \pi,$$

where θ is the azimuth in radians ($0 \leq \theta \leq \pi$), a is the radius of the head, and c is the speed of sound. The first formula provides the approximation when the origin of the sound is in front of the head, and the second formula provides the approximation when the origin of the sound is in the back of the head (e.g., the azimuth angle measured in degrees is greater than 90°).

The coordinates (r, θ, φ) can also be calculated from a measurement of an orientation of and a distance to the face of the person when the HRTFs are generated. The coordinates can also be computer generated (e.g., generated with a computer model that approximates HRTFs for a person).

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). This data can include one or more of time domain impulse responses (FIR filter coefficients), filter feedback coefficients, and an ITD value. This information can also be referred to as "a" and "b" coefficients. By way of example, these coefficients can be stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. This data can be arranged according to one or more standard or proprietary file formats, such as AES69 or a panorama file format, and extracted from the file.

The coordinates and other HRTF information are calculated or extracted from the HRTF data files. A unique set of HRTF information (including r, θ, φ) is determined for each unique HRTF.

The coordinates and other HRTF information are also stored in and retrieved from memory, such as storing the information in a look-up table. This information can be quickly retrieved to enable real-time processing and convolving of sound using H RTFs.

The SLP represents a location where the person will perceive an origin of the sound. Example embodiments designate or include an object at this SLP. For an external localization, the SLP is away from the person (e.g., the SLP is away from but proximate to the person or away from but not proximate to the person). The SLP can also be located inside the head of the person (e.g., when sound is provided to the listener in stereo or mono sound).

A location of the SLP corresponds to the coordinates of one or more pairs of HRTFs. For example, the coordinates of the SLP match or approximate the coordinates of a HRTF. Consider an example in which the coordinates for a pair of HRTFs are (r, θ, φ) and are provided as (1.2 meters, 35°, 10°). A corresponding SLP zone for the person thus includes (r, θ, φ), provided as (1.2 meters, 35°, 10°). In other words, the person will localize the sound as occurring 1.2 meters from his or her face at an azimuth angle of 35° and at an elevation angle of 10° taken with respect to a forward looking direction of the person.

Consider an example in which the relative coordinates between the physical object and a head orientation of the listener are as follows: distance from the listener to the physical object is two meters (r=2.0 m); the azimuth angle between the head orientation of the listener and the physical object is twenty-five degrees (θ=25°); and the elevation angle between the head orientation of the listener and the physical object is zero degrees (φ=0°). An example embodiment retrieves or receives a HRTF pair that has an associated sound localization point or SLP of (r, θ, φ)=(2.0 m, 25°, 0°). When sound is convolved with this HRTF pair, the sound will localize to the listener to the SLP at (2.0 m, 25°, 0°).

The sound localization point (SLP) can be set or designated at the location of the object relative to the listener. This designation occurs simultaneously as the object is located or discovered or after the object is located or discovered. Alternatively, the SLP is designated before the object is discovered. For example, a user points a smartphone in a direction to designate where he or she prefers to hear the sound. This direction and/or location corresponds to the SLP. An object is then determined at this SLP or near or proximate to this SLP. The object becomes associated with the SLP after the SLP is determined.

Block 120 states convolve and/or process the sound with the transfer functions and/or sound localization information such that the sound convolved and/or processed with the transfer functions and/or sound localization information localizes to the listener as originating from the location of the object.

An electronic device convolves the sound with the retrieved transfer functions or other sound localization information (e.g., ITD, ILDs, etc.) so the sound localizes to the physical object. The physical object and the SLP coincide (e.g., they are located at a same location or near each other). By way of example, a processor or digital signal processor (DSP) convolves the sound with the transfer functions.

Block 130 states provide the convolved and/or processed sound to the listener so the sound localizes to the listener as originating from the object.

Binaural sound is provided to the listener through bone conduction headphones, speakers of a wearable electronic device (e.g., headphones, earphones, electronic glasses, head mounted display, smartphone, etc.), or the binaural sound is processed for crosstalk cancellation and provided through other types of speakers (e.g., dipole stereo speakers).

From the point-of-view of the listener, the sound originates or emanates from the object that corresponds with the SLP. For example, a computer system of an example embodiment or an electronic device in the computer system selects a SLP location at, on, or near the object. When the sound is convolved with the HRTFs corresponding with the SLP, then the sound appears to originate to the listener at the SLP or the object.

When binaural sound is provided to the listener, the listener will hear the sound as if it originates from the object and/or from a visual cue (e.g., if the visual cue is the object or the visual cue is on, at, or near the object). The sound, however, does not actually originate from the object since the object may be an inanimate object with no electronics or an animate object with no electronics. Alternatively, the object could have electronics but not have the capability to generate sound (e.g., the object has no speakers or sound system). As yet another example, the object could have speakers and the ability to provide sound but is not actually providing sound to the listener. In each of these examples, the listener perceives the sound to originate from the object, but the object is not producing the sound that the listener perceives. Instead, the sound is altered or convolved and provided to the listener so the sound appears to originate from the object and/or the visual cue.

Consider an example in which a camera or 3D scanner captures images of a room and objects in the room. The images are used to generate a 3D model that is viewable with a head mounted display. This model is stored in memory (such as memory of a PED or memory of a server accessible over a network). A user wears a head mounted display (HMD) that displays a 3D image of the room to the user while the user is physically remote from the room (e.g., the user is in another building, a different city, a different state, a different country, etc.). When the user receives a telephone call, the HMD portrays the 3D image of the room to the user. The 3D image displayed to the user is adjusted and updated to reflect the movements or input of the user such that the user is able to walk around or navigate around the room. When the telephone call commences, the user or a software application selects a SLP in this virtual room. A voice of the caller originates from the selected SLP in the room. This localization matches or emulates localization as if the user were actually located in the remote room.

Consider an example in which a listener is located in a room that includes a plurality of toy animals placed side-by-side along one wall. The listener receives a telephone call, and a voice of the caller localizes to a point in empty space in the room. In this situation, the listener may have difficulty in determining a precise location of the localized voice even though the voice is provided in binaural sound. Alternatively, the listener accurately localizes the voice but may not feel comfortable talking to the voice that is heard to originate in empty space.

Example embodiments solve this problem and other problems. For example, when the listener receives the telephone call in the above example, the voice of the caller is convolved so a location of the voice appears to emanate from one of the objects in the room, such as one of the toy animals. In this situation, the listener is not talking to empty space, but talking to an object (here, the toy animal). In this instance, an example embodiment determines the object to which the voice of the telephone caller is assigned and convolves the sound so the voice of the caller localizes to this object.

Consider an example in which Alice wants electronic calls from Bob to localize at a specific external location that she designates. This location includes or has a toy teddy bear. Her smartphone displays an image of a head that represents Alice and an area around the image that represents her current location. Alice places her finger on the display of the smartphone at a location that is thirty degrees (30°) azimuth and zero degrees (0°) elevation from a forward-looking direction of the image on the display. This location includes the teddy bear. The smartphone retrieves Alice's HRTFs for this location and assigns the voice of Bob to this location in Alice's sound user-preferences. The preferences store the coordinates of the SLP with respect to her head as indicated by the selection with her finger. The preferences also store the identity and/or image of the bear as the preferred object for the SLP of Bob's voice. Later, when Alice receives an electronic call from Bob on her smartphone, the voice of Bob localizes at the location of the teddy bear if the location of the teddy bear is determined, or three feet from her face at thirty degrees (30°) azimuth and zero degrees (0°) elevation, a previously used SLP for the voice of Bob. This SLP of Bob's voice corresponds to the location that Alice selected on her smartphone.

Consider an example in which Alice stands in her office and wears a head mounted display (HMD) and headphones that provide a virtual world of her office environment. The HMD has a camera that captures video of the office and displays this video to Alice as a VR world that is overlaid on the physical world. VR representations of the objects map to and position at the locations and orientations of the corresponding physical objects. Alice provides a voice command to software controlling the HMD to open a conversation with Bob. The software asks Alice where to localize the voice of Bob, and she responds "empty chair." The camera is currently capturing an image of an empty chair. The software and corresponding hardware execute object recognition to identify the empty chair and designates the VR system to place a virtual image of Bob at the captured image of the empty chair. The VR system determines a location of the empty chair in the virtual world with respect to Alice's point of view in the virtual world and determines that the empty chair is located at $(r, \theta, \phi)$ provided as (1.2 meters, −20°, 10°) relative to Alice. The SLP selector retrieves Alice's HRTFs that correspond to this location and places an image of virtual Bob at the empty chair. When Bob responds, his voice appears to originate from virtual Bob who is located at (1.2 meters, −20°, 10°) at the empty chair that is physically located in Alice's office 1.2 meters away from her. Thereafter, when Alice's head moves, a head tracking system communicates these movements to a sound localization system (SLS). The SLS, in turn, retrieves HRTFs for positions that compensate for her head movement and convolves the sound using the HRTFs so the position of the origin of the sound of Bob's voice is adjusted in order to compensate for the movement of Alice's head. Alice continues to hear the voice of Bob originate from the position of virtual Bob at the chair.

In some instances, multiple physical objects may be available at a location to serve as SLPs. A problem can arise in which an appropriate object to select as the SLP is unclear. For example, a location or an area may have multiple stationary allowable objects that may suffice as a physical representation for the SLP. Which one does an electronic device, computer system, or software application select for the SLP?

Example embodiments solve these problems and others. For instance, example embodiments make an intelligent selection or a preferred selection from multiple available objects.

Figure 2:
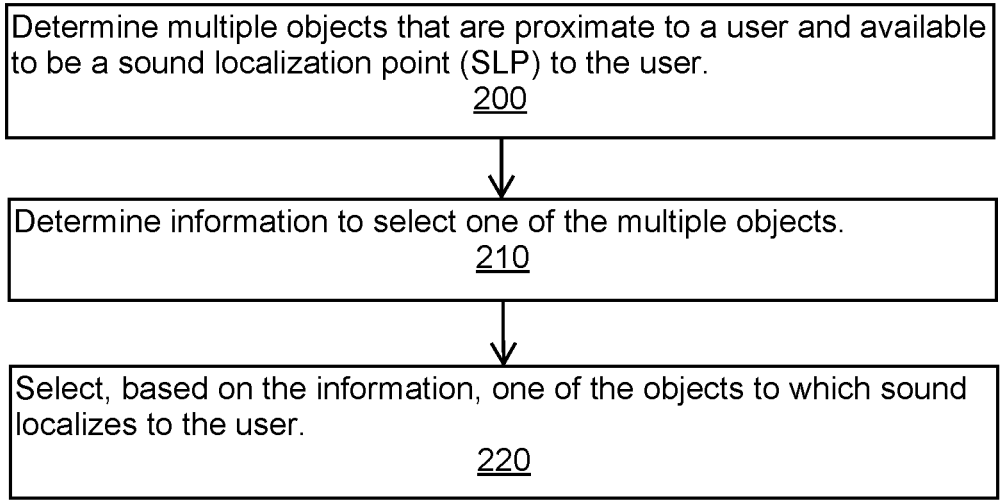
FIG. 2 is a method to select an object from multiple objects and provide a SLP to the selected object in accordance with an example embodiment.

FIG. 2 is a method to select an object from multiple objects and provide a SLP to the selected object.

Block 200 states determine multiple objects that are proximate to a user and available to be a sound localization point (SLP) to the user.

Multiple different objects can simultaneously be near or proximate to the listener and available as SLPs. These objects include electronic devices (e.g., a TV, a smart speaker, a PED), non-electronic devices with an attached electronic device (e.g., a teddy bear with a RFID tag attached), images, video, AR objects, VR objects, and non-electronic devices with no electronic device attached (e.g., a chair).

Block 210 states determine information to select one of the multiple objects.

An electronic device, a computer system, and/or a software application in an example embodiment determines information about these objects that includes, but is not limited to, a distance to an object, an orientation of the object with respect to an orientation of a user or a HPED or with respect to other objects, walls or barriers in the environment, GPS coordinates of the object, IPS information of the object, a size of the object, a shape of the object, a color of the object, an identity of the object, whether an object was previously used as a SLP, a compass direction to the object, a direction to the object (e.g., an azimuth angle or elevation angle with respect to the user or a HPED), and other information discussed herein.

In addition to information about the objects, an example embodiment determines information about the user or listener. By way of example, this information includes, but is not limited to, demographic information about the user (e.g., age, gender, religion, income, marital status, nationality, political preference, etc.), GPS coordinates of the user, an orientation of the user (e.g., an orientation with respect to each of the multiple objects), IPS information of the user, user preferences of the user, a line-of-sight of the user, historic information relating to previous SLP selections, and other information discussed herein.

In addition to information about the objects and about the user, the computer system, the SLS, and/or the SLP Selector also determines information about the sound or sound source, that is, the audio input to the SLS for localization. This information includes, but is not limited to, one or more of a file format of the audio, a classification or sound type (e.g., voice, speech, music, noise) or sound source of the audio (e.g., a telephone call, a radio transmission, a television show, a game, a movie, audio output from a software application or from audio routed directly to a loudspeaker, audio captured from a speaker output circuit or from a microphone, audio input from an intelligent personal assistant (IPA), audio input from an intelligent user agent (IUA), etc.), monophonic, stereo, or binaural, a filename, a storage location, a universal resource locator (URL), a length or duration of the audio, a sampling rate, a bit resolution, a data rate, a compression scheme, an associated CODEC, a minimum, maximum, or average volume, amplitude, or loudness, a minimum, maximum, or average wavelength of the encoded sound, a date when the audio was recorded, updated, or last played, a GPS location of where the audio was recorded or captured, an owner of the audio, permissions attributed to the audio, a subject matter of the content of the audio, an identity of voices or sounds or speakers in the audio, an identity or type of music in the sound, an acoustic fingerprint, sound signature, sound sample, a hash of a sound, spectrographic model or image of the sound, acoustic watermark, audio based Automatic Content Recognition (ACR) identification, noise in the audio, metadata about the sound, an IP address or International Mobile Subscriber Identity (IMSI) of the inbound audio, caller ID, an identity of the speech segment and/or non-speech segment (e.g., voice, male voice, female voice, computer generated voice, music, a type of music such as genre or musician, noise, background noise, silence, computer generated sounds, IPA, IUA, natural sounds, a talking bot, etc.), and other information.

The operating system (OS) or firmware of the computer system or electronic device determines a source of the sound, for example, based on an identification of the software application. A source of the sound can also be determined from one or more other indications including, but not limited to, a file type (for example as indicated by a filename extension) of the audio input (e.g., "MP3" file), metadata or file header tags, file analysis (such as by investigating waveforms or using a digital signal processor (DSP) to examine other properties of the sound), content analysis (such as using Voice Activity Detection (VAD), voice recognition, Automatic Content Recognition (ACR), speech analytics (e.g., determining the language, words spoken in a voice sound, word meaning, a subject or topic of the content), the name of a speaker, the identity of a piece of music), a type of software providing the audio input (e.g., a media player, a game, a telephony application), a storage location (e.g., stored on a user's smartphone, local network, internet, cloud server), a duration of the audio input, a sender of the sound, an electronic device or computer program transmitting or providing the sound, header or packet information, or an associated CODEC.

Audio can have many different sources. Examples of some of these sources include, but are not limited to, sound sources shown in example embodiments, a telephone or HPED that makes telephone calls, a computer program (e.g., an IPA or IUA), the internet (e.g., YOUTUBE or other media streaming service), another person or physical environment (e.g., a person that captures binaural sound with two microphones and shares this sound), an electronic device (e.g., a server or a HPED), a music library or music player, a video player, a software application (e.g., a virtual reality (VR) game), memory (e.g., a flash memory device, a compact disk (CD), a digital versatile disk (DVD), a solid state drive, a hard drive, etc.), a television (TV) or radio emission or broadcast, a wireless transmission, an appliance, a car, a public kiosk, a security system, a medical device, a home entertainment system, a public entertainment system, and a virtual sound source, such as a speaker in a virtual reality (VR) space or as an augmented reality (AR) fixture or character.

In an example embodiment, a computer system or electronic device analyzes the audio input and/or information about the audio input to determine a source of the sound. For example, the sound is included as an attachment to an email, and the sender or contents of the email reveals a source of the sound. As another example, the source is determined from a URL or other data pointer to the sound (e.g., a link of a proprietary format to stored sound such as radio programs, video program archives, movies, or podcasts). As another example, metadata about or with the audio input provides information about the source or origin of the sound. As yet another example, the computer program generating the sound provides information about the source of the sound by inspecting tags or header information provided by the OS (e.g., sound from a "bot" or software robot, a natural language user interface, or an IPA provides information about the source and that the sound is likely voice or speech).

Information about the source of the audio input can be sufficient to identify a type of sound in the audio input. For example, if the source of the audio input is a telephone call from Bob to Alice, then Alice's smartphone ascertains with sufficient certainty that the telephone call is speech and likely the voice of Bob since her smartphone recognizes Bob's telephone number.

In other instances, information about the source of the audio input is analyzed to predict with a reasonable likelihood the origination of the sound in the audio input or the type of sound in the audio input. By way of example, this information includes, but is not limited to, a type of file or format of the audio input, a location or folder name where the sound is stored, a filename extension of the audio input (e.g., WAV or MP3), an electronic device transmitting the sound, a software application providing the sound, and other information discussed herein.

Consider an example in which Alice receives on her smartphone a text message from her cellular service provider. The text message notifies her that she has a new voicemail message and includes a link to activate to hear the message. When Alice activates the link, her smartphone knows the source of the sound is a voicemail message. For example, the smartphone recognizes the link name, link format, or link target, or recognizes the telephone number to retrieve the message. Her smartphone retrieves a left and a right HRTF corresponding to an object associated with voicemail messages and convolves the message sound with the HRTFs so the message sound externally localizes to the object that Alice usually uses for voicemails. Alice is familiar with the location of the object and expects the voicemail message sound at the object since the location is where she prefers to hear her voicemail messages.

Consider another example in which the type of sound is determined from a source of the sound. For instance, sounds originating from a database of 1940's radio news broadcasts can be typed as speech by default since news broadcasts were given by a voice of a broadcast reporter or anchor. Likewise, an audio file titled "NBC Symphony Orchestra: Beethoven's Fifth Symphony" may be categorized by default as music based on the title of the audio file.

In other instances, the type of sound is determined or inferred from other information, such as a type of file, file format, title of the file, CODEC associated with the file, compression or storage method, metadata or headers, and other information. The type of sound is also determined from sampling portions of the audio input, processing the audio input, executing audio segmentation, executing audio diarization or audio diarization executing together with voice recognition and speech recognition on the audio input in order to render one or more audio segments of the input that include or exclude one or more sound types such as voice, speech, music, noise, audio segments of a particular user's voice, etc.

For example, a DSP analyzes forty random 50 millisecond (ms) slices of a sound file or sound source with distribution of the slices weighted toward the front, middle, and end of the file. The DSP determines that the file includes both music and voice, and an audio segmenter included with the SLS executes in order to create separate segments for the music and the voice. The audio segmenter assigns segment identifications (IDs) to the segments, and these separate segments localize to different coordinates. Further, a voice recognition system included with the SLS identifies that voices of two distinct people are included in the voice segment. Voice recognition executes on the voice segment together with an audio diarization system also included with the SLS to segregate the voice segment into two separate voice segments and to assign segment IDs to the two separate voice segments. The result is that the SLS localizes the sound from the sound source at three different SLPs. One SLP at a first location plays the music segment of the music found in the sound source. A second SLP at a second position emanates the voice of one person from a first voice segment, and the speech of the other person detected in the sound input is localized to a third set of coordinates relative to the listener.

Properties of the source of the audio input may or may not be sufficient to determine the type of sound in the audio input. For example, the source of the audio input and other information provides sufficient information to know the type of sound with certainty (e.g., 95%-100%), with a high degree of certainty (e.g., 85%-94%), with a reasonable degree of certainty (e.g., 70%-84%), or more likely than not (e.g., 51% or more).

By way of example, a speech/non-speech detector executes to determine if a segment of the audio input is speech and/or non-speech. Examples of speech/non-speech detectors include, but are not limited to, hardware and software that execute Gaussian Mixture Models (GMM), Support Vector Machines (SVM), Neural Networks (NN), Voice Activity Detectors (VAD), and other models discussed herein.

Block 220 states select, based on the information, one of the objects to which sound localizes to the user.

Once a physical object is selected, an example embodiment convolves and/or processes the sound and provides it to the listener so the sound originates from a SLP that is coincident with or near the physical object. Sound localizes to the user at the SLP and hence at, with, or near the selected object.

The information determines or assists in making a selection of which physical object to designate as the SLP. In an example embodiment, an electronic device, computer program, or user selects a location where to place the SLP with respect to a listener based on analysis of the information. A location for the localized sound for the listener can depend on the type of sound being provided to the listener. For example, when a determination is made that the sound is speech, the sound or audio segment localizes to a manikin or toy animal. As another example, a voice of a caller localizes to an empty chair near the listener when an example embodiment determines the sound is a voice in an incoming telephone call.

A user or an electronic device designates certain sounds to localize to certain areas or certain physical objects. For example, a user designates music to localize to one set of physical objects (e.g., a radio, a stereo, a wall poster), voices in radio and television to localize to another set of physical objects (e.g., a computer screen, a television, or a pencil holder), voices in telephone calls to localize to another set of physical objects (e.g., a dummy head, empty office chair, a telephone, or a photograph), sound in movies to localize to another set of physical objects (e.g., objects proximate to the visual display showing the movie), etc.

The localization point of the sound and the corresponding selection of the physical object for the user depend on one or more other factors or information, such as an identification or identity of a sound (e.g., an identity of a voice as belonging to Alice), a duration or length of the sound, a meaning of the sound (e.g., localize warnings and alerts to a certain area or a certain SLP), a purpose or classification of the sound (e.g., localize advertisements to a predetermined, user-selected zone), or other factors discussed herein.

Consider an example in which similar types of sound are placed in SLPs external to or internal to the user. For example, a user listens to a radio show that localizes to a SLP at (1.0 m, 25°, 45°) that is a position of a television that is currently turned off. During the radio show, an advertisement plays to a user at this SLP. The user does not want to hear the advertisement at this SLP, and an example embodiment automatically moves the sound with a reduced volume to a SLP at (5.0 m, 20°, 0°) which is a location in empty space. When the advertisement concludes, the sound localizes back to the television.

Consider the above example in which instead of automatically moving the SLP for the advertisement, the user moves the SLP. The user's manual re-designation of the SLP is a weighted indication to the sound localization system (SLS) of a preference of the user to hear advertisements at (5.0 m, 20°, 0°). In response to this determination, the SLS updates the user preferences accordingly. Later, an advertisement is played during the radio show. The user's sound localization system recognizes the sound as an advertisement, consults the user's preferences, and automatically moves the sound of this advertisement to (5.0 m, 20°, 0°) with a reduced volume. The user preferences are updated to include a preferred physical object of the television at SLP (1.0 m, 25°, 45°) for the location of playing a radio show. These user preferences also include the coordinates of the object (in this example the television) with respect to the room. These coordinates are stored as being independent of the location of the user (e.g., stored as a GPS location, stored as an Internet of Things (IoT) location with respect to other nearby objects, stored with respect to a signal from an object with RFID tag or other tag, stored as a positional head tracking (PHT) location and orientation with respect to a PHT lighthouse, etc.).

Consider an example in which Bob is driving, and his children are sleeping in the back seat. He designates that while he is in the car sounds localize to (0.2 m, 40°, −43°). This SLP represents the position of his car radio in the dashboard relative to his face. An example embodiment receives an incoming sound, consults Bob's designations with the knowledge that Bob's current context is in a car, and convolves the sound to (0.2 m, 40°, −43°) without regard to the sound source according to Bob's designation. Bob then hears the sound originate from the physical object of his dashboard. As a result, Bob knows that sounds he hears localized from other locations are his children stirring or another sound from the environment.

As another example, a SLP selector is unable to determine the source of an input sound and assigns a SLP/physical object recently selected by the user for another sound, or assigns a SLP/physical object designated as a default SLP/physical object for sounds from sources that cannot be identified. As another example, the SLP selector is passed a pointer to an audio source or segment of an audio source. When the SLP selector queries for specifications about the sound in the audio source, the data returned is null, unintelligible, improperly formatted, or an error code. The SLP selector proceeds with assigning a SLP/physical object for the audio source and selects a SLP or object pre-designated by the user for sounds without fully qualified information.

Figure 3:
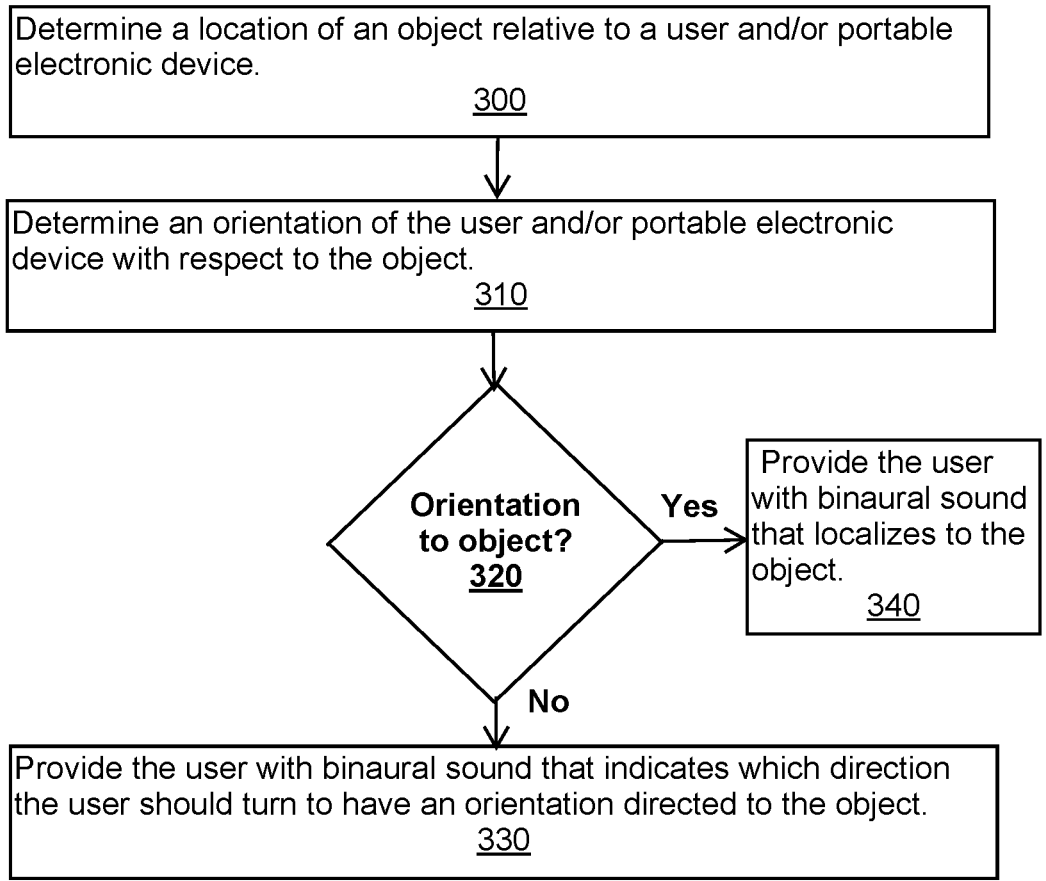
FIG. 3 is a method to provide a user with sound that localizes to a physical object when the user is at a location and orientation with respect to the physical object in accordance with an example embodiment.

FIG. 3 is a method to provide a user with sound that localizes to a physical object when the user is at a location and orientation with respect to the physical object.

Block 300 states determine a location of an object relative to a user and/or portable electronic device.

The user, portable electronic device, and object can be outdoors (e.g., in a park or in a city) or indoors (e.g., in a house or a building). The user and the object can also be in an immersive VR world (e.g., the user wears a HMD). The object can be a physical object or a virtual object such as an AR object visible to the user wearing electronic glasses. Further, the user and/or portable electronic device can be proximate to the object (e.g., within a few meters) or farther away (e.g., 10 meters, 20 meters, 30 meters, . . . 100 meters, etc.).

Block 310 states determine an orientation of the user and/or portable electronic device with respect to the object.

The orientation can be with respect to the user and/or the PED. For example, if the user wears a head mounted display (HMD) then the orientation is with respect to a head of the user since the HMD is on the head of the user. If the user holds a HPED (such as a smartphone) then the orientation is with respect to the orientation of the smartphone in the hand of the user. As yet another example, an electronic device not with the user determines the orientation. For instance, the physical object includes a camera that captures an image of the user standing next to the physical object. Facial recognition software determines an orientation (e.g., a direction that the user is looking) with respect to the physical object. As another example a device apart from the user and in communication with a device of the user or monitoring a device of the user determines the location, such as a component of a PHT system (e.g., a PHT base unit or lighthouse that monitors a head tracker worn by the user).

Block 320 makes a determination as to whether the orientation is directed to the object.

For example, a determination is made as to whether the user and/or portable electronic device is facing the physical object, looking at the physical object (e.g., tracking a gaze of the user), has a line-of-sight directed to the physical object (e.g., a camera or image capture device of the PED is directed at the physical object, or a face of the user is directed at the physical object), etc. For example, given a GPS location of the user with respect to the GPS location of the physical object, a compass direction where the PED is directed or where the user is facing indicates whether the orientation is directed to the physical object. As another example, a compass direction or direction of movement (e.g., a user walking toward the physical object) indicates whether the orientation is directed to the physical object. As another example, inertial sensors and/or a compass in a PED (such as a smartphone or HMD) determine an orientation of a user and/or the PED.

If the answer to this determination is "no" then flow proceeds to block 330 that states provide the user with binaural sound that indicates which direction the user should turn in order to have an orientation directed to the object.

The binaural sound provides the user with a notification or indication of the location of the physical object. This sound localizes to the user so that upon hearing the sound the user knows where the physical object is located or knows which way to move or turn toward the physical object. For example, if the physical object is to a left side of the user, then the sound localizes to a left side of the user. The location of the sound prompts the user to turn or move to his or her left and hence toward the physical object. A SLP for the sound provides the user with audio information as to where the physical object is located. For example, the sound localizes above the user, so the user knows that the physical object is located above the user. This sound also localizes to or emanates from the coordinates of or the same position of the physical object. For example, the user stands near (e.g., 2.0-3.0 meters away) the physical object but faces away from the physical object. A short sound emanates from the location of the physical object. The user localizes this sound and is able to identify, based on the notifying sound, the location or identity of the physical object.

If the answer to this determination is "yes" then flow proceeds to block 340 that states provide the user with binaural sound that localizes to the object.

From the listening point-of-view of the user, sound emanates or originates from the physical object even though the physical object actually does not generate the sound. The physical object may not even be capable of producing an audible sound (e.g., the physical object is a tree), or the object may be a virtual object or AR image. The physical object may be capable of producing sound (e.g., a smart speaker) but is not generating the sound that the listener hears. Instead, the listener hears binaural sound through headphones, earphones, or speakers providing sound with cross-talk cancellation, and this sound localizes to the physical object.

Speech output as stereo sound or mono sound can provide directional information or navigational instruction to a listener. Consider an example in which a user navigates city streets with a smartphone and receives verbal instructions from a GPS application. The application announces directional or navigational information with words (e.g., "Turn left at the next intersection").

The problem with this type of directional or navigational instruction is that the listener must rely on clearly hearing and understanding the words in order to follow the instructions. If the speech is not intelligible to or cannot be understood by the listener, then the listener will not be able to follow the instructions and navigate to the location.

Example embodiments solve these problems and others with directional or navigational instruction based on binaural sound that externally localizes to the listener.

The sound localization point (SLP) of the sound provides the directional or navigational information so this information is not required to be provided with speech or with the instructions from the words themselves. As such, a listener can understand or comprehend the direction from the localization of the sound even if the words are not clearly heard or not understood. For example, the sound localizes to, near, or in a direction of the destination, waypoint, or desired direction so the listener hears the sound emanating from the desired direction of travel. For instance, the SLP originates from a direction where the destination is located so the listener knows which direction to walk or move in order to arrive at the destination. For instance, if the listener should proceed east, then the SLP localizes east of the listener. The SLP can also provide a sound that guides movement of the listener along a correct path or route to arrive at the destination. For instance, a listener follows SLPs of binaural sound that provide a path or locations to adjust a course or direction of the listener while the listener travels to the destination. A listener is able to navigate to a destination without relying on words or navigational content used in directional or navigation instructions provided with stereo sound or mono sound. In fact, in an example embodiment, the sound providing the direction may not even include words that instruct a listener which direction to travel since SLPs that externally localize to the listener as binaural sound replace this form of instruction. Such SLPs are positioned to guide the listener in the desired direction and/or to the desired location.

Consider the example above in which the user navigates city streets with the smartphone and receives verbal instructions from the GPS application. The verbal instructions localize to a SLP that corresponds to the directional information also provided in the words of the verbal instruction. The application announces directional information with words (e.g., "Turn left at the next intersection"). These words, however, localize to the user to his or her left and originate from the location left of the intersection. This method provides the directional information using a redundant scheme: The directional information is provided in the words themselves and the directional information is provided as the SLP. The SLP coincides with the location toward which the user is being navigated. The SLPs provide 3D navigation sound points, sound locations, or sound directions that the user follows to navigate to a location. These SLPs supplement, correspond with, and re-affirm the words of the navigational information.

Consider the example above in which the user navigates city streets with the smartphone and receives verbal instructions from the GPS application. A voice of the GPS application does not announce directional information with words, but instead uses SLPs and the display of the smartphone to provide this information. As the user navigates along the city streets, the voice of the GPS application localizes to or emanates from a SLP that corresponds to the direction that the user should walk. Instead of relying on the words of the GPS application for direction, the user relies on the SLPs that indicate which direction to go. The display on the smartphone also supplements or confirms this information (e.g., the display displays arrows or routes that coincide with the direction information in the SLPs). For example, when the listener arrives at a crossroad, the voice of the GPS application talks to the user from a SLP that emanates at an azimuth angle of 60° from a forward-facing head orientation of the user. The user knows to turn right 60° and follow the direction of the sound.

Consider further the example above in which the user navigates city streets with the smartphone and receives verbal instructions from the GPS application. The SLPs of the voice of the GPS application localize to physical objects that provide the directional information to the user. In other words, the location of the physical object from which the sound emanates is the location or the direction that the user should follow. For example, when the GPS application wants the user to turn left, then the voice of the GPS application localizes to or emanates from a physical object at the user's left.

Consider an example in which a user walks along a trail to a cabin in the woods while wearing wireless earphones that communicate with a smartphone in the user's backpack. The user walks to a fork in the trail. One trail goes to the user's left, and one trail goes to the user's right. The user is not certain which trail leads to the cabin. In order to visually navigate with the GPS application executing on the smartphone, the user would have to remove the smartphone from his backpack, unlock the smartphone with a password, open the GPS application, hold the smartphone in front of him, and see which trail is highlighted or marked on the display to indicate the correct trail. These steps are time consuming and burdensome on the user.

An example embodiment eliminates these steps and provides a simplified yet accurate method of navigation. When the user reaches the fork in the trail, a voice emanates from the direction of the left trail that is the physical object in this example. A SLP of this voice originates on the left trail about three meters from the user. The user clearly discerns from the location of the voice that the user should proceed down the left trail rather than the right trail. The user was not required to stop and remove the smartphone from the backpack. Instead, the smartphone provided the voice to the user when the user arrived at the fork in the trail while the user was walking.

Consider another example in which a sight-impaired pedestrian is guided on a walking course along a sidewalk through a city. The object selected for the SLP is continuously, continually, or periodically updated to a location on the sidewalk as the pedestrian walks. The SLPs localize on the sidewalk about one to two meters in front of the pedestrian and provide a pathway that guides the pedestrian. By way of example, a sound of a walking stick tapping on the pavement localizes at the SLPs on the sidewalk as the pedestrian walks to his or her destination. Head tracking data adjusts the sound localization information (e.g., HRTFs, ILDs, ITDs) executed to convolve the sound to the correct SLP on the sidewalk as the head orientation of the pedestrian changes.

This example embodiment has many practical applications. For example, a sight-impaired pedestrian can safely walk in the direction of externally localizing sound without listening to verbal instructions. These sounds guide the pedestrian along a detailed route and localize at barriers and hazards to warn the pedestrian. For example, an alert sound localizes to a SLP that is positioned between the pedestrian and an open hole.

Consider the example above in which the object to which the SLP is assigned is not the sidewalk but is instead the end of a walking stick carried by the pedestrian, or the collar of a seeing-eye dog that accompanies the pedestrian. For example, a low energy transmitter or other radio transmitter is attached to or included inside the walking stick, or attached to a tag on the collar of the dog. Signals or data from the transmitter enable an electronic device to track the position of the transmitter in real-time so that the SLP is localized at the transmitter in real-time. The sound playing at the SLP is adjusted to vary according to the position of the SLP relative to the pedestrian and the next waypoint. For example, if the SLP is between the pedestrian and the waypoint or in the path of the direction that the pedestrian should be traveling, then the sound played at the SLP is an affirmative sound (e.g., a bell or short high-pitch sound). If the SLP is not in line between the pedestrian and the waypoint or in a direction that would lead the pedestrian off the chosen course, then the sound played at the SLP is a warning sound (e.g., a buzz or long low-pitch sound). Using this example, the pedestrian follows his dog by listening to the location of the dog, without the need of a dog harness. Further, the pedestrian extends the walking stick outward, panning it in various directions, until he or she hears the affirmative sound from the end of the stick indicating the correct heading.

Example embodiments offer assistance to wheelchair bound travelers who cannot easily or safely use a walking stick or hold a dog leash while operating the wheelchair or traveling. An affirmative sound or tone and a warning sound or tone can be graduated to correspond with a desired or less desired heading. For example, rather than a single high-pitch affirmative tone, the tone played while turning from an incorrect heading to a correct heading changes gradually from a lower pitch tone to a higher pitch tone. The tone indicates that the heading is changing toward a more correct heading and away from a less desired heading.

As another example, the object selected for the SLP is a part of the wheelchair, such as the footrest. This example embodiment allows the traveler to pivot the wheelchair in different directions until the traveler hears a more affirmative sound.

Consider an example of an AR game in which users or players wear wireless electronic AR glasses with earphones and scout different local or wide area geographical locations in search of treasures or targets displayed to the players as AR objects. The game superimposes treasure images on the environment of a player using the AR glasses. The object of the game is to navigate to a specified GPS location, find a treasure, and listen to instructions or clues about the next treasure location. A physical object in the environment of the player or an AR object at the GPS location shows the treasure. When a player is within a predetermined physical distance of the GPS location (e.g., within 1.0-3.0 meters of a tree, doorway, or landmark), the binaural sound emanates from the location of the object. To the player wearing the wireless earphones, the object is heard to speak since sound originates from this location. If the player is not oriented toward the object, then the player hears a verbal hint. For example, the object whispers, "Hey, I have the treasure you are seeking." The player localizes the direction of this sound, turns, sees the object, and hears the next clue in the game. The player is thus able to determine direction and navigate to a location without verbal navigation instructions.

People are unable to observe visually many types of objects because the objects are too small, hidden, or not visible with the naked eye. In some instances, these objects can pose a danger or hazard to an individual. In other instances, a person would have a significant advantage if the location of the object could be known.

Example embodiments solve or assist in solving these problems and others. Binaural sound localizes to SLPs that assist people in determining locations of objects that are too small, hidden, or not visible with the naked eye.

Consider an example in which an object is invisible (e.g., a colorless gas), microscopic, too distant to see, or occluded by a barrier or another object. An example embodiment localizes sound so the SLP sticks or attaches to the object or at the location of the object relative to an observer. Even though the observer cannot actually see the object, the observer discerns important properties of the object through sound, such as a location of the object, a direction or heading of the object with respect to the observer, a velocity of the object, and other properties discussed herein.

Consider an example of an automobile navigation system that receives coordinate locations (e.g., a GPS location) of milestones or hazards from the objects themselves or from a server in a wireless network. The navigation system sticks or attaches a SLP to the milestones or hazards while the automobile is traveling to the object. This attachment can occur even when the automobile is yards or miles away from the object and before an occupant in the automobile can see the object. For instance, while an automobile travels from Los Angeles to Las Vegas, a passenger in the automobile hears binaural sound originate from a SLP on the horizon in the direction of Las Vegas.

Consider another example in which sound emanates from a SLP to warn a passenger in an automobile. For instance, the passenger is in a zero-visibility rainstorm and can hear a warning sound localizing at the SLP that is stuck to a hazardous object of an approaching road construction site. Sound from the SLP alerts the passenger to the direction and proximity of the hazard.

Consider another example in which a hunter wears a OHMD while hunting at night. The OHMD executes an application that monitors images for bright clusters of infrared light that indicate a warm-blooded animal. The application calculates coordinates of the cluster and convolves and plays binaural sound to localize at a SLP located at the calculated coordinates of the cluster. The hunter is alerted to the location of the animal even if the hunter is not monitoring a display of infrared light.

As another example, a worker walks an industrial floor (such as an oil refinery) and wears a WED that includes positional head tracking (PHT), an RFID scanner, and headphones. As the worker passes through an area, an application executing on the WED collects the coordinates of each RFID tag sensed and queries the online refinery control system or computer system with the coordinates. The control or computer system returns the status of the machinery, pipe, or valve located at the coordinates of the RFID tag. If the status returned by the control system for the machinery at the RFID tag is abnormal, then the application plays an alert sound to the worker and assigns the sound to stick or localize a SLP at the coordinates of the RFID tag relative to the worker. The localization of the alert sound directs the attention of the worker to the precise position of the piece of machinery that needs attention in an environment where trouble spots are difficult to distinguish by outward appearance.

Consider another example in which binaural sound assists in identifying or locating an odorless gas. For example, sensors lining the walls of a room determine that methane gas has a concentration exceeding a certain parts per million (ppm) threshold in a northwest corner of the room. A computer system receives this data from the sensors, determines coordinate locations for the northwest corner, and designates this corner with a SLP where binaural sound externally localizes. The binaural sound provides warning sounds that enable a person to determine a location of the methane gas or a location with a highest concentration of the methane.

A large number of objects within an area or time frame can also be difficult to quantify or visually observe. Example embodiments provide a solution for observing large numbers of objects using binaural sound instead of or together with visual observation. Multiplicities of objects can have SLPs positioned at each of the multiple objects resulting in multiplicities of SLPs such as clusters or clouds of SLPs.

Multiplicities of SLPs playing varied sounds can produce musical chords, complex tones and rhythms, harmonics, colored noise, and other acoustic and musical effects. The sound of these effects change as a listener changes position relative to the SLPs. The complex sound phenomenon and artifacts resulting from multiple SLPs can carry or indicate a wide variety of additional meaning or information to a listener.

Consider an example in which an object identification system analyzes time-lapse 3D video microscopy and provides red blood cell objects with different SLPs and different sounds. A biologist views the 3D video with a HMD, and each normal red blood cell of the multiplicity of red blood cells identified in the video is assigned a SLP that plays one tone, and each sickle cell is assigned a SLP that plays another tone. By looking around the 3D video the biologist may be unable to grasp the magnitudes of the two types of red blood cells because he sees too many cells to estimate and/or because each cell is visible only briefly as it passes through the view of the 3D video. He may also be unable to discern the locations and/or times of more of less density of sickle cells relative to healthy or normal cells. By listening to the multiplicity of instances and locations of the two tones over time, the biologist is able to determine, for example, that the population of normal cells remains approximately constant through the video. The biologist also determines through the sound that a population of sickle cells increases around an area located at (−50°, 35°).

Figure 4:
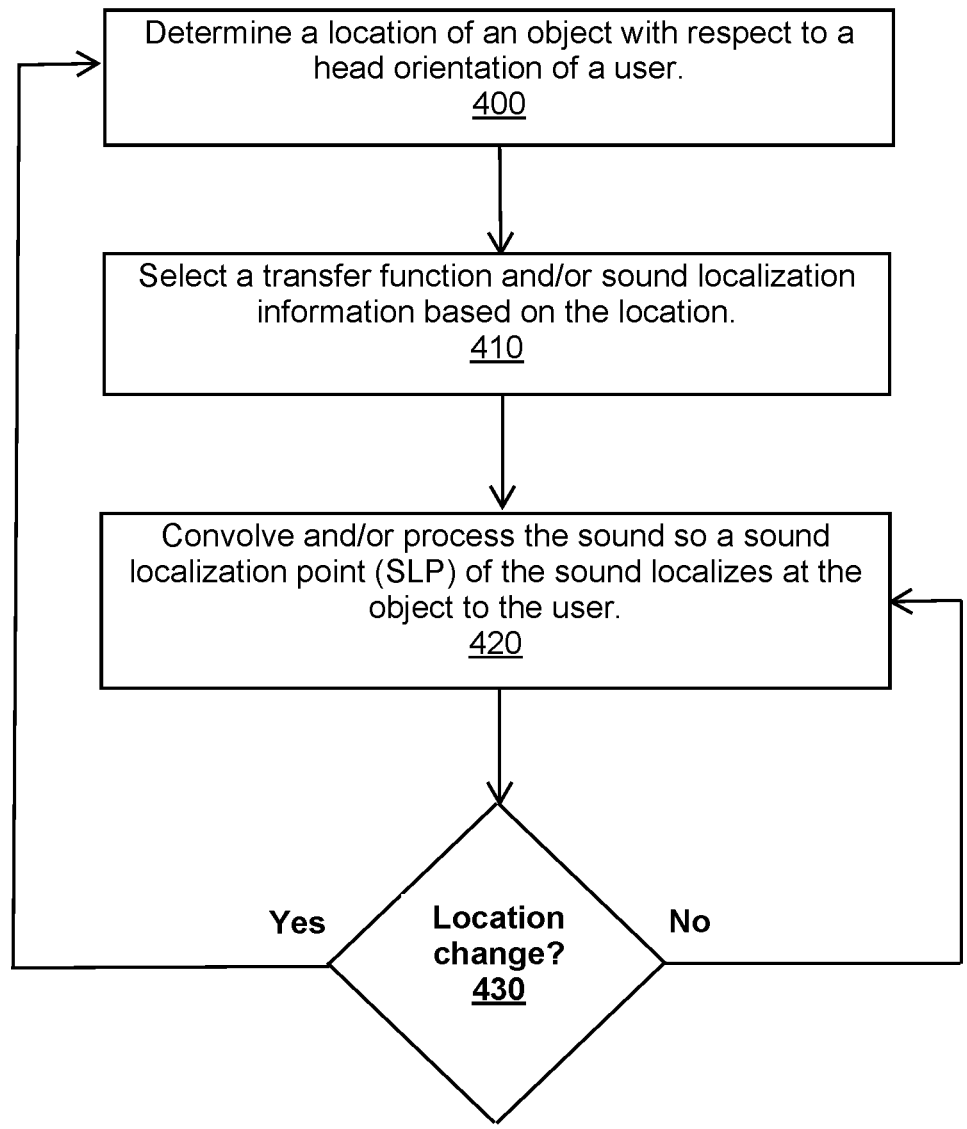
FIG. 4 is a method to convolve sound based on a head orientation to a physical object in accordance with an example embodiment.

FIG. 4 is a method to convolve sound based on a head orientation relative to a physical object.

Block 400 states determine a location of an object with respect to a head orientation of a user.

An example embodiment executes head tracking to determine a head orientation of the user. The head orientation of the user is correlated with a location of the object to determine which transfer functions are appropriate so sound will localize at the object for the user.

Block 410 states select a transfer function and/or sound localization information based on the location.

An example embodiment selects one or more interaural time differences (ITDs), interaural level differences (ILDs), HRTFs, or other transfer functions based on the difference between the head orientation of the user and the location of the object with respect to this head orientation.

Consider an example of a spherical coordinate system in which the user is located at an origin (0, 0, 0). The object is located at (2.0 m, 45°, 0°) with respect to the origin. The user, however, has a head orientation with a line-of-sight directed at an azimuth angle of −20° and an elevation angle of −20°. With respect to the head orientation and line-of-sight of the user, the object is located at (2.0 m, 65°, +20°). Left and right HRTFs with these coordinates are selected so sound will localize to the user at (2.0 m, 45°, 0°) while the user has a head orientation with a line-of-sight at −20° azimuth and −20° elevation.

Consider an example in which a user holds a smartphone and looks in a direction where the smartphone is pointed. When the smartphone and hence user have a compass orientation of 90° (East), the object is located counterclockwise from the user at 5° (almost true north). A difference between these directions is 85° in the counterclockwise direction or toward a left-side of the user. An interaural time difference (ITD) is calculated for a head rotation of 85° of the user. When sound is convolved with the ITD, the sound will appear to the user to originate at the location of the object.

Block 420 states convolve and/or process the sound so a sound localization point (SLP) of the sound localizes at the object to the user.

The SLP localizes at the physical object, near the physical object, or in a direction of the physical object. A SLP does not have to be an actual point, such as an exact, identifiable location known to the user. Humans can, in some instances, localize binaural sound to such points. For example, a user hears a glass break on the floor and can point to a location on the floor from where the sound of the breaking glass occurred. In other instances, however, sound localizes to discernable areas. For example, the user can point to an area from where the sound originated but does not know of a specific or exact location within this area. Additionally, sound can localize to a specific or a general direction. For example, a user hears sound that emanates from his left side, or from an Eastward direction, or from above his head. In this instance, the user may not know a point or may not be able to discern an area; instead, the user knows the direction from where the sound originated.

Block 430 makes a determination whether the location changed.

If the answer to this determination is "no" then flow proceeds back to block 420.

If the answer to this determination is "yes" then flow proceeds back to block 400.

When the user or the object moves, then a head orientation of the user changes with respect to the location of the object. When this change occurs, an example embodiment retrieves another set of transfer functions or otherwise alters how the sound is convolved in order to compensate for or resolve this change in relative position between the head orientation of the user and the location of the object.

Consider an example in which the user wears a HMD that includes earphones and a smartphone inserted into the HMD. The earphones and the smartphone wirelessly communicate with each other through Bluetooth. The smartphone includes GPS tracking and head tracking that includes a compass and inertial sensors (e.g., a chip with an accelerometer, gyroscope, and magnetometer). Once the smartphone determines or receives a location of the object with respect to a location or head orientation of the user, the head tracking in the smartphone provides head orientation information to a processor in the smartphone that calculates a relative location of the object with respect to the head orientation of the user. The smartphone also includes a memory that stores HRTFs of the user and a digital signal processor (DSP) that convolves the sound based on the head movements and head orientation of the user with respect to the object. In this manner, sound continues to be heard as if from the object in real-time even as the user moves or changes the head orientation. Each time a head orientation changes with respect to the object, the processor or DSP retrieves a new set of HRTFs with the corresponding angles and distance relative to the object from the user.

Consider an example in which a user is Alice and a physical object is a person named Bob. Alice and Bob wear wireless earphones that communicate with their respective smartphones. Alice and Bob are separated by one kilometer and are walking to meet each other while they talk to each other on a telephone call. During the telephone call, their smartphones share their GPS locations in real-time, and they each hold their smartphone so that their orientation matches the orientation of their respective smartphone (e.g., both Alice and Bob hold their smartphones in front of them). Alice sees a location of Bob on a map displayed on her smartphone, and Bob sees a location of Alice on a map displayed on his smartphone. Bob's voice localizes to Alice at a directional location corresponding to his physical location with respect to Alice, and Alice's voice localizes to Bob at a directional location corresponding to her physical location with respect to Bob. As they walk toward each other, Alice walks north and sees on the displayed map that Bob is physically located one kilometer from her and about 45° azimuth or northeast of her location. His voice thus convolves to a SLP that is 1.0 meter forward of Alice at an azimuth of 45°. This azimuth represents an angle of where Bob is located with respect to the direction faced by Alice and her smartphone. Bob walks south and sees on the displayed map that Alice is physically located one kilometer away and about 45° azimuth or southwest of his location. Her voice thus convolves to a SLP that is 1.0 meter outward from Bob at an azimuth of 45°. This azimuth represents an angle of where Alice is located with respect to Bob's heading.

In this example of Alice and Bob walking toward each other while talking on the phone, the SLP of the voice corresponds to the visual location of the other person on the display. Thus, Alice sees on her display that Bob is about 45° azimuth or northeast of her location, and this location is where the SLP for Bob's voice occurs. Bob sees on his display that Alice is about 45° azimuth or southwest of his location, and this location is where the SLP for Alice's voice is positioned. During the telephone call, the SLPs of the voices track or follow the direction that is toward the physical location of one party to the telephone call, relative to the orientation of the smartphone of the other party.

Consider further the example of Alice and Bob walking toward each other while talking on the phone. Alice wears headphones and has an electronic device that determines her head orientation including a compass heading of her face. Alice is walking north, and Bob is physically located northeast of her at about 45° azimuth. If Alice changes her head orientation or her direction of walk, then the corresponding angle between her face and Bob will change. The SLS moves the SLP of the voice of Bob to compensate for this change so his voice continues to localize to the direction of his physical location relative to the orientation of the head of Alice. For instance, if Alice stops and turns to her left 90°, then the angular difference between her and Bob is 90°+45° or 135°. The SLS retrieves the new HRTF pair and convolves Bob's voice so the voice continues to localize to Alice in the direction of his physical location with respect to her head orientation. Alternatively, the SLS processes the voice with a different ITD to compensate for the change in her head orientation.

An example embodiment thus selects SLPs and convolves sound based on a physical location of a user with respect to a physical object together with head orientations or directions that the user is facing. Consider an example in which an electronic device of a user (e.g., a smartphone or OHMD) receives and/or exchanges one or more of GPS location, IPS location information, head orientation information, and a compass direction of travel.

Figure 5:
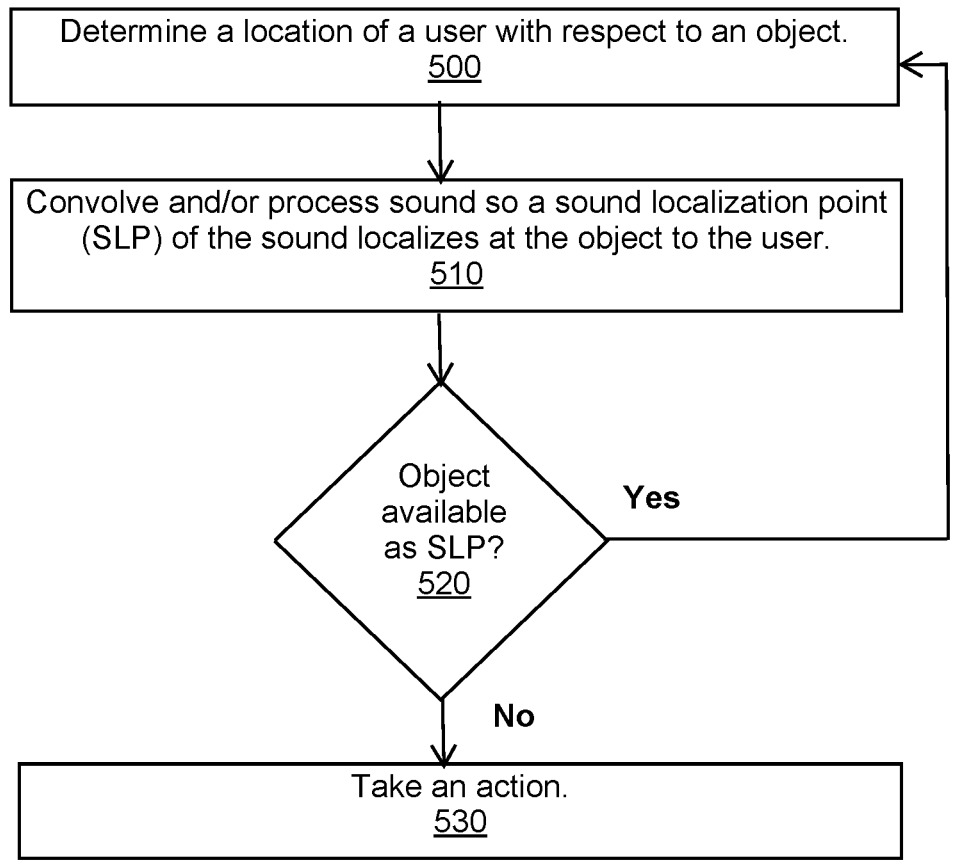
FIG. 5 is a method to take an action when a physical object is not available as a SLP in accordance with an example embodiment.

FIG. 5 is a method to take an action when a physical object is not available as a SLP.

Block 500 states determine a location of a user with respect to an object.

An example embodiment tracks one or more of a location of the user, a head orientation of the user, a location of the physical object, a compass direction of motion or travel of the user and/or the physical object, a distance between the user and the physical object, and an orientation of the physical object. Further, some objects can have tops and bottoms or bases, left and right sides, near and far sides, backs, fronts or faces (e.g., a side with information, a distinctive side, an operative side). As such, objects can have orientations. For example, a person, animal, or electronic device with a head, such as a robotic person or animal has an orientation with respect to its head and face. The computer system or electronic system calculates, determines, correlates, and stores the locations and/or orientations with respect to each other and/or the user.

Block 510 states convolve and/or process sound so a sound localization point (SLP) of the sound localizes at the object to the user. Block 520 makes a determination as to whether the object is still available as a SLP.

In some situations, the physical object may no longer be available as a SLP for the user. Examples of these situations include, but are not limited to, the user being too far away from the physical object (e.g., the user being farther than a predetermined distance), the physical object not being in a line-of-sight or field-of-view of the user, loss of power at the physical object, loss of communication or network connectivity between the physical object and another electronic device (e.g., loss of wireless communication between the physical object and a HPED or WED of the user), a change in use of the physical object (e.g., the physical object is an empty chair and someone sits in the chair), an obstruction or interference with the physical object (e.g., another physical object moves between the user and the physical object), the physical object is unavailable (e.g., the physical object is a person that can no longer serve as a SLP), the physical object is busy (e.g., a processor of the physical object cannot timely respond to requests), a restriction or law prohibits or discourages use of the physical object as a SLP, a better or preferred physical object is available as a SLP (e.g., user preferences prefer one physical object over another physical object), the physical object is no longer needed (e.g., the physical object functioned as a SLP for a single use or single time), passage of a predetermined amount of time (e.g., the physical object changes after expiration of an amount of time), and the physical object moves or disappears (e.g., the physical object is a dog that runs from inside a house to outside the house).

If the answer to this determination is "yes" then flow proceeds to block 500.

If the answer to this determination is "no" then flow proceeds to block 530 that states take an action.

Examples of action include, but are not limited to, one or more of selecting another physical object, selecting a virtual object, stopping or pausing a software application or program, stopping or pausing a sound, changing a sound spatialization being provided to a listener (e.g., switching from binaural sound to stereo or mono sound), modifying a sound being provided to a listener (e.g., fading or muffling the sound from an SLP that becomes occluded), notifying the user with sound (e.g., providing a verbal and/or audio notification), notifying the user visually (e.g., providing an image, a different image, screen flash, or other display event), notifying the user with another electronic component (e.g., an LED or tactile feedback device), notifying another user (e.g., the person or user whose speech was being played at the SLP), sending a network announcement or electronic message (e.g., an email or instant message), adjusting a tabulation of objects or score (e.g., increasing the points in a game), adjusting a computation process priority (e.g., reduce the processing resources devoted to convolving or maintaining the SLP), adjusting a network scheduling or bandwidth or other communication resource (e.g., stop or pause transmission of an incoming audio stream).

Consider an example in which Alice wears wireless earphones and receives a telephone call from Bob while she sits in her office. Based on GPS and/or IPS information, a telephony application executing on her smartphone determines that Alice is located in her office and consults her user preferences to determine that she prefers to have Bob's voice localize to an empty chair at (1.0 m, 35°, 0°) from her current location. The voice of Bob will continue to localize to this SLP as long as Alice remains seated in her office. When Alice stands up and walks away from the chair during the phone call, the telephony application takes an action. In this instance, her user preferences indicate a designation to switch the call from externally localizing at the chair to localizing internally. As such, the voice of Bob changes to be provided to Alice in mono sound through the wireless earphones.

Figure 6:
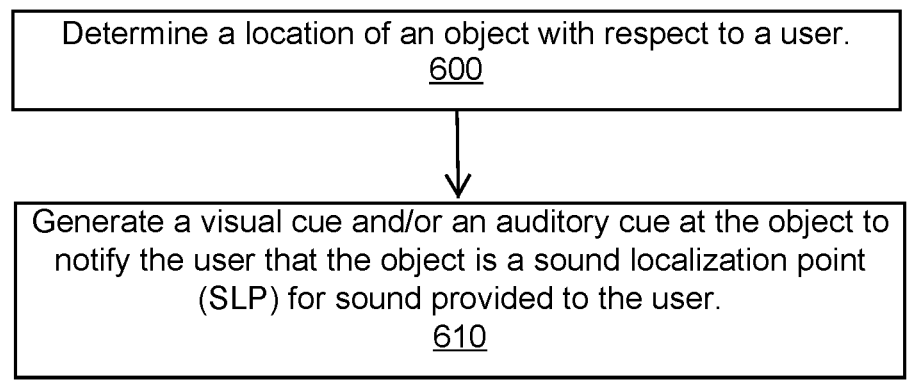
FIG. 6 is a method to generate a visual and/or auditory cue at an object that is a SLP for sound provided to a user in accordance with an example embodiment.

FIG. 6 is a method to generate a visual and/or auditory cue at an object that is a SLP for sound provided to a user.

Block 600 states determine a location of an object with respect to a user.

The object may be proximate to the user (e.g., within a few meters) or farther away (e.g., ten meters, twenty meters, fifty meters, one hundred meters, several hundred meters, one kilometer, etc.). Further, the object may be a real, physical object, a VR object, or an AR object.

As noted, this location information includes, but is not limited to, distance between the object and the user, GPS or IPS location information, a head orientation of the user and/or an orientation of the object, and directions of movement.

Block 610 states generate a visual cue and/or auditory cue at the object to notify the user that the object is a sound localization point (SLP) for sound provided to the user.

The visual cue and/or auditory cue is generated at, on, or near the object to represent or note a location of the object to the user. Such a cue assists in identifying the object to the user, reminding or notifying the user of the object, locating the object, or performing other tasks discussed herein. For example, a visual cue displayed on a PED shows the user where the object is located, and audio informs or indicates (such as via localized sound) where the object is.

In some instances, the listener may not be able to distinguish at which object the sound is localizing. This confusion could occur if several possible objects are near or next to each other. Consider the example above in which the telephone call localizes to a toy animal. If several toy animals are clustered together, the listener 30 may not be able to determine at which toy the sound is localizing. In this situation, an example embodiment provides a visual cue so the user can see which one of the toys is coincident with the SLP. For example, the particular toy animal is highlighted with color or temporary visual indicia so the user sees which animal is perceived as talking. In this example, the listener is provided with both the voice of the caller stuck to the object and a visual cue stuck to the object to designate and assist the user to determine the particular object at the localization of the sound.

As explained, in some instances, the object is a physical or real object, and the visual cue is a visual indication that distinguishes the object to the listener. In other instances, the object and the visual cue are both computer, application, or electronically generated, and neither one is physical or existing in the physical environment of the listener. In these situations, the visual cue may also serve or function as the object.

Consider the example above in which the listener receives a telephone call while being in the room. One option was to localize a voice of the caller to a point in empty space. As noted, the listener may not prefer this option since the listener is not accustomed to talking to an empty area of space or disembodied voice. Another option was to localize the voice of the caller to an object in the room. The listener may not prefer this other option, or a suitable object may not be available or determinable.

An example embodiment solves this problem and provides an additional option for localizing sounds. To solve this problem, an example embodiment provides the listener with a visual cue in the form of a three-dimensional image of the source of sound. This visual cue (which is also a virtual object) appears at the location. For example, a HMD, OH MD, WED, PED, or a server renders the virtual object at the location from the point of view of the listener in empty space where the listener localizes the sound. The listener, from his or her point-of-view, in this case, does not experience talking to a point in empty space, but experiences talking to an image of the caller. This image is both the object and the visual cue. This visual cue looks like the source of sound (e.g., the visual cue looks like the caller), or the visual cue is another image that does not resemble the source of sound (e.g., an image that merely signifies the location of the caller but does not actually look like the caller).

In some instances, the object and the visual cue are both computer, application, or electronically generated but the visual cue and the object that represents the source of sound are not the same. For example, the listener is provided with two different visual cues. As one example, one visual cue is the image of the caller and the other visual cue is a 3D speech bubble that displays the text of the speech as the speech is played.

Consider again the example in which the listener receives a telephone call while being in the room. When the call arrives, a blinking light or other type of visual indication visually notifies the listener as to a location where the voice of the caller will localize. This notification is the first visual cue that informs the user where in empty space the voice of the impending call will localize. Thereafter, when the telephone call commences, a second visual cue in the form of a 3D image of the caller appears at the location of the first visual cue. In this manner, the first visual cue provides the user with the visual indication of the location where the image of the caller (here the second visual cue) will appear. In this example, the second visual cue is the object to which the listener identifies and localizes the source of the sound.

These examples illustrate how the object and visual cue can be virtual or real and how different combinations of a real object, a virtual object, and one or more different virtual visual cues and objects can work together with example embodiments.

The object and/or the visual cue improve an accuracy of localizing sound for the listener. Consider an example in which the listener is provided with electronically generated binaural sound or binaural sound that generates from a physical sound source at a location with different room impulse responses than the physical or virtual environment of the listener. If the listener were asked to point to the location of the SLP using binaural audial cues without the object or the visual cue, the listener might point to a location that is aside or inaccurate by several degrees or inches. When the visual cue or object is provided, however, the listener points to a precise location or object from where the sound is heard to emanate. Further, as noted above, some listeners prefer to localize sound to a real or virtual object, as opposed to localizing sound to an empty area of air or virtual space that does not include a real or virtual object of focus.

Consider an example in which the audio from the source is human speech. Without a visual cue or object with which to associate the sound, the listener may be distracted by the uncertainty of the position of the localization. This distraction can cause the listener to miss information in the speech. With the aid of a visual cue or object according to an example embodiment, this distraction is eliminated so the information in the speech is received with greater integrity, certainty, and comfort.

Objects or areas that have a relation to the sound function as the object and/or visual cues. Alternatively, objects or areas that have no relation to the sound function as the object and/or visual cues.

As an example, an object is provided to be a real person when the sound is a voice. This situation could occur even if the person is not actually the source of the sound, but the SLP is positioned so the person is perceived to be the source of the sound to the listener.

Consider an example in which the listener receives a telephone call and prefers to localize the voice of the caller to a real person near the listener. In this instance, the real person serves or functions as a proxy person for the caller. From the point-of-view of the listener, the voice of the caller originates from a person that is near the listener even though this person is not the actual speaker during the telephone call.

In an example embodiment, the listener controls movement of the visual cue to select a particular object as the SLP. For example, the listener interacts with a user interface to move the visual cue to a specific physical object, and this selected object becomes the physical location at which the sound is heard to localize by the listener.

Consider the example above in which the listener receives a telephone call with an HMD while located in the room with a plurality of toy animals. The HMD includes a camera that presents a real time image of the room to the listener. When the telephone call commences (or before the call commences), the listener interacts with an interface of the HMD to move the visual cue to a location of a specific one of the toy animals. The HMD determines the coordinates of this location with respect to the listener and recognizes this object (such as executing object recognition or detecting a radio frequency identification (RFID) tag). Thereafter, the HMD convolves the voice of the caller so that for the listener the voice seems to emerge from the selected toy animal.

As noted, the visual cue can be controlled by the listener or controlled by another program or process to designate or select an object or a location for where the sound will localize. Alternatively, the visual cue can be controlled by both the listener and another process, software application, or program.

Consider further the example in which the listener receives a telephone call while in the room. An IUA or IPA of the listener selects one of the toy animals as the object to which the SLP of the voice of the caller will stick. The IPA plays or generates a cue (in this instance, an auditory cue) at the SLP. The auditory cue is a ping or other short sound that notifies the listener that the IPA has selected this location, or the object at this location, as the SLP for the voice of the caller. If the listener takes no action, then the voice of the caller localizes to the object (here the toy animal) selected by the IPA. The listener, however, can change the SLP to the location of another object or to other coordinates (e.g., empty space), such as by issuing a voice command to the IPA to change objects or locations of the SLP. The listener issues the command before or after answering the call.

This example shows both an electronic process or software application (here the IPA) and the listener (here a real person) interacting together with the cue (here an auditory cue) to select an object where the sound will be heard from.

As noted, instead of a visual cue, an auditory cue also serves to inform the listener of an object or intended location for a SLP. Consider again the example in which the listener receives a telephone call while in the room. The listener hears the telephone ringing about three feet in front of his or her face and to the right. This ringing is an auditory cue to indicate that the listener is receiving an incoming call. This ringing also indicates where the voice of the caller will localize when the listener answers the call. For example, the telephone ringing sound (or other sound notifying the listener of an incoming call) occurs at the coordinates of the SLP or at the object selected for the sound of the voice of the call (e.g., in empty space proximate to the listener or at a physical object proximate to the listener). When the listener answers the call, the voice of the caller sounds to the listener as though the sound is coming from the same spot from where the ring sound came. This similarity in localization occurs when both sounds are convolved to the same SLP. In this way, the ring sound provides an auditory cue as to where the voice sound will also localize to the listener. The listener knows in advance where the voice of the caller will localize when the call is answered.

A user can designate certain sound sources or sound types to localize at consistent specific locations that are not at objects. After a pause or after a user confirmation, the SLP then relocates to an object. For example, a user designates incoming call alerts to localize to a familiar and consistent SLP at (1 m, 20°,−30°).

When the user receives a call, the user's perception of the auditory cue at this SLP alerts him or her that the sound that is localizing is a telephone call. The user would thus recognize the sound as an incoming call regardless of the type of sound that plays as the auditory cue. The user is not startled by the externalized sound because he or she is accustomed to hearing externalized auditory cues from this SLP at (1 m, 20°, −30°). During the playing of the auditory cue, the SLP selector executes to select a qualifying object for the SLP taking into consideration the identity of the caller. After a number of seconds, the SLP selector moves the SLP of the auditory cue to the selected object. Alternatively, the SLS moves the SLP to the selected object upon the event of the user accepting the call, and/or confirming the relocation of the SLP.

The visual or auditory cue provides specific information (such as selection or indication of a particular object) or general information (such as a direction or general location, such as a region). Consider again the example in which the listener receives a telephone call while in the room. An image provides a visual cue and/or a sound provides an auditory cue that appears behind the listener and over their right shoulder. This indication provides directional information that informs the listener that the call too will be observed by the listener to originate from this direction or from this area.

When the location of the SLP is not in a line-of-sight or field-of-view of the listener, then an example embodiment provides the listener with directional information that instructs the listener where to look or how to change his or her head orientation in order to face or visually observe the SLP. For instance, an arrow or flashing light on a display of electronic glasses or HMD instructs the listener to turn his or her head in a particular direction to see the visual cue or SLP. The listener is thus provided with information regarding which direction to turn his or her head in order to see where sound will be localizing to the listener or is localizing to the listener.

Example embodiments automatically select for a listener the visual cue and/or the object, such as a physical object proximate to the listener or remote from the listener. For instance, such an object is a best or optimal or preferred or desired object based on different parameters or factors, such as a location of the listener, objects near or proximate to the listener, a time of day, previous or historical user preferences of the listener or third parties, the type of sound, source of the sound, the content or subject of the sound (e.g., as determined by evaluating words and sentences from speech recognition), and other factors discussed herein.

In an example embodiment, an electronic system or a sound localization system (SLS) identifies or creates objects proximate to or away from a listener that are suitable as SLP locations. A user interface (including audial and/or visual interfaces) designates or passively suggests to the listener an association between the object or objects and a SLP. The SLP is coincident with the object or proximate to the object, and either case invokes the effect of localization reinforcement for the user.

Example embodiments are not limited to designating physical objects for SLPs but also include virtual objects, physical areas, virtual areas, areas on an object, a particular part or portion of an object, or other things that are sensed by a person. Thus, although example embodiments discuss objects for SLPs, this term is illustrative of a wider category of things. Further, these objects can exist on the listener (such as a watch on the listener's wrist), near or proximate to the listener (such as being from 0-2 meters from the listener), or being farther (such as being greater than 2 meters from the listener).

In example embodiments, physical and/or virtual objects are selected by the listener and/or by a process, application, or electronic device. Further, selection of the object occurs passively (without communicating with the object or without negotiating with the listener) or actively (by communicating directly or indirectly with the object or by asking the listener regarding the location). An example of passive selection includes object recognition or facial recognition. Here, an electronic device recognizes the object and uses this recognition as a factor in determining whether or not to localize sound to the object. An example of active selection includes communicating with the object (e.g., when the object is a smartphone) or communicating with an electronic device or identifier near or with the object (e.g., communicating with a radio frequency identification (RFID) tag, bar code, tag, radio or infrared transmitter, or other device on, near, or with the object).

In an example embodiment, a (SLS) operating as part of the electronic system scans or surveys an area for physical objects (including people and electronic devices) and itemizes the objects in memory. Alternatively, the SLS retrieves locations of objects from memory (such as from cloud storage or from an electronic identifier on or with the objects, e.g., a RFID, tag, or wireless communication device). The SLS then makes a determination if one or more objects are suitable to be associated as a SLP and/or a virtual microphone point (VMP), and then presents or displays a visual cue to assist the listener in identifying or recognizing the object as the SLP and/or VMP. The SLS also triggers the displays of the suitable or available objects so the listener can select an object for a SLP.

The visual cue is displayed to the listener for a short period of time or a long period of time. For example, the visual cue is a flash or a blink. Alternatively, it remains longer, such as several seconds, one or more minutes, one or more hours, etc. This length of time can be predetermined, such as displaying the visual cue for five seconds. Alternatively, the amount of time can be based on other events, such as, display the visual cue until the listener acknowledges or recognizes the location for the SLP and/or VMP, display during an event (e.g., display while a phone is ringing), display while an advertisement plays, display according to a length of time or rule per a third party, IUA, or IPA, display until the listener turns his or her head to a head orientation or field-of-view or line-of-sight that includes the visual cue. Furthermore, the visual cue can be a one-time occurrence (such as to appear when an electronic call commences with a third party or to appear when an IPA speaks). Alternatively, the visual cue can display repeatedly, such as displaying periodically, continually, continuously, upon the occurrence of an event (e.g., an event detected in the physical environment of the listener, an event occurring in an AR or VR software application, the detection of a sound, etc.). As noted, the visual cue can also serve as both the visual cue and the object itself.

An example embodiment designates a physical object in the environment of the listener as the SLP for sound being provided to the listener. For example, an electronic device provides a visually recognizable event to the listener, such as turning on, activating a light, changing color, blinking, presenting an augmented reality (AR) image, etc. In this manner, the object itself temporarily functions as or provides the visual cue to the listener.

Consider an example in which a SLS or IPA instructs a home appliance or television to activate in order to gain attention of a listener and notify the listener that sound will be localizing or is localizing to the home appliance or television.

An example embodiment suggests or constrains a set of objects as selectable or acceptable for a SLP according to one or more factors (e.g., object location, head orientation, user preferences, or other factors discussed herein). For example, an application directs the SLS to localize a sound at a specific coordinate. In this case the SLS has several options including but not limited to: indicating with a visual cue a physical object found at the coordinates, indicating with a visual cue a virtual object found at the coordinates, not indicating a physical or virtual object with a visual cue, creating a virtual object and/or visual cue at the coordinates, and determining to use as the physical or virtual object one that is within an acceptable range of the required coordinates.

The listener can also make the designation of the object as the SLP and/or VMP. For example, gaze tracking software that executes on a HMD tracks an eye gaze of the listener to a specific object and designates the object as the SLP and/or VMP.

An example embodiment or the listener designates or creates an object and/or visual cue that the listener sees on, through, or resulting from an electronic display. For example, the object and/or visual cue appears as a two-dimensional or three-dimensional image (e.g., a photo or icon) on a display of a head mounted display (HMD), electronic glasses, a head mount for a smartphone, a laptop computer, a smartphone, or another electronic device. For example, the listener designates or selects an object that is captured by a camera of a smartphone, and this object appears on the smartphone's display as being the object of and the location for the SLP.

Visual cues and/or objects also aid in illustrating the location of virtual microphone points (VMPs) in order to improve the experience of sound capture with VMPs.

The visual cues and/or objects can also have a variety of different sizes and shapes, including different 2D and 3D shapes. Further, such visual cues and/or objects can be stationary, moving, and/or dynamic with respect to any of size, shape, and position (such as a visual cue and/or object that changes size and shape and moves from the point-of-view of the listener).

Further, the visual cue can track an object to which the visual cue is assigned or designated and move with the object. Alternatively, if the listener moves with respect to the object, then the SLP remains fixed to the position of object. In this manner, the SLP sticks to or adheres to the object. Regardless of movement of the object and/or the listener, sound originates from the location of the object for the listener.

For example, a SLP is assigned to a pet animal (such as a dog, cat, or other pet). As the dog moves, the SLP moves together with the movements of the dog so the SLP tracks or follows at the dog. In this way, sound continues to emanate from the dog. The visual cue also follows the dog and the SLP. The visual cue is periodically activated to remind the listener of the dog's location or that the dog is the current SLP. The visual cue also reminds the listener that sound is currently being localized to the dog. For example, when the visual cue is off, this state signifies to the listener that sound is no longer localizing to the object which, in this example, is the dog.

Consider an example in which the sound is a constant or periodic sound of a tinkling bell, and the SLP is assigned to a cat so that the listener hears the location of the cat when the cat is not within view of the listener. The sound of this bell is played as a background sound or upon request or command of the listener. For example, the listener listens to music with wireless earphones or engages in a telephone call with the earphones. As the cat moves around the house, the sound of the bell localizes at the cat, and this sound is played to the listener through the earphones periodically to inform the listener of the location of the cat. Alternatively, the sound of the bell plays to the listener when the listener activates an icon or issues a command to play a sound at the SLP of the current location of the cat.

The listener can also have a multitude of visual cues and/or objects that simultaneously display to the listener to assist in distinguishing different sounds at different SLPs. For example, during a telephone call with multiple people, the listener designates a different physical object near the listener to represent a different person on the telephone call. Each object has a unique visual cue to assist the listener in remembering which object is associated with which voice on the telephone call. The visual cue activates when its respective object is talking or takes another action, such as to activate when a new caller or new voice is on the telephone call, to activate when a caller or party disconnects from or leaves the call, etc. For example, two users configure an "always on" full-duplex telephony connection between them, so that the voice of each user is sent to the other user without repeatedly requiring a user to initiate a connection. Because they are not constantly conversing and not constantly wearing earphones, a user's transmission of speech may go unnoticed by the other user. In this example, the visual cue is activated by speech detection on the inbound sound. Alternatively, the visual cue is activated by sound activation above a certain threshold of signal strength of the incoming audio from the sound source. In this way, the visual cue at the display of the user (such as desktop monitor or HMD) alerts the receiving user that the other user is presently speaking so that the receiving user pays attention, dons headphones, or adjusts the volume.

Further, visual cues are moved and re-assigned to different objects, and SLPs are moved and re-assigned to different objects. For example, during a telephone call, a listener designates an empty chair (the object) for the SLP of the voice of the caller. A visual cue, in the form of an image of the caller, appears on the empty chair near the listener. During the call, the listener's roommate sits in and occupies the chair. This act triggers the SLP and the image of the caller (e.g., the visual cue) to move to an empty location on a nearby couch.

As another example, the listener interacts with a user interface of a PED and designates the empty chair for the voice of the caller before the call (e.g., as a default SLP or object for the voice of a caller), and the visual cue appears at the empty chair. While a call is not in progress (such as before the call), the visual cue of the image of the caller is illustrated differently than during the call. For example, the visual cue is the image of a caller illustrated with fifty percent (50%) transparency so that the image of the caller appears translucent or ghostly, or, the image of the caller is one with the eyes of the caller closed or sleeping to indicate an inactive connection state or a battery charging state. During this time before the call, the roommate sits in the chair. This act triggers the SLP and the differently illustrated image (e.g., the visual cue) to move to the couch.

Further, specific visual cues can be assigned to specific objects. This assignment assists the listener in quickly identifying the location of the object and a type of communication or sound. For example, a listener designates a specific image or emoji as the visual cue for telephone calls without respect to a location of the specific image, and this designation is stored in memory as part of the user preferences. When this visual cue flashes or is rendered on some object, the listener immediately knows that sound heard at the object will be from a certain sound source, such as a voice from a telephone call or a voice of a specific user. The listener identifies the type of sound that will be played at the visual cue, such as an incoming call or an incoming call from a specific user from several types of observation. Some examples include the following: the position of the visual cue, the object or type of object at which the visual cue is placed, the appearance of the visual cue, and a combination of these observations.

Consider an example embodiment in which the visual cues are controls, such as real or virtual toggle buttons, graduated sliders, radio buttons, or other interface controls included in an audio augmented interface. For example, a listener activates a toggle control by activating a visual cue (e.g., by selecting the visual cue) in order to issue a prearranged command to an executing process. By adding visual cues to SLPs, a listener has a wide area in his spatial environment for many controls, and the activation of the controls are indicated to the listener by visual or auditory localization or both.

Figure 7:
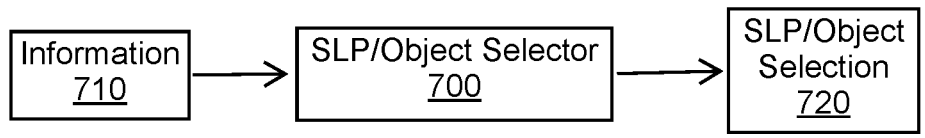
FIG. 7 shows a sound localization point (SLP) and object selector that determines which object to select and where to localize sounds in accordance with an example embodiment.

FIG. 7 shows a sound localization point (SLP) and object selector 700 that determines which object to select and where to localize sounds in accordance with an example embodiment. The SLP and object selector receives input information 710 about one or more of the object, the user, the sound, and other information discussed herein (e.g., information discussed in connection with block 210). The SLP and object selector analyzes this information and determines or generates, based on the analysis or content of this information, an output selection 720. By way of example, this output selection includes one or more of different objects to function as a SLP (e.g., if multiple different physical objects are available for a SLP or if the physical object is not known or designated), SLPs, HRTFs, BRTFs, RTFs, or other impulse responses to apply to the sound (e.g., for convolution/deconvolution of the sound).

The SLP and object selector select a general area or location for the sound (e.g., place the sound so it externally localizes to a right side of a user) or a specific location (e.g., place the sound so it externally localizes to a specific SLP or with a specific pair of left and right HRTFs). The SLP selector also selects a SLP so the sound localizes to a particular object (e.g., a physical object that is within two to three meters of the user).

When a SLP and/or object is selected, then the SLS retrieves a corresponding HRTF for the selected SLP and/or object. If a SLP does not have HRTFs, then HRTFs are computed, calculated or captured for the SLP (such as interpolating a HRTF pair between two or more known neighboring HRTFs in order to correlate a HRTF for the selected SLP). Further, as noted herein, the SLS moves sound without a pair of HRTFs (e.g., by altering an ITD of the sound to change an azimuth angle of the SLP relative to the user).

A user, processor, system, electronic device, process, or software application (e.g., an IUA or an IPA) functions as the SLP and/or object selector to select one or more physical objects or SLPs that provide a location where sound will localize to the user. As one example, the user selects a physical object being displayed to the user for where to externally localize sound by interacting with a UI or a display of an electronic device, such as a smartphone, a HMD, or OHMD. As another example, a computer program or process, such as an IUA or IPA, selects one or more objects and/or SLPs where sound will localize to the user.

The SLP selector receives as input and/or queries the OS or other system resources to obtain for consideration the information 710. By way of further example, this information includes, but is not limited to, one or more of current time and/or date, user location, positional and orientation information of a user, context of a user (e.g., in a car, in a meeting, offline, HMD mounted, headphones active), user information, active sound and localization information, and other information discussed herein. The user information includes information from one or more storage devices, memory, databases, or other information sources and includes one or more of user preferences, call logs, localization logs, and user contact lists.

In an example embodiment, the SLP selector has access to other information that the SLP selector processes or considers in order to make localization or impulse response selections and object selections. The other information includes, but is not limited to, the other active SLPs or audio segments currently localizing or assigned for localizing and the HRTFs or RIRs corresponding to them, VMP coordinates and properties, other objects that currently have an assigned SLP or visual cue, SLP and VMP coordinates and properties of other users (e.g., the SLP of the voice of the user relative to another user in contact with or contactable by the user), the current time and date, the location of the user, the position of the user in the environment relative to other objects such as microphones and speakers and barriers such as those that bear on attenuation and reverberation or audio feedback, contexts of the user or situational information (such as in a car, driving a car, in a meeting, sleeping, on duty, performing a strenuous or hazardous activity, on public transportation, having an active head-tracking system, being in a visually rendered space such as wearing a HMD, etc.), and other information available to an example embodiment.

In addition, the example embodiment has access to memory or storage, such as one or more databases for referencing and/or updating. One such storage is a contact list (for example a personal contact list of the user) that includes other people and users and other contact information along with SLPs, HRTFs and/or IRs already designated for convolving the sound of a contact. Another storage is a call log or localization log that includes a historic archive of sound files, inbound sound streams, or audio segments played or playing to the user, such as voices and other sounds along with SLPs, HRTFs and/or other IRs processed to convolve the sounds or audio segments, and other information about the events when a sound or audio segment was played or localized to a user. Another storage is the preference database of the user that provides preferred SLP designations that the SLP selector returns as output, or considers when making a designation that compares and weighs multiple factors.

After the SLP and object selector 700 provides the output selection 720, the selector directs one or more of the storage locations to be updated with the information about the designation instance. For example, a HRTF is designated for an audio segment that includes the voice of a new friend of the user, and the localization log is appended with the identity of the new friend, the HRTF designated, the object to which the voice was assigned, the visual cue selected, and other call information. The user's contact database is updated with the HRTF and/or the object and/or the visual cue as a default SLP and/or visual cue for future conversations with the friend. The user's preferences are updated to include the knowledge of the HRTF, SLP, object and visual cue assignments for the friend, the time of day, location, and other circumstances bearing on his preference.

Consider a number of examples that illustrate the SLP selector designating localizations based on various combinations of limited or specific knowledge.

An example embodiment determines a SLP and object by considering one or more of a sound source, an identity of a voice, a current time of day, call history, and the presence of another SLP. Based on this information, the example embodiment creates a SLP at a location of an object or in a general area expected by the user (e.g., a location or area in empty space about one meter from a face or head of the user). For example, Bob receives a call at 9:00 A.M. The caller and sound type are not determined. The SLP selector consults Bob's localization log and determines that 60% of telephone calls received between 8:30 A.M. and 10:00 A.M. are localized to a certain HRTF-1. In response to this determination, the SLP selector outputs HRTF-1 as the designation for the sound of the call. While still on the call Bob receives a call from the automated weather reporting service. The SLP selector determines from the weather service record in Bob's contact list that calls from the weather service are set to auto-answer and considers a default localization of HRTF-1. The SLP selector consults a list of currently active SLPs and determines that HRTF-1 has already been provided to an active convolution process (for an audio segment on a current telephone call). The SLP selector includes a rule that avoids localizing the audio from more than one sound source or audio segment to one SLP, and so the SLP selector consults Bob's localization or call log for an alternative SLP that would not surprise Bob. An examination of the localization log, however, determines that Bob has not localized the weather service voice to other SLPs besides HRTF-1. The SLP selector calculates a new alternative point for the localization of the incoming voice from the weather service by adjusting two coordinates of the usual SLP of the weather service (HRTF-1). The distance is increased by 2 feet, and the elevation is increased by 15°. The adjusted HRTF is output by the SLP selector, sent to the DSP, and processed to convolve the sound of the weather-reporting voice. Bob hears the weather report at a location shifted from the usual location but at an adjusted location that is not unexpected.

An example embodiment determines a SLP and associated object (if one is selected) by considering a context of a user, and weighing observations from the call history of a user without knowledge of the identity of a caller. As an example, Bob receives a call at 9:00 A.M while he is wearing a HMD. The caller and sound type are not determined. The SLP selector consults Bob's localization log and determines that 70% of telephone calls received between 8:30 A.M. and 10:00 A.M. are localized to a certain HRTF-1 that corresponds to an image of a person displayed in a VR world through the HMD. When Bob receives a telephone call in the morning while wearing his HMD, the SLP and object selector selects HRTF-1 so the voice of the caller localizes to the image of the person in the VR world.

An example embodiment determines a SLP and RIR by considering a GPS location of a user and position and orientation of a user in a room, and without knowing the identity of a voice or music type. As an example, Alice receives a broadcast of speech sound, and left and right channel stereo music audio segments while she is supine at Jazz Hands, her regular massage spa in her regular room. The speaker in the voice segment and the sound type of the music are not identified. During her massages, Alice prefers to hear voices emanate at approximately the surface of the 3.5 m high ceiling while she is relaxing face up on the massage table. The SLP selector consults Alice's localization log and determines that when Alice is at the current GPS coordinates (at the street address of Jazz Hands) she localizes music internally and speech at (3 m, 0°, 0°). Based on her location and the sound types determined in the audio segments on the incoming broadcast, the SLP selector designates the voice segment to localize at (3 m, 0°, 0°) and the left and right music segments to localize in stereo. Later, Alice is moved to a massage table beside the wall in a different room that has a ceiling height of 2.5 m. The computer or electronic system detects or is notified of the event of the location change and retrieves updated positional information, such as an indication of the new room dimensions and her position and orientation in the room. The SLP selector adjusts the SLP of the speech segment to a distance of 2 m to localize at the object of the new lower ceiling. Due to the new information that a large flat solid object (a wall) is directly to her left, the SLP selector outputs a designation for an appropriate RTF. The RTF is convolved with the sound of the speech to mimic a reverberation that Alice would hear due to the close proximate wall if the sound were originating in her physical environment. Alice continues to hear the stereo music in stereo sound without change. She hears the speech sound changed to sound as though it emanates two meters away, from a ceiling-mounted speaker object near the wall that is at her left.

An example embodiment determines SLP placements and activations by considering a head orientation of a user relative to a device and relative to his or her body orientation. For example, Bob is in his home office where a personal computer (PC) is in front of him on his desk and a smart TV is facing him on his right. His WED headphones with orientation tracking are coupled to his PC and to his TV. A SLP selector designates the audio sources incoming from his TV to two "virtual speakers," a SLP-Left1 and a SLP-Right1 that are located at fixed positions to the left and right of his head relative to his head. When Bob's head faces his PC, the incoming stereo audio from his PC web browser is assigned by the SLP selector to localize at two "virtual speakers," a SLP-Left2 and a SLP-Right2 that are located at fixed positions to the left and right of his PC relative to his PC. When Bob turns his head or his body in the chair to face away from his PC (such as to face his TV) the change in the data from the orientation tracker triggers the SLP selector to evaluate the coordinates of Bob's new orientation and to pause or mute the audio segments incoming from his PC. Bob hears the TV audio to the left and right of his head, but he does not hear the PC audio unless he is facing the PC. Bob monitors the TV audio while he works on his PC and when he turns to face the TV he no longer hears the PC audio until the time that Bob returns his gaze toward the PC. The SLP selector makes determinations of the locations and activations of the four SLPs according to the audio sources and the location and orientation of Bob's head. Bob's IPA speaks an alert notifying Bob of an impending appointment and the SLP selector designates the voice for localization at his left shoulder relative to his shoulders. When Bob faces the PC, he hears the sound from each of the five SLPs. When he turns his head to face the TV, without moving his body, the SLP selector mutes or pauses the audio segments from his web browser, continues to localize the TV segments at HRTF-Left1 and HRTF-Right1, and adjusts the HRTFs for the localization of the IPA sound to compensate for the change in Bob's head orientation. As such, Bob continues to perceive the voice of the IPA rendered at his left shoulder.

An example embodiment determines a SLP location by weighing multiple possible default designations and by considering a location of a user relative to a stationary device. In another example, Bob exits his home office, walks to the kitchen, puts some frozen peas in a microwave oven to defrost, walks back to his desk and continues to work. When the peas are defrosted ten minutes later, the smart microwave appliance calls Bob by triggering an alert composed of artificial speech to play on Bob's PC. This sound alerts him that the microwave oven's task is complete. The OS of the PC passes the sound of the alert to an audio segmenter that determines existence of a single segment of sound from the sound source (speech) and assigns a segment identification (ID) to the audio segment. The segment ID of the audio segment is passed to the SLP selector, the SLP selector looks up the audio segment ID, and finds that the sound source is the smart appliance application that communicates with the microwave. The SLP selector consults the user preferences, contact list, and localization history but finds no record of localizing the smart appliance sounds. The SLP selector discovers that a default SLP specified by the smart appliance application exists for sounds triggered by the smart appliance application. The default SLP is fixed at the microwave door with respect to the microwave. The SLP selector translates the default SLP location at the microwave in the kitchen to a location relative to Bob's head located in Bob's office fifteen meters away. The SLP selector confirms that the proposed object for the SLP (the oven) fifteen meters away from Bob's head does not conflict with another current localization. The SLP selector assigns the SLP to the microwave oven. Bob in the home office hears a voice in the kitchen speak, "Your food is no longer frozen."

The SLP selector output may result in no change in the sound of an audio segment. In calculating a SLP that provides a familiar experience to a user, an example embodiment decides not to localize an audio segment of a known sound type, even if default SLPs exist for the sound type. The example embodiment also weighs a context of a user with safety regulations, restricts a localization in consideration of an environment of a user, and prioritizes multiple contexts. For example, Bob is playing a game that includes binaural sound on his HPED while his self-driving car drives him through the city. The sounds from the game are not passed to an audio segmentation system or audio diarization system so the game sounds exist to the HPED OS as a single audio segment of two-channel binaural sound. The OS passes the segment ID for the sounds from the game to the SLP selector. The SLP selector is unable to find additional localization information or references associated with the sound source or audio segment, such as a sound type or default SLP specified by the game application. Bob has not previously modified the localization of the game sound through his HPED SLS, and no records of such an event exist. If the SLP selector designated a new SLP for the game sound, Bob would find the new location unfamiliar. The SLP selector then has no directive to localize the game sound to an object, and the binaural game sound is output to Bob without convolution by the SLS and this results in a consistent experience for Bob. Later in the drive, the car switches to human assisted mode in an area with road construction. The automobile computer system notifies Bob's SLS of the change in Bob's context from "car passenger" to "car driver." As required by safety regulation in Bob's area, the SLS adjusts active sound segments to output as internalized sound. The sound of the game is switched from binaural sound that localizes to Bob to mono sound that does not externally localize to Bob. Later in the drive when externalized sound is permitted in the car, Bob calls Alice. The SLP selector looks up the SLP assigned by default to audio segments that include the voice of Alice. The SLP selector determines that the default SLP for Alice's voice is beyond the perimeter of the interior of the car where there are no stationary objects due to the motion of the car. So as not to provide an unexpected localization without an object, the SLP selector reduces the distance coordinate of the default SLP to a value within the perimeter of the interior of the car and selects a stationary object within the car. The SLP selector is aware that Bob's context is still inside a car. So as to provide a familiar audio experience, the SLP selector designates a RIR for convolving Alice's voice segment and Bob hears Alice's voice with a reverberation matching the acoustic characteristics of the car.

This example embodiment selects SLPs and RIRs by considering both a physical location and virtual location of a user. For example, Bob parks the car and turns off the engine during his conversation with Alice and continues to localize her voice at an object within the car. Her voice is convolved with RIRs that match the acoustic qualities of her voice to the acoustic qualities that her voice would exhibit to Bob if Alice were in the car together with him. Alice asks Bob to meet her at a virtual place called BarVR, a visually rendered virtual space with a ceiling height of ten meters. Bob dons a HMD, virtually navigates to and enters BarVR while sitting in his car, and sees with the HMD display the visual representation of Alice in BarVR. Bob selects the visual cue of Alice and issues a command to open an audio connection, and this command initiates a binaural telephone call to Alice. Alice accepts the call request and greets Bob with, "Hi Bob, it's so much more comfortable in here!" The telephony software application that has established the call, streams Alice's greeting to Bob's device. An audio segmenter begins to diarize the incoming sound stream from Alice and identifies and establishes a single voice segment and assigns a segment ID for the voice segment. The voice recognition system calculates a sound ID for the voice. The segment ID and sound ID are submitted to a SLP selector. The SLP selector looks up the segment ID and finds that the audio segment's source is the telephony application. The SLP selector looks up the sound ID and finds that it matches the voice of Alice in Bob's contact database. The SLP selector finds the default SLP associated with Alice in the contact record for Alice in Bob's contact database. The SLP selector also determines that a first context of Bob is "car passenger" and a second context for Bob is "HMD active." Although the default SLP for Alice has a distance coordinate that is greater than the diameter of the interior of the car, the SLP selector recognizes or determines that Bob's second context supersedes the first context. Accordingly, the SLP selector returns the coordinates of the default localization for Alice that it retrieved from Bob's contact database so that Bob hears the voice of Alice from a point that is farther away than the car doors around Bob. This point of localization is not unexpected by Bob, however, because it is consistent with the environment he sees with the HMD. Although Bob is located inside his car, he perceives himself within the room of BarVR and the placement of the voice of Alice is at a 3D image of Alice that is the visual cue for the voice of Alice. Additionally, the SLP selector determines to convolve the voice of Alice with RIRs. Convolving the voice causes Alice's voice to sound to Bob as if both Bob and Alice are in the BarVR with a ceiling height that is ten meters high.

An example embodiment determines a SLP location by considering the probability of sound arrival times, a location of a user, and the nature of the location. For example, Bob is subscribed to a binaural audio tweet service called Floating Head. At unpredicted times throughout the day and night, the Floating Head client application executing on his HPED receives binaural audio messages from the service and plays them. Before Bob hears the audio files, the SLP selector consults Bob's localization log and learns that usually sounds that come from the Floating Head client application are localized at objects two meters from Bob. The localization log data also shows that Bob is usually at home when he receives the sounds. One day, Bob is at the airport and receives a sound from Floating Head. The SLP selector retrieves data from Bob's phone indicating that Bob is at the airport, a crowded place. Based on Bob's location, the SLP selector makes a determination to assign a SLP that is one meter from Bob, and not at an object. The determination is made so that Bob does not experience the unexpected Floating Head voice in the crowded place at an object or localization where he might mistake the binaural sound voice for actual voices from the people around him.

The SLS, SLP and object selector, or other application consider one or more factors in selecting a SLP and determining where to place a sound for a user. By way of example, these factors include one or more of current time, location, position, orientation, the location and identity of other localized sounds, the current context of a user, identity of a software application, identity of a process making a request, identity of a voice or user, identity of an electronic device, and other factors discussed herein. Furthermore, these factors can be weighted equally or weighted differently in selecting a SLP.

Consider an example in which Alice receives a telephone call on her smartphone from an unknown telephone number while she is in her bedroom. The smartphone identifies the incoming audio input as a telephone call, and the SLP selector and/or object selector provides the call to Alice in monaural sound so it internally localizes to her. This decision to internally localize the sound is based on one or more of Alice's user preferences, and SLPs for previous telephone calls from unknown numbers to Alice. When Alice answers the call, sounds from the call internally localize to her. Bob then speaks as the caller, voice recognition software executing as part of the SLS recognize Bob's voice. The SLS provides to the SLP selector the new additional information about the sound source (in this case the identity of the caller). The SLP selector reevaluates the object designation for the sound source (in this case Bob's voice). The reevaluation results in the SLP selector designating as the object a toy animal that Alice has selected for localizing the voice of Bob in a prior call. The SLP selector and/or object selector determines a location of the toy animal with respect to Alice in the bedroom and moves Bob's voice to localize at the toy animal that is located proximate to Alice (e.g. 2.0 meters from her).

Consider an example embodiment in which the SLP selector and/or object selector are included on a chip with the DSP that is located in a HPED, such as a smartphone. The SLP selector and/or object selector query the OS and/or segment IDs to determine the application providing sound for localization. The SLP selector and/or object selector also analyze the sound to determine a type of the sound and/or a source of sound. Based on this information, the SLP selector and/or object selector assign a left and a right HRTF for the sound.

In an example embodiment, the SLP selector and object selector, or functions of the SLP selector and object selector, execute by or with a DSP or other integrated circuit. The SLP selector, object selector, functions of the SLP selector, and functions of the object selector are also executed using another type of chip, such as a field-programmable gate array (FPGA), microprocessor, microcontroller, or other type of architecture or central processing unit (CPU), such as a Reduced Instruction Set Computing (RISC) processor.

An example embodiment selects one or more visual cues and/or objects for one or more listeners. The SLP selector, object selector, and/or SLS executes a variety of different methods and/or factors or data to make these selections.

Consider an example in which the SLS includes or is in communication with one or more of a room scanner, sensor, camera, radio frequency identification (RFID) scanner or RFID reader, near-field communication (NFC) reader, object recognizer, or other type of electronic device. The environment of the listener is scanned, inventoried, modeled, reviewed, or analyzed for physical objects. The SLS catalogs or inventories the locations or positions of objects, RFID tags, electronics, or readable medium in the environment and stores the positions in a database together with the identity of each object, a description of or details about the object, such as color or surface character, a size of the object, an orientation of the object, a distance to the object, a type or kind of object, historic information about the object (such as whether the object was previously used as a SLP), and other data. This information is stored in a database, and the SLS analyzes this information to make informed decisions on selection of objects and visual cues for objects. This information can also be coordinated into a map, such as a 3D life-size 1:1 scale map wherein the objects are presented or displayed as in their respective locations at the physical environment.

The SLP selector weighs factors or data to assist in determining which object to select for which SLP. Consider an example in which the listener receives a telephone call from his mother. The listener's preferences or user preferences (based on previous telephone calls) suggests that the listener prefers to localize the voice of his mother to an object of an empty chair that is proximate to the listener, such as within 2-5 feet of the listener. The SLS scans the area proximate to the listener, finds an empty chair, and displays an image of his mother on the chair as a visual cue to indicate where her voice will originate at the SLP. Later, the listener receives a call from a third party whose voice also localizes to the chair. The listener elects to render no visual cue and instead prefers to talk to the empty chair.

Consider an example in which electronic devices in a home (including home appliances) are objects that communicate with the listener. Voices of the electronic devices appear to the listener to originate from the electronic devices. Each electronic device has a unique voice, and this voice localizes to the physical location of the electronic device in the house. Further, the voices are convolved or processed to the listener based on a distance and/or location of the listener with respect to the electronic device. When the listener is talking with an electronic device, a visual cue displays at, on, or near the electronic device to instruct the listener that this electronic device is currently on and talking to the listener.

Consider an example in which a listener stands in his kitchen and talks to his refrigerator. The voice of the refrigerator is processed so the voice originates from the location of the refrigerator to the listener, as if the refrigerator were a person at the refrigerator. The listener then moves to the next room and attempts to communicate with the refrigerator. This time, the listener hears the same voice of the refrigerator but the voice is heard to emanate from the kitchen. To the listener, the voice sounds like it is coming from the kitchen. To arrive at this audio effect, the voice of the refrigerator is convolved with RIRs and BRIRs and the distance of the listener and objects between the listener and the refrigerator are taken into account when altering the voice of the refrigerator.

Consider further the example in which the listener talks to the home appliance, the refrigerator. A visual cue at the refrigerator informs the listener that sound is externally localizing to the refrigerator. For example, a light on the refrigerator activates or blinks to visually inform the listener that the refrigerator is the home appliance talking. As another example, the listener wears a HMD, electronic glasses, or another type of wearable electronic device, and this electronic device activates a light or other visible indicia on, at, over, or near the refrigerator on a display so the listener sees what home appliance is talking. When the refrigerator is in the line-of-sight or field-of-view of the listener, the listener sees the light through the display. For instance, the display includes an AR representation that highlights the refrigerator so the listener readily sees what home appliance is active and talking.

Figure 8:
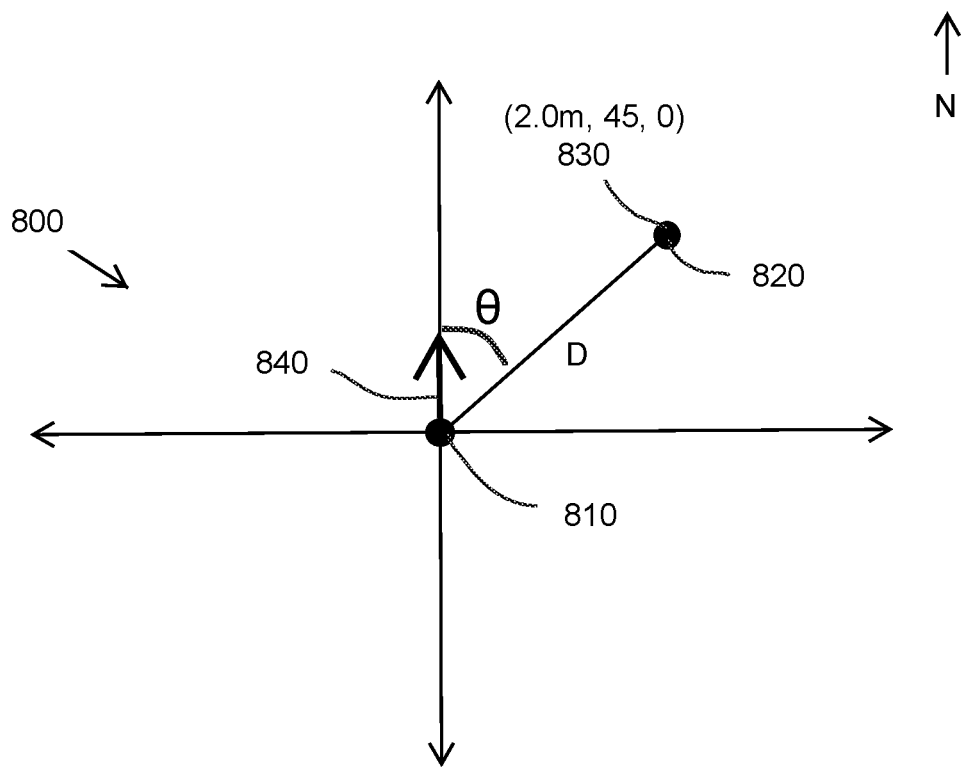
FIG. 8 is a coordinate system that shows a location of a user with respect to an object and a SLP selected for the location of the object in accordance with an example embodiment.

FIG. 8 is a coordinate system 800 that shows a location of a user 810 with respect to an object 820 and a SLP 830 selected for the location of the object (the SLP 830 being shown coincident with the object 820).

By way of example, the user 810 is shown at an origin, and the object is located a distance (D) from the user and at an angle (θ) with respect to a head orientation, direction of travel, or line-of-sight 840 of the user. For illustration, the user 810 is facing north; the object 820 located to a right-side of the user toward a northeast direction with θ being 45°; and the distance between the user and the object is D=2.0 meters. Based on this example information, the SLP 830 is selected as (2.0 m, 45°, 0°). When sound is convolved or processed with this location information, the sound will localize to the user at the SLP that is at the location of the object 820.

Figure 9:
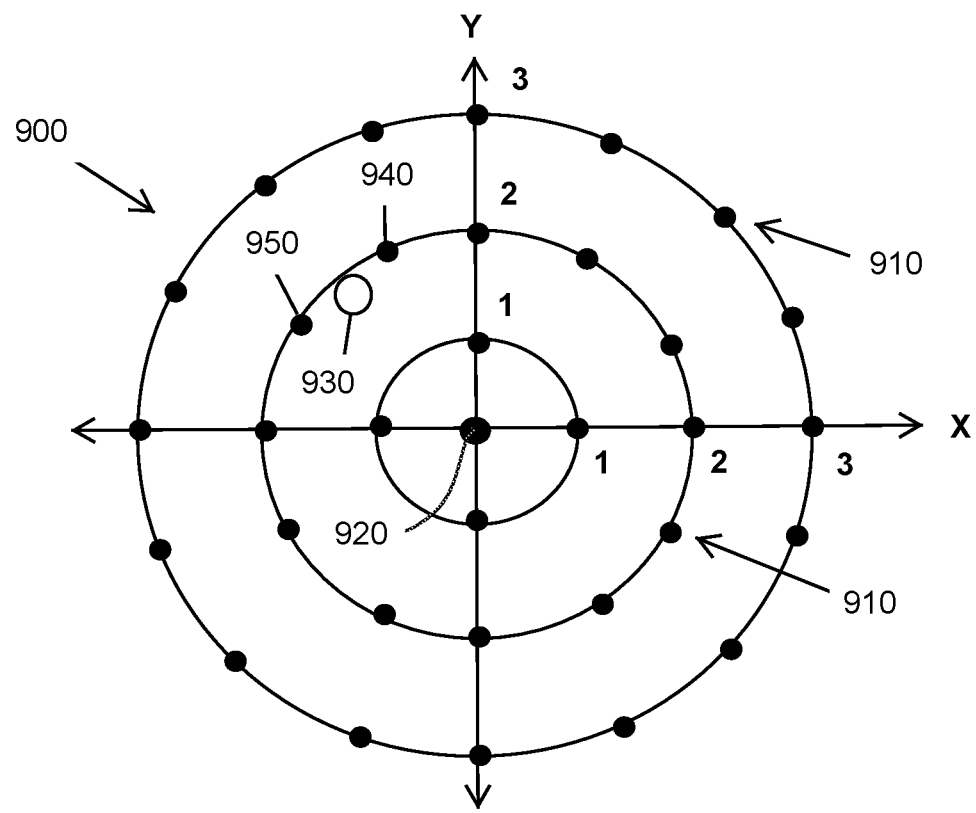
FIG. 9 shows a map of various SLP locations in accordance with an example embodiment.

FIG. 9 shows a map 900 of various SLP locations 910 (shown as dots or darkened circles) at various distances with respect to an origin location 920 (such as a user or an object). For illustration, three distances are shown at 1.0 meter, 2.0 meters, and 3.0 meters along the X-axis and the Y-axis, but other distances and other coordinate systems (e.g., polar or spherical) are also applicable.

An example embodiment selects a SLP that coincides with a location of the object. For example, the SLP matches, equals or approximates a location of the object with respect to the user's location and orientation so sound localizes to the SLP and hence to the object. If a SLP is not known for a particular location of an object, then a nearest or closest SLP is selected to approximate sound originating from the object. Further, a SLP and transfer function outputs are derived or calculated or estimated by interpolation from two or more known SLPs and transfer function outputs (e.g., when an object resides at a location between two known SLPs). As noted, this information is calculated in real-time, provided to an example embodiment, wirelessly transmitted, and/or stored in memory (e.g., stored in memory at the object, stored on a server, stored on a HPED or PED, etc.).

Consider an example in which an object 930 is located 1.9 meters away from a face of user 920 at a location shown in FIG. 9. The object 930 is not located at a known SLP but is near two SLPs (shown as SLP 940 and SLP 950). A software application executing binaural sound enables the listener to select SLP 940 or to select SLP 950 as the location to localize sound. Alternatively, the software application estimates an SLP for the location based on the known coordinates of its nearest neighbors (here, SLP 940 and SLP 950).

FIG. 9 shows a two-dimensional array of SLPs for a single elevation. These SLPs can extend around a location in a spherical shape, cylindrical shape, Cartesian matrix, or other lattice geometry. Further, as shown, these SLPs can exist in patterns or sequences at different distances from the face or body of the user.

Figure 10:
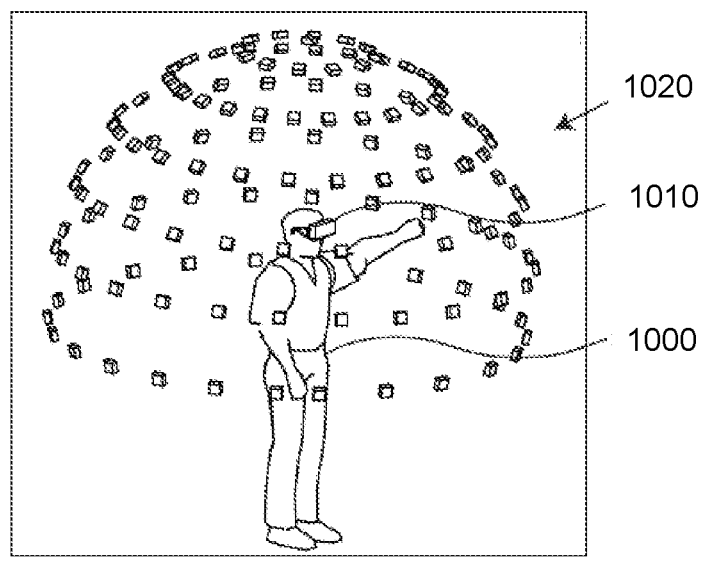
FIG. 10 shows a user wearing a head mounted display and being surrounded by a plurality of sound localization points in accordance with an example embodiment.

FIG. 10 shows a user 1000 wearing a head mounted display 1010 and being surrounded by a plurality of sound localization points 1020. By way of illustration, these SLPs 1020 extend around a head or body of the user in a dome, hemispherical shape, or spherical shape (though the SLPs can extend around the user in other shapes as well).

Convolving or processing sound in real time so the SLP tracks or follows the object is process intensive when the user and/or the object is moving. A large number of process executions are required, and the vastness of these executions slow or hinder sound localization to the user.

An example embodiment employs one or more of several techniques to solve this problem and improve execution performance of a computer. Example embodiments further include various solutions to increase performance of a computer, electronic device, and/or computer system executing binaural sound with example embodiments.

As one example, some types of sound or sources of sound are processed with servers in a network while the sound is in transit from a source electronic device to the electronic device of a user. Servers (such as those in a cloud or network) can offer faster processing or convolving of sound than local processors (e.g., a processor on a HPED or PED). For instance, for some sources of sound (e.g., telephone calls), the voice of the caller originates from the electronic device of the caller, transmits across one or more networks (e.g., the Internet), and arrives at the electronic device of the user. The electronic device of the user processes and convolves the voice of the caller with HRTFs of the user (or other sound localization information) and provides the binaural sound to the user. This process, however, can be expedited or processing resources conserved or limited at the electronic device of the user. Specifically, as the voice of the caller transmits across the network, servers process and/or convolve the sound with the HRTFs of the user (or other sound localization information) and provide the binaural sound to the electronic device of the user. One or more faster processors of the network or cloud servers convolve the voice after it leaves the electronic device of the caller but before it arrives to the electronic device of the user. The electronic device of the user saves processing resources.

As another example, sound automatically switches from binaural to mono or stereo and from mono or stereo to binaural sound based on head orientations of the user. For example, when a user tilts his or her head beyond a predetermined elevation angle or azimuth angle, the SLS takes an action, such as automatically internalizing the sound to the user or maintaining the SLP at a consistent point relative to the face of the user. For instance, the SLS decides not to move the SLP farther than the predetermined elevation or azimuth angle or ceases to adjust the SLP location for head orientation. These actions reduce processing and/or convolution of the sound.

As another example, when a predetermined number of SLPs are already being convolved or when a predetermined level of processor activity is reached, the SLS takes an action to limit further processing or convolution to reduce process execution. For example, when this level is reached, the SLS ceases or stops processing or convolving of additional SLPs. As another example, when a number of SLPs is exceeded, the SLS changes or adjusts a priority as to which sounds are convolved to externally localize as binaural sound and which sounds are processed to internally localizes as stereo or mono sound.

As another example, electronic devices (such as HPEDs, WEDs, or PEDs) of users share responsibility of convolving sound or convolve sound that plays at electronic devices of other users. For example, Alice and Bob talk to each other during a VoIP telephone call. The electronic device of Alice convolves the voice of Bob with her HRTFs and provides this voice as binaural sound that externally localizes to Alice. The electronic device of Alice also convolves the outbound voice of Alice with the HRTFs of Bob, and transmits her convolved voice to the electronic device of Bob that provides her voice to Bob as binaural sound that externally localizes to Bob. The electronic device of Alice thus performs processing tasks for Bob as opposed to the electronic device of Bob performing these processing tasks for Bob.

In another example embodiment, the SLS predicts SLP movement (e.g., as a result of a user head movement) and pre-convolves sounds to the predicted SLPs during times of low processor activity. If or when sound is requested at the SLPs, then delivery of the sound is expedited due to the pre-convolution.

Other examples are discussed herein.

FIG. 11 is a method to expedite convolving and/or processing of sound to localize at a SLP that is at an object in accordance with an example embodiment.

Block 1100 states determine a location of a user with respect to an object.

Block 1110 states prefetch, based on the location of the user with respect to the object, data to convolve and/or process sound so the sound localizes at a sound localization point (SLP) at the object to the user.

By way of example, the data includes, but is not limited to, one or more of HRTFs, HRIRs, RIRs, SLPs, BRIRs, user preferences for SLPs, user preferences for objects to which to localize sound, information about available physical objects proximate to the user, location information of objects and/or SLPs, information about SLPs and/or objects, and other information (such as information discussed in connection with block 210 and table 1200).

Block 1120 states preprocess and/or store the data to expedite convolving and/or processing of the sound to localize at the SLP at the object.

In an example embodiment, a preprocessor executes or processes the data. A preprocessor is a program that processes the retrieved data to produce output that is used as input to another program. This output is generated in anticipation of the use of the output data. For example, an example embodiment executes instructions that predict a likelihood of requiring the output data and preprocesses the data in anticipation of a request for the data. For instance, the program retrieves one or more files containing HRTF pairs and extracts data from the files that will be used to convolve the sound to localize at a location corresponding to the HRTF pair data. This extracted or preprocessed data can be quickly provided to a DSP in the event sound is convolved with the HRTF pair.

As another example, the processor requests a data block (or an instruction block) from main memory before the data block is actually needed. The data block is placed or stored in cache or local memory so the data is quickly accessed and processed to externally localize sound to the user. Prefetching of this data reduces latency associated with memory access.

Consider an example in which the location of the user with respect to an object is used to prefetch data. For example, a user is 1.5 meters away from an object that might serve as a SLP for a telephone call, game, voice of an IPA, or other external localization point. The object is at a same elevation as a head of the user. This distance of 1.5 meters remains relatively fixed, though the head orientation of the user changes or moves. In accordance with this information, an example embodiment prefetches SLPs and corresponding HRTF pairs having a distance of 1.5 meters with an elevation of zero degrees. For example, a processor (or other hardware or software) prefetches SLPs and/or HRTFs corresponding to (1.5 m, X°, 0°), where X is an integer. Here, the X represents different azimuth angles to which the user might move his or her head during sound convolution. For instance, a processor executes instructions to retrieve HRTF data corresponding to (1.5 m, 0°, 0°), (1.5 m, 5°, 0°), (1.5 m, 10°, 0°), (1.5 m, 15°, 0°), . . . (1.5 m, 355°, 0°). Alternatively, the processor executes instructions to retrieve other azimuth intervals, such as retrieving HRTF data for every 3°, 6°, 10°, 15°, 20°, or 25°. When the processor convolves the sound, the data for the particular azimuth angle has already been retrieved and is available in cache or local memory for the processor.

Consider an example in which a user has a smart speaker that includes an intelligent personal assistant (named Hal) that answers questions and performs other tasks via a natural language user interface. When the user is proximate to the speaker, the user can ask Hal questions (e.g., "What time is it?") or ask Hal to play music (e.g., "Play Beethoven"). Sound emanates from Hal's loudspeaker. When the user wears wireless earphones, however, the sound does not emanate from Hal's speaker. Instead, the sound is provided to the user through earphones, and the sound is convolved such that it localizes at the location of the speaker. In this instance, no sound is produced by Hal's loudspeaker. Instead, the sound is convolved to a SLP located at the physical object, which is the loudspeaker.

Consider a further example of the smart speaker, Hal, located in a room in a house of a user. When the user wears the wireless earphones and walks into the room, Hal wirelessly communicates with the earphones and determines that sound will be provided through the earphones and not through a speaker in Hal. Even though the user has not yet made a verbal request or command to Hal, the smart speaker (or an electronic device in communication with the smart speaker) executes software that tracks a location of the user with respect to Hal and retrieves sound data based on this location information. For example, this sound data includes a volume of sound to provide to the user based on the distance, an azimuth and/or elevation angle of the user with respect to the fixed location of Hal, and HRTF pairs that are specific to or individualized to the user. This information is stored in a memory cache component mounted against or near the DSP. If the user makes a verbal request to Hal (e.g., "What time is it?"), the distance and HRTF data are already retrieved and stored in the cache. In this instance, a cache hit occurs since the data requested to convolve the sound has already been retrieved. The DSP can quickly convolve the sound data based on the location of the user with respect to Hal so the voice of Hal localizes to the physical speaker. By way of example, the DSP includes a Harvard architecture or modified Harvard architecture with shared L2, split L1 I-cache and/or D-cache to store the cached data.

Caching data also improves computer performance (e.g., decrease processor execution time, reduce a number of instructions to execute, provide a cache hit on data for convolving sound, move data to be executed closer in proximity to the processor that will perform the execution, etc.). An example embodiment prefetches the data and/or caches the data so this data is available to the processor. This data provides a cache hit when requested. Further, the data is stored as local memory near or with the processor (e.g., the DSP convolving the binaural sound for the user).

Data can be stored in and retrieved from different sources and formats. Further, as noted herein, various factors are considered in executing methods in accordance with an example embodiment.

FIG. 12 shows a table 1200 with example data for a few factors considered for sound localization in accordance with an example embodiment. By way of example, the table 1200 includes seven columns with sample data. The columns are labeled as Object, Identity, Location, Distance to SLP, Sound Type, Sound Source, and User Preferences.

By way of example, object 0002 is identified as being a picture of the user's mother. This picture is currently located at (1.1, −5°, −10°) with respect to the user. A SLP is located on or at the physical location of the picture. Designations for the picture (e.g., historical or preferred designations) indicate a sound type of voice and a sound source of telephone. The user preferences indicate that telephone calls with the user's mother are preferred to localize to the picture of the mother when this picture is available.

In an example embodiment, the SLS inventories, tracks, locates, determines, stores, and/or retrieves information about objects and SLPs for one or more users. This information is stored in memory, such as a data table, database, or other form of memory.

Consider an example of an electronic device that identifies objects in a room of a user. For instance, the electronic device communicates with tags on objects, executes object recognition from video input, retrieves information from a room scanner, or determines information in accordance with an example embodiment. An object identifier assigns an object ID and notes and stores in memory the identity of the object, location, user preferences, history of designation as SLP, diameter of object, color, material, surface character, coordinates, orientation, and/or other information discussed herein.

A request is made to the sound localization system (SLS) to localize a sound at or proximate to a point $(r, \theta, \phi)$ relative to the listener. The SLS consults the table in order to find one or more objects at or near $(r, \theta, \phi)$. Selection of an object can be based on rankings, weights, points, hierarchy, etc. For example, the SLS selects a nearest object that has a SLP within a distance of 0.0 m-0.3 m. As another example, the SLS determines whether the user preferences or historical designation dictate selection of a particular object. As another example, qualification points are assigned to properties of objects having different coefficients, and the expressions are evaluated to determine which object has a highest qualification score.

As another example, the SLS selects one or more objects based on a proximity of the object to the user (e.g., select an object closest to the user, select an object within a predetermined distance of the user (such as within 1.0 meter of the user, within 1.0-2.0 meters of the user, within 2.0-3.0 meters of the user, etc.), select an object in a certain room, select an object nearest an electronic device, etc.). As yet another example, the SLS selects an object based on a line-of-sight of the user, head orientation of a user, or compass direction that the user is facing or moving (e.g., select an object within a line-of-sight of the user or field-of-view of the user, including those occurring in VR).

Additionally, the SLS can store and retrieve priorities of objects, rankings of objects, scores of objects, and other information regarding objects and execute this information to select an object and/or expedite process selection of the object.

Further, the SLS can calculate, determine, or select an object for localization when an actual request for a SLP is made or before such a request is made. The SLS can execute the process of object selection or object recommendation as a prediction to expedite the actual selection when the request is made. The SLS can also execute this task in parallel with other tasks discussed herein to decrease process execution time and selection of objects and/or SLPs. For example, scores or priorities for objects are stored at the object (e.g., on a tag or memory) or stored in memory that the SLS can access. When a user comes within proximity of available objects, the SLS retrieves the scores and prioritizes the objects before a request for an object is made. When a subsequent request for an object is made, the SLS already has an object selected to function as a SLP.

As one example, an example embodiment qualifies a suitable object according to a location of the object with respect to the user (e.g., $(r, \theta, \phi)$). For example, the SLS scans the location field/column of the object table. If the location of the object is within a predetermined distance and/or within a predetermined azimuth, or elevation, then the object qualifies as a candidate for the SLP. Coordinates of the object are assigned to the SLP. The SLS can also evaluate other potential objects in the object table to determine an object that qualifies as a SLP.

As another example, an example embodiment considers a type of sound that is, has been, or will be localized to the object (e.g., voice, music, alert sound, etc.). For example, certain objects are designated as SLPs for certain sound types or excluded as localization targets for certain sound types. For instance, pictures can only be SLPs for voice; displays can only be SLPs for voice and music; light switches can only be SLPs for alerts; toy animals can be SLPs for any sound type; etc. Further, such designations can be stored on the physical object. For example, a user affixes a tag to a teddy bear. The tag is programmable and communicates with a smartphone or OHMD of the user. This tag provides location information, identity information, and user preference information for what sound types and sound sources should or may localize to the teddy bear.

As another example, an example embodiment considers a source of sound (e.g., telephone call, IPA or IUA, advertisement, gaming application, software program, internet, etc.) that is, has been, or will be localized to the object. For example, the SLP selector executes a process that assigns qualification scores to objects according to their suitability as the SLP for a particular sound, sound source, or sound type. To arrive at the qualification score the process employs a weighting system that considers multiple properties of the object, the potential sound, and other factors. For example, the SLS predicts that three voice SLPs will be requested and the SLS triggers the SLP selector to qualify three objects for voice SLPs in the current environment of the user. Multiple objects are evaluated in parallel for the properties contributing to the qualification scores that are not interdependent. Similarly, multiple properties of the three SLPs are evaluated in parallel. For example one such object property is the position of the object, so each object in the environment receives a qualification score according to the suitability of its position in consideration of a sound source and sound type. Because the expected sound types are voices, the objects with locations near a zero elevation and between one and two meters from the user receive higher qualification scores for the property of position.

As another example an example embodiment considers an identity of the object and a nature or utility of the object. For example, can the identity of the object be intuitively associated with the sound at the SLP? For example, if the sound is a voice, an object identified as a head can be considered more suitable than an object identified as a cup.

As another example, an example embodiment considers one or more physical properties of the object such as shape, size, material, surface appearance, etc. For example, does the object have a shape of a head, a body, or an animal? Is a face detected on the object such as two eyes and a mouth? Does the object size or shape match the size or shape of the SLP? Is the object too large to serve as a visual cue for a SLP that is smaller? If the object is too large to match the size of the SLP, does the object include a marking on the surface that does match the size of the SLP? Is the object associated with a gender that matches or conflicts with a sound type gender? Answers to these questions can be considered in an algorithm when evaluating the physical object.

As another example, an example embodiment considers user preferences and historical usage of objects. For example, did the user previously use this object? Did the user previously not use an object, or prefer the object, or change to another object? Has a SLP been designated to the object at the previous time? If so, what type of sound (female voice, music, etc.) was designated?

As another example, an example embodiment considers an orientation of the object. For example, whether a front side or back side of the object is currently in a line-of-sight of the user.

As another example, an example embodiment considers whether the object is fixed or moving. For example, if the listener is stationary or expected to be stationary, then based on historical, predictive, or other information, is the object likely to move, or move beyond a threshold, during the localization? If the listener is not stationary or expected to move through the environment or change environments, is the object expected to accompany the listener?

As another example, an example embodiment considers whether the SLP is fixed or moving. For example, does the SLP move with respect to the listener's environment, the listener's body, or the listener's head? If the SLP is fixed relative to the listener's environment, is the SLP designated with a strict coordinate, or can the SLP be adjusted in the interest of improving the listener's experience? If the SLP can be adjusted, what are the limitations of the adjustment? For example, if the voice of Alice has been designated to localize at a certain position, but the position happens to be two feet away from a framed photo of Alice, can the SLP be adjusted to coincide with the photo?

As noted, various factors can be analyzed or considered to determine selection of an object and placement for sound localization.

Figure 13:
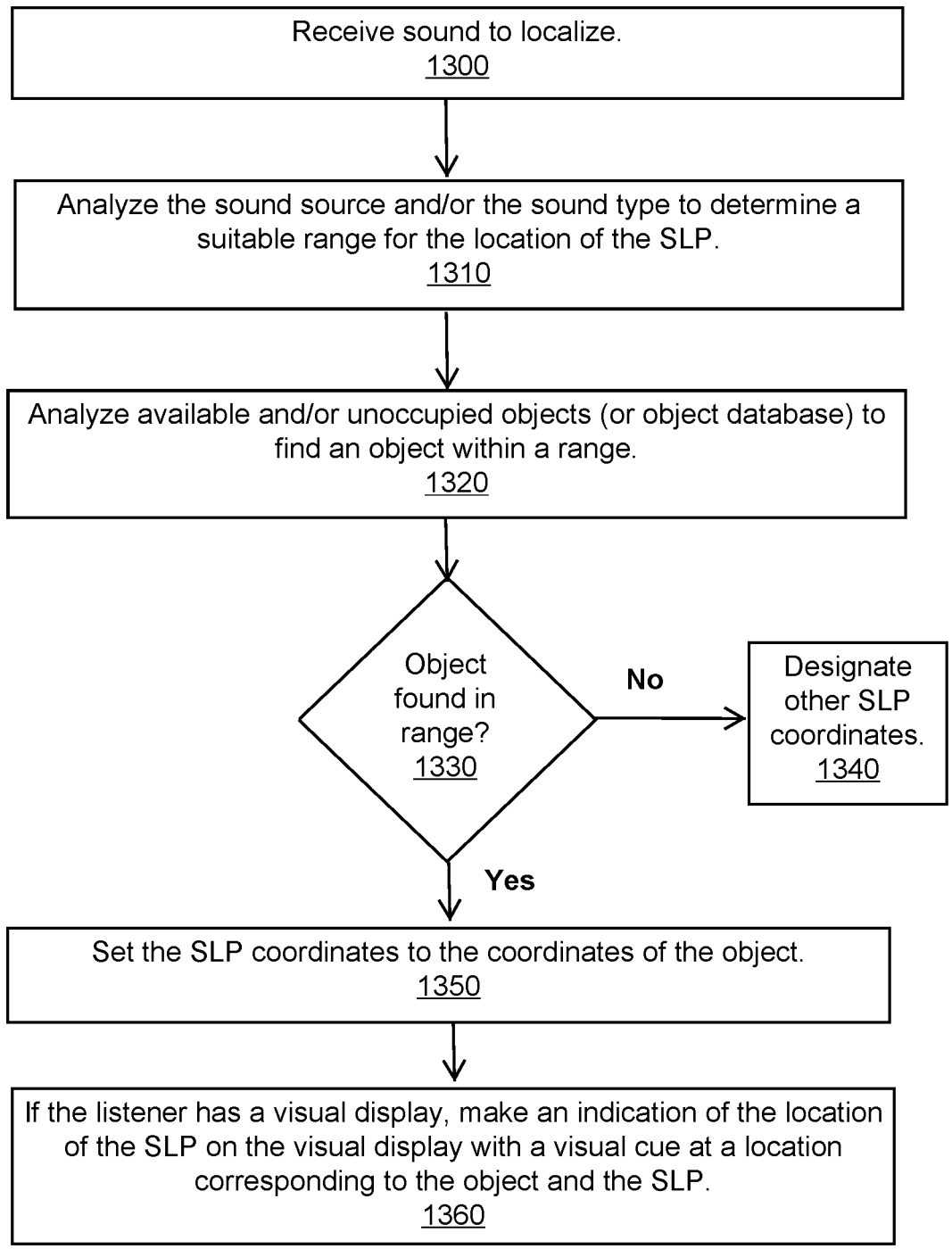
FIG. 13 shows an example embodiment in which a SLP is selected based on factors that include sound source, sound type, and range or distance to an object in accordance with an example embodiment.

FIG. 13 shows an example embodiment in which a SLP is selected based on factors that include sound source, sound type, and range or distance to an object.

Block 1300 states receive sound to localize.

For example, the sound originates from a telephone call, an IPA, a software application (such as a gaming application), an electronic device (such as a home appliance), a wireless transmission, etc.

Block 1310 states analyze the sound source and/or the sound type to determine a suitable range for the location of the SLP.

For example, the SLS makes a determination as to distances and/or angles or zone boundaries relative to the listener to determine a suitable object and/or location for the sound type. For example, if the sound type is a voice, a suitable SLP placement is in one or more zones corresponding to areas around the face of a listener that a person's head might occupy during a face-to-face conversation (such as a zone defined as the spherical coordinate region (1 ft to 5 ft, −40° to +40°, −15° to))+15°. If the sound type is music, then a suitable range could be 1.0 m-2.0 m.

Ranges for different sound sources and sound types are defined or determined from a user (such as a user inputting such range information into an electronic device through a user interface), another user such as an incoming caller, a software application (such as a VR or AR game having program instructions that specify or request preferred or usable ranges), an IPA or IUA, a computer (such as a server), the SLS, or another electronic device.

Block 1320 states analyze available and/or unoccupied objects (or object database) to find an object within a range.

For example, the SLS scans the area within the zone for objects, retrieves information or data about objects in the area, or determines object locations in accordance with other example embodiments discussed herein.

Consider an example in which the SLS consults an object table to identify visual cues that are suitable and available for association and coincidence with the sound from a source. If multiple objects meet the criteria or include designated factors, then one object is selected according to a rule base. Alternatively, the objects are already in the object table such as is discussed in table 1200, so that the object's coordinates and other information can be searched and retrieved. Objects and positional information can also be obtained or acquired in real time. For example, a camera in communication with or part of a smartphone or optical head mounted display (OH MD) or electronic glasses captures images of the location and simultaneously determines objects, distances to objects, relative motion of the listener, etc.

The SLS can consider various factors discussed herein, such as the suitability of an object and the object's orientation for a SLP according to the sound type or sound source. Suitability of an object selection is improved if the type of sound and/or the source of sound are known. For example, an application executing on an electronic device informs the electronic device that sound is available to be localized, and a pointer to the sound is supplied. The type of sound can be supplied to the SLS, or the SLS can sample the sound to determine a type of sound such as female voice, music, etc.

Block 1330 makes a determination if an object is found within the range. If the answer to this determination is "no" then flow proceeds to block 1340 that states designate other SLP coordinates. If the answer to this determination is "yes" then flow proceeds to block 1350 that states set the SLP coordinates to the coordinates of the object.

If an object is identified as suitable for a visual cue then the coordinates of the object are fetched (such as being fetched from memory, an object table, room scanner, tag, memory, or other resource) and assigned as the coordinates of the SLP. Alternatively, the coordinates are computed in real time, such as computing or determining the coordinates of the object upon detecting, sensing, or capturing the object with a camera.

Alternatively, the SLS continues to evaluate the qualification score of other objects or visual cues to establish suitability, or take another action. For example, the SLS scans the location field/column of each record/row of the object table. If the location of the object qualifies the object as a visual cue, then an action is taken. Some example actions are, adjust a qualification score for the object, designate the object ID as qualified, proffer or display the object to the user for confirmation, examine another field of the same object record/row, perform a lookup with the object ID in another table (e.g., recent localization log), display a visual cue at the object.

Block 1360 states if the listener has a visual display, make an indication of the location of the SLP on the visual display with a visual cue at a location corresponding to the object and the SLP.

As noted, the visual cue can assist the user in establishing which object is selected as being the SLP. An auditory cue can also be provided, such as providing audio to externally localize at or near the selected object.

By way of example, no objects may be found in memory or in the environment within a threshold distance of the requested SLP, such as in the table, from a database, from memory, from a cloud server, or from communications with the object, or from scanning the environment. In this instance, the SLS makes a determination to move the SLP to a near-proximate object. Alternatively, the SLS selects no object, such as selecting instead not to externally localize the sound, but to provide the sound so as to localize internally to the listener such as by providing the sound in stereo sound or mono sound to the listener. By way of example, the SLS makes a determination as to which of several listener experiences will be more accurate and/or less confusing: (1) the experience of localizing sound from a SLP in empty space at (r, θ, Φ), (2) the experience of localizing sound from a SLP moved to another point or points that coincide with a nearby object, (3) the experience of internally localizing the sound with stereo sound or mono sound, or (4) the experience of viewing a visual cue as the object at the SLP, such as on a hand-held, desktop, OHMD or HMD display of the listener.

If the coordinates of the SLP are set and cannot be changed, or are disallowed to be changed by the SLS for the purpose of nudging the SLP to the location of an object, another option is considered if an object is close to the SLP. For example, the SLP is not required to be strictly coincident with an object in order for a listener to associate the sound at the object. If a sound is within a certain threshold distance of an object, a listener perceives the sound as occurring at the location of the object rather than at the true coordinates of the SLP near to the object. If an object is available that is within the threshold distance in a particular circumstance, then the object is associated with the sound without adjusting the SLP coordinates to match the coordinates of the object. Here, another option is to associate the object with the sound origination point without adjusting the coordinates of the SLP. The listener is informed of the association, such as with a visual display device as described herein or an auditory cue.

The SLS informs or alerts the listener as to which object is associated with a sound or sound source (e.g., to which object the SLP is coincident, tracking, following, sticking, assigned, etc.). For example, the SLS illustrates on a display a temporary or persistent image that corresponds to the location of the object where sound is or will localize to the user.

Consider an example of a listener that wears an optical head mounted display (OHMD) such as electronic glasses and perceives a voice coming from the general area of his front, left. The SLS selects a flower vase to coincide with the SLP, adjusts the SLP to the location of the flower vase, and highlights the flower vase in yellow or another color to indicate that the vase has been selected for the SLP. In another example, the vase is highlighted during moments when the voice is convolved to the SLP at the vase, and not highlighted during moments without voice. For instance, when the caller speaks, the vase is highlighted. When the caller is silent, the vase is not highlighted.

Physical objects can be prioritized for designation as SLPs according to one or more of the factors discussed herein. The SLS selects objects according to an association with a sound type. For example, dolls, photos in frames, objects with faces (or recognized as faces by a face detector) are qualified or prioritized as a SLP when the sound type is a voice. Such a prioritized object can be selected as a SLP or provided to the user as a recommended SLP.

Objects that have a function associated with a sound source or sound type are prioritized as a SLP location for the sound source. For example, a loudspeaker object is prioritized as a default location for the SLP of a music source (even though no music, or another music or sound, is actually being generating by the loudspeaker). As another example, a location of a handheld portable electronic device (HPED) is prioritized as a SLP location for a voice source, a music source, or an alert sound. As another example, a specific type of object (such as a pencil, coffee mug, or a TV) is designated as the object for the SLP of an intelligent personal assistant (IPA).

Consider an example in which a listener receives a call from Alice, and the SLS is requested to assign a SLP for the voice of Alice. The SLS consults the contact list of the listener and retrieves the contact record for Alice in order find associations in available objects to qualify SLPs for the voice of Alice. The SLS also consults a table of available objects in the environment of the listener to find an object with an RFID tag or association to Alice. The objects with the RFID tags provide information on their location and availability as SLPs (e.g., a RFID tag stores information stating that it is available for localizing voice but not music). For instance, a facial recognition system identifies a face in a photo in a frame on the listener's desk as matching the face of Alice in the photo of Alice included in the listener's contact record for Alice. The SLS designates the coordinates of the photo of Alice in the frame for the coordinates of the SLP of the voice of Alice. The SLS instructs the frame to illuminate light emitting diodes (LEDs) that are included in the frame. When the call commences, the frame illuminates to visually indicate that Alice's voice will convolve such that it appears to emanate from the frame.

Visual or auditory cues can also benefit other parties that are not the listener. Consider an example wherein a listener is wearing earphones that insulate the listener from the sound of the physical environment. The earphones also have one or more microphones and a mic-thru option that the listener activates to hear the sounds in the physical environment or deactivate to block or cancel the sound from the environment. The earphones also include a multicolor light, such as a RGB surface-mount device light-emitting diode module (RGB-SMD-LED). This light serves as a visual cue that sound is emanating from the earphones, that sound is not emanating from the earphones, and/or that the mic-thru circuit is activated or not activated. When the listener approaches another party (e.g., a sales clerk, a friend on the street, another user, etc.), the other party ascertains whether they can be heard by the listener. For example, a green light on the earphones of the listener indicates that mic-thru is activated and the party understands that their speech will be captured and amplified to the listener. Alternatively, a white light that illuminates when triggered by speech detection indicates to the party that they are heard by the listener. Continuing the example, a red light is a visual cue indicating that non-environmental sound is emanating from the earphones, so that the party may not be heard if they speak to the listener. A blue light indicates that both mic-thru sound and non-environmental sound is being played to the listener from the earphones. A purple light indicates that the listener is executing and monitoring a VR application, alerting an observer to beware that the listener may be hearing externalized sound that may occur at coordinates near or at the observer. A blinking light indicates that no sound is originating from the earphones to the listener. This type of visual cue assists both the listener and other users during communication encounters.

Visual cues for the benefit of third parties are also useful in a VR environment. For example, consider the example above when both the listener and other party encounter each other in a VR space. The visual cues (such as described above) are rendered or illustrated as various colors or images accompanying or modifying the representation of the listener in VR. For example, a party approaching the listener in VR ascertains from a visual above the VR head of the listener that the listener is monitoring his or her physical environment and not monitoring the virtual environment. The visual cue thus signifies that the party would not be heard by the listener.

Further, visual cues for the benefit of third parties are activated both on a physical device (e.g., earphones) and indicated in VR simultaneously, so that visual cues at the listener are observable by both virtual observers and parties in the physical space of the listener.

As noted, one problem is that a user may not know in advance what object, area, direction, point, or location is being selected as a SLP or where sound will actually externally localize. This problem can cause confusion to the user since electronically generated binaural sound, naturally occurring binaural sound in the physical environment, and binaurally captured naturally occurring sound that is played to a user, can be indistinguishable.

Example embodiments solve this problem and provide a technical solution that assists users in knowing the location of an object, area, direction, or point selected for a SLP and assists users in distinguishing between electronically generated binaural sound, naturally occurring binaural sound in the physical environment, and binaurally captured and recorded sound.

Figure 14:
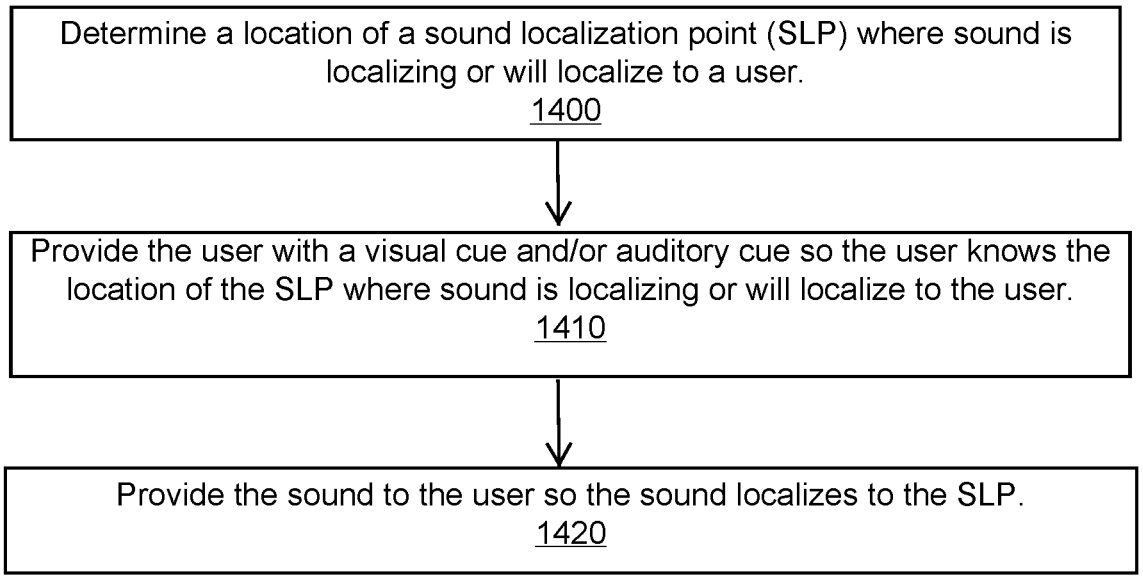
FIG. 14 is a method to notify a user of the designation of a SLP so the user knows where binaural sound will localize in accordance with an example embodiment.

FIG. 14 is a method to notify a user of the designation of a SLP so the user knows where binaural sound will localize in accordance with an example embodiment.

Block 1400 states determine a location of a sound localization point (SLP) where sound is localizing or will localize to a user.

For example, the location is determined from information stored at the object, a software program producing the sound, stored in memory, such as with an audio segment ID or object table, a HRTF file, information obtained from the object (e.g., an image capture of the object), a designation or location input from a user (e.g., through a user interface), or other ways discussed herein.

The location of the SLP can be in a VR object, at an AR object, coincident with a physical object, in a direction, an area, or a point. Further, the SLP can be a direction, area, or point that occurs in empty space (e.g., space that is void of a physical object). For example, the location in empty space occurs approximately three feet or one meter in front of a face of the user while the user is standing or walking indoors. As another example, the location in empty space occurs about one meter directly above a head of the user while the user is standing or walking outdoors.

Block 1410 states provide the user with a visual cue and/or auditory cue so the user knows the location of the SLP where sound is localizing or will localize to the user.

The visual cue and/or auditory cue notifies the user where sound is externally localizing to the user or where sound will externally localize to the user. For example, this cue provides the user with an advanced notice that sound that the user will hear in the future will localize to a particular SLP.

The visual cue and/or auditory cue can be provided at the SLP, such as illuminating a light at an object that is the SLP or convolving sound so it originates from the SLP.

Block 1420 states provide the sound to the user so the sound localizes to the SLP.

In an example embodiment, the visual cue and/or auditory cue is a warning, alarm, alert, or indicator that notifies the user that binaural sound will emanate from the SLP. In this way, the user is not startled when unexpected, unfamiliar, sudden, or interrupting sound is heard at the SLP since the user is forewarned or notified that sound will be or is originating at the object. For example, the visual cue and/or auditory cue informs the user that the current sound being heard is being delivered by his headphones, and not occurring in his greater physical environment. The visual cue and/or auditory cue thus helps the user localize the sound and/or informs the user that the sound being heard or to be heard is electronically generated by his headphones.

By way of example, an intelligent personal assistant (IPA) or other software program generates localized auditory cues in order to query the user about the objects scanned, read, communicated with, or available in an area. For example, an IPA generates localized auditory cues in order to determine what object the user wishes to designate for the localization of the voice of the IPA, or another sound source. The IPA scans the object table for a first object that is proximate to the user (e.g., within two meters) and retrieves the location of the object. The IPA assigns (or requests the SLS to assign) the SLP of the IPA audio output to the location of the object. The IPA then executes speech output to query and assist the user to designate an object for the SLP of the IPA, or another sound source. At the location of the first object, the user hears the voice of the IPA ask, "Shall I designate this object for the sound?" The IPA registers the user's response or designation and stores this information, for example, in a user preference file for sound localization. The IPA repeats this process for other proximate objects, localizing at each proximate object to play the query. The user stops the process, allows the IPA to stop after collecting the response for each object, or allows the IPA to cycle through the object localizations again. This process assists the user in remembering or recalling objects and SLPs before sounds from other sound sources are convolved to them. The IPA repeats the process for many sound sources such as each application currently executing or expected to output sound, or each contact in the contact list of the user.

Consider another example in which localized auditory cues assist the user to gather information about his or her environment. A room scanner executes to append twenty new objects in the room to the object table, and an IPA generates localized auditory cues in order to assist in completing the inventory information for the new objects. The IPA asks the user questions about each new object while localized at the object and populates fields in the object table based on responses to the queries, such as populating the table with object identity, object name, and preferred sound type of each new object.

As another example, the IPA or another software program also informs the user of a SLP placement by providing a verbal description or name, or location of the object as the auditory cue. This verbal description occurs before another sound localizes to the SLP, at or when sound localizes to the SLP, or after sound is already localizing to the SLP (e.g., to periodically provide the verbal description to the user). For example, when the user receives an incoming telephone call, the IPA announces the name of the sound source or sound type, and the identity or name or description of the object proposed for the SLP location (e.g., the IPA announces: "Placing Alice at TV" or "Locating phone call to kitchen table."). The IPA also describes the location instead of an object (e.g., the IPA announces: "Playing stereo music 'Dave Brubeck Quartet' in front of you with sixty degrees of virtual speaker separation").

The IPA or other software program thus provides the listener with a verbal description of the location of the object and/or the location of the SLP. An example embodiment also provides this information and other information to the user with auditory cues in the form of externally localizing binaural sound that localizes to a position away from the object. The verbal description and/or auditory cues assist the user in knowing the location of the SLP. This information also assists the user in knowing that the externalized sound is electronically generated to augment the environment and not sound resulting from a physical event in the environment.

Consider an example in which the auditory cue is a portion, sample, clip, representation, or abbreviation of the sound that will externally localize to the user, and this auditory cue is localized at the object where the sound will localize. As another example, the auditory cue is a copy or version of the sound at a different quality than the sound, such as a reduced quality version of the sound, an enhanced version, or a superior quality version of the sound. This portion or representation of sound from the sound source functions as an icon or thumbnail sketch of the sound from the sound source. The icon or earcon or sketch of the sound provides the listener with some indication of the content of the sound without playing the full sound and/or without playing the sound at the maximum quality available or at the quality provided, received, intended, or permitted by the provider of the sound, such as the application or remote party. Some examples include, but are not limited to, playing a few seconds of the beginning of the sound or other portion of the sound, the sound or part of the sound altered to indicate that it is an auditory cue and not the full information of the sound (e.g., an altered volume, sound quality, resolution, spatiality, speed, pitch, clarity, equalization, altered by a sound effect filter, with noise added, with silence gaps added), a veiled or hushed version of the sound, a less intelligible version of the sound, a loudest part of the sound, a part of the sound that includes a name from the listener's contact list or any proper name, and the sound with one channel removed or obfuscated, or localized to an inexact, uncomfortable, inconvenient, less preferred or unsteady SLP.

In an example embodiment, the SLS samples and externally localizes a representation of the sound without granting permission to a sound source to localize audio to a listener. For example, an auditory cue that is a representation of the sound is localized and played, replayed, or looped in order to indicate the SLP and content of the sound. Consider a listener who issues a command to play a music file and the first few seconds of the file are played in a loop and externally localized to the object until the listener issues a command to confirm the SLP or object or pays for or commits to pay for the music. After the listener commits, the sound of the entire music file plays to the listener and localizes to the object.

Consider an example in which a listener receives a telephone call while wearing earphones. The SLS selects an empty chair that is located in front of the listener as a SLP for the voice of the caller. In order to notify the listener of this selected SLP, the voice of the incoming caller is played at the chair, but the voice is played at a low volume and subjected to low pass and high pass filters so that a narrow band of human voice frequency remains. This filtering generates a sound of the voice that resembles a legacy telephone voice localized at the chair. The telephony application does not transmit sound from the listener and does not acknowledge to the caller that the voice of the caller is being heard. The caller understands that he or she is speaking in the space of the listener and/or leaving a recorded message for the listener in a familiar manner (e.g., such as an answering machine or a voicemail). Thus, the listener is provided with a warning or notice of where the SLP will occur before the full-duplex telephone call begins. This notice prevents the listener from being startled when the sound localizes to the chair and provides the listener with an opportunity in the form of time to find the SLP (in this example, at the chair) and possibly change the SLP. For instance, the listener may be looking in another direction that is away from the chair or otherwise not able to see the chair. The notice gives the listener time to find the chair in his or her environment. Also, the unnatural quality of the auditory cue (in this case, the narrow bandwidth) indicates that the sound is coming from the earphones or electronic device and not present in his physical space. Further, if the listener does not want to externally localize the voice of the caller to the chair, then the listener has time to change this location.

In this example, the playing of the adjusted voice of the caller at the object continues until the listener issues a command to answer the phone call, pays for or commits to pay for the incoming call or connection, takes another action, or until the caller pays for or initiates a payment for the call connection and/or outgoing localization. Afterward, the listener hears the voice of the caller with a greater fidelity.

In an example embodiment, the sound source designates the location and sound of the auditory cue. For example, the sound source is an application that provides the audio to be played. Further, a phone call or telepresence request includes a request to externally localize the voice of the caller. Here, the auditory cue is the sound or voice of the caller until the request is answered by the listener.

A visual cue and/or auditory cue is also provided to inform the listener that a sound being heard is naturally occurring in the physical environment of the listener. For example, while the listener listens to electronically generated binaural sound from a VR game, the SLS or the VR game generates a visual or audio alert or cue to inform the listener that a sound is naturally occurring. For instance, the listener wears electronic earphones with microphones (e.g., binaural microphones at the ears) and a pass-through or mic-thru signal from the microphones enables the listener to hear sounds in his environment together with the sounds from the VR game. The SLS monitors the mic-thru signal and generates a distinguishing click or displays a visual icon flash to accent or distinguish the naturally occurring sound. Without the supplement of a visual or auditory cue, the listener is unable to distinguish whether a sound originates from the VR game application or from his environment.

One problem is that earphones and headphones can partially or fully obstruct external sound and prevent wearers from hearing this sound. This situation can occur if a user listens to music or a sound source at a high volume or wears earphones or headphones designed to block or impede sound in the user's environment.

An example embodiment solves this problem and other problems associated with earphones and headphones that partially or fully block sound to the listener. By way of example, the earphones or headphones provide binaural sound to the listener, and this binaural sound localizes at an object whose sound would otherwise be blocked or impeded. In this manner, the user can wear earphones or headphones and still hear external sounds from objects as this sound is provided to the user in the form of electronically generated binaural sound. This sound can emulate, copy, or imitate the environmental sound that is being blocked or provide a different or additional sound to the user.

For example, the listener perceives an electronically provided sound for an object or event in the environment of the listener as being more realistic, being enhanced, having higher fidelity, or being provided in a way that assists or benefits the listener. This electronically provided sound is audibly different or distinct from environmental sound provided by a mic-thru circuit or natural sound heard without electronic processing.

Figure 15:
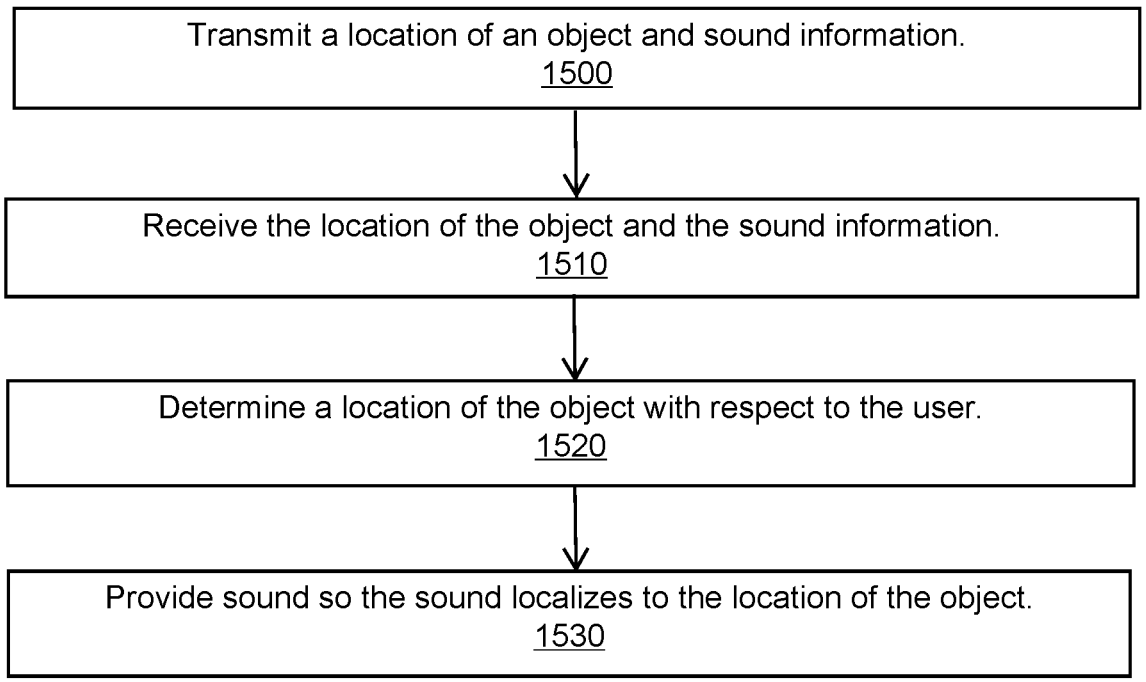
FIG. 15 is a method for an object to provide a location and sound information to an electronic device so a user localizes sound to the object according to the sound information in accordance with an example embodiment.

FIG. 15 is a method for an object to provide a location and sound information to an electronic device so a user localizes sound to the object according to the sound information in accordance with an example embodiment.

Block 1500 states transmit a location of an object and sound information.

The object or an electronic device associated with the object transmits or broadcasts its location, such as its GPS location or other location information. The object or the electronic device can also transmit or broadcast sound information, such as the sound to be provided to the listener, an identification of the sound to be provided to the listener (such as a unique identification or locator number or universal resource locator), a volume of the sound, a pattern or sequence of the sound, a start time and/or end time for playing the sound, a length of time to play the sound, a message (such as a text message or short message service (SMS) message or multimedia message service (MMS)).

The object or electronic device can transmit the location and sound information a single time or multiple times (e.g., periodically, continuously, or continually). Further, this information can be constant or changing. For example, if the object is moving, then the object or device repeatedly transmits or broadcasts a new or updated GPS location.

Block 1510 states receive the location of the object and the sound information.

For example, an electronic device of a user (or an electronic device in wireless communication with the electronic device of the user) receives the information transmitted from object and/or its electronic device. By way of example, the electronic device of the user includes, but is not limited to, a handheld portable electronic device (HPED), a portable electronic device (PED), a wearable electronic device (WED), a head mounted display (HMD), an optical head mounted display (OHMD), electronic earphones, electronic headphones, an electronic watch, or another electronic device.

Block 1520 states determine a location of the object with respect to the user.

This location can include a head orientation, line-of-sight, direction of travel, and speed or velocity of the object and the user.

Example embodiments provide a variety of methods and apparatus to determine the location of the object with respect to the user. For example, a GPS or IPS location of the object is compared to a GPS or IPS location of the user. As another example, the electronic device of the user receives the location and sound information when this electronic device is within a predetermined or transmission range of the object.

Block 1530 states provide sound so the sound localizes to the location of the object.

For example, the sound is provided to the user through electronic earphones or electronic headphones that the user wears.

Consider an example in which a user walks along a city street and listens to loud music while wearing wireless earphones that communicate with the user's smartphone. An emergency vehicle (such as a police car, ambulance, or fire truck) approaches the user from behind with its sirens blaring. The user, however, is not able to see the flashing lights since the vehicle is not in the user's field-of-view and is not able to hear the sirens of the vehicle since the user is listening to music with the earphones. The vehicle wirelessly broadcasts its GPS location and a sound identification code signifying that the vehicle is a fire truck with its sirens blaring. The smartphone of the user receives this broadcast and identifies the location of the vehicle with respect to the user, an identity of the vehicle (here a fire truck), and an indication that the vehicle has its sirens activated. In response to this broadcast, the smartphone generates a sound of sirens from a fire truck, convolves this sound so it localizes to the location of the fire truck, and provides this sound through the earphones so the user hears the sound of the fire truck at its location. Upon hearing this electronically generated binaural sound, the user recognizes the sirens of the fire truck and can determine a location of the fire truck with respect to the location of the user.

In the example of the fire truck, the user is not able to hear the environmental sound of the fire truck since the user is wearing earphones. Instead, the user hears an electronically generated version of this sound. This sound can emulate or copy the actual sound of the fire truck (e.g., the electronically generated sound matches the sound of the fire truck and the sound that the user would hear if he or she were not wearing the earphones and listening to loud music). In another example embodiment, this electronically generated sound can be different than the sound of the fire truck. For example, the use hears the sound of the fire truck that is augmented with another sound, such as a further warning or signal or a voice (e.g., a voice of an IPA stating "Fire truck approaching from the rear"). As yet another example, the user hears a sound that is different than the siren of the fire truck, but the user recognizes this sound as being from an emergency vehicle.

In the example of the fire truck, the user is able to determine a location of the object (here the fire truck) by localizing the electronically generated binaural sound being provided to the user through the earphones. This situation is significantly different than providing the user with the sound of the siren through the earphones in stereo sound or mono sound. If the sound were provided to the user in stereo sound or mono sound, then the user would know that a fire truck was blaring its siren, but the user would not be able to discern the location of the fire truck based on the sound of the siren. The user would not be able to determine a distance to the fire truck or a direction to the fire truck. Providing the sound to the user in binaural sound solves this problem since the user determines both a distance and a direction to the object upon hearing the electronically generated binaural sound even though the listener cannot hear the actual sound being generated from the object.

Objects can provide their location and sound information to a user. In this manner, an object communicates with a user so sounds emanate from the location of the object even if the object itself is not generating an audible sound or not generating into the environment the sound that the user hears.

Consider an example in which policemen or soldiers wear earphones with microphones that enable environmental sound to pass through the earphones. As such, the wearer hears both environmental sound and electronically generated sound at the same time. During a training exercise, an officer becomes injured and needs assistance after falling down on the second floor of a warehouse near an emergency exit. The officer speaks, "Help, officer down." The speech is captured with the microphones and recorded in memory. A wireless transmitter repeatedly broadcasts this message and a GPS location of the officer. Fellow officers receive this signal and know the officer is located in the warehouse based on the GPS signal. This GPS signal alone, however, is not sufficient to provide the indoor location of the officer. When the fellow officers arrive at the warehouse, they hear the sounds "Help, officer down" emanating from their earphones. They localize this sound as originating from the second floor at the emergency exit. They follow the localization cues in the sound and quickly arrive at the second floor to assist the fallen officer.

One problem is that in some instances it may be difficult to discover and/or inventory objects that are available as SLPs for users. Further, users may want to activate and deactivate objects as SLPs in a quick and inexpensive manner.

An example embodiment solves this problem and enables physical object to be quickly and inexpensively inventoried, activated, and deactivated as SLPs for a user.

For example, a camera captures images or video of objects and records information associated with the objects. This information includes, but is not limited to, a picture of the object, an identity of the object, a description of the object, a location of the object (e.g., GPS or IPS location information), whether the object is available as a SLP, and other information discussed herein. For example, a smartphone captures a picture of a television in a living room of a user. Metadata or other data associated with this picture includes its location and its availability, qualification, or preference as a SLP. For instance, this availability information includes the following programmable instructions: localize sound being played by the television to the television and to a region within 2.0 m from the television when (1) the television is playing video or powered on, (2) the listener wears wireless earphones, and (3) the listener is within a distance of 0.3 m-3.5 m from the television.

As another example, tags (such as an active or passive radio frequency identification (RFID) tags or chipless RFID tags) store and/or are programmed with the information. Alternatively, this information is stored in memory of another electronic device (e.g., a server or a PED) and retrieved by querying the device with a unique identifier stored on the tag. For example, a unique object number or code or identifier is displayed as an optical tag, such as a bar code or QR code that is on the object. An optical tag scanner determines the orientation and/or position of the object with respect to the scanner according to the orientation and/or size of the optical tag respectively. The unique identifier encoded by the optical code is resolved by the scanner and provided to the SLS. The SLS queries a database with the identifier to determine additional information about the object of the optical tag.

Consider an example embodiment in which a user places, affixes, or attaches these tags on or in objects in order to make these objects or areas easier to identify, locate, and localize for designation as SLPs. If the object that includes the RFID tag moves, then the SLP for that object moves and follows it. A user thus quickly and easily designates physical objects as SLPs by placing a tag on the object. By way of example, the designation of the object as a SLP is removed or adjusted by removing the tag from the object, providing a programmable instruction to the tag, providing a command to an electronic device that reads the tag, or altering the sound information or localization instructions stored and associated with the tag.

Associating a SLP with a location of one or more identifier tags allows the SLS or process to query the location of a SLP by querying the location of an associated identifier tag (e.g., querying a table or database stored on the scanning device or remotely), or scanning for the presence of an associated identifier tag. Furthermore, associating a SLP with an identifier tag allows the position of the SLP to be changed by a process independent of SLP location management. For example, consider a SLP associated with the location of a smartphone that has as identifier tags an active radio tag in the chassis and an optical QR code. When the listener moves the position or orientation of the smartphone, the position of the SLP changes according to new data or changes in data received from an active radio tag scanner. Also, the orientation of the SLP changes according to new data or changes in data received from the QR code scanner.

A listener, electronic device, or software program can arrange identifier tags so that identifier tags in the vicinity of, and scanned by, the tag scanner correspond to SLPs. For example, identifier tags in an area are programmed and assigned as SLPs to existing, past, future, or potential sound sources.

Consider an example in which five objects with unique identifier tags in location-1 are scanned for association with a set of five SLPs (such as instruments in an orchestra) according to a rule base. For example, tag1 is associated with SLP-violin-1; tag2 is associated with SLP-violin-2; tag3 is associated with SLP-kettle-drum; tag4 is associated with SLP-piano; and tag5 is associated with SLP-upright-bass. An electronic device (such as a HPED or PED) scans the five objects at location-1 and provides a listener with sounds of the five instruments externalized around the listener at the respective objects. Sound for each instrument appears to the listener to emanate from the respective object. Later, the listener moves to location-2 that has different objects at different positions in the room with same identifier tag codes. The electronic device scans location-2 for identity tags and applies the rule base to select five objects to assign as SLP locations. After this designation, the listener hears the five instruments at different objects at the different locations from location-1.

Consider an example in which an RFID tag includes one or more of, or pointers to: a binaural sound file, location coordinates, orientation coordinates, a loudness setting, play-speed, an alarm time at which to play the sound file, a proximity at which to play the file, and other information discussed herein. A listener passing within a threshold proximity of a RFID tag in a store or public area while shopping, walking or driving down a street, or airport walkway, can trigger the playing of a sound in a binaural space of the listener (e.g., within 1.5 meters around the listener). The SLP can be located at the point of the RFID (e.g., the tag stores the coordinates of the tag), but can also be located in other places, such as at coordinates around the listener or proximate to the RFID tag. The RFID tag acts as a trigger to execute playing of binaural sound at a location with respect to the listener, such as a location at an object or virtual object, a location in empty space, or another location or object.

Consider an example of objects that appear to talk to the listener. For example, an application is triggered by the detection of an identifier tag to play a voice that is localized proximate to a shopper at the identifier tag, such as at a retail product that includes the tag, on a retail shelf. As another example, in a work environment, tags are affixed to objects of the operation that need to be monitored, and voices communicating information relevant to the object are localized at the object. Consider a foreman who listens to the localized status of industrial machinery parts as he walks the production floor, or a dairy farmer who hears individual heifers speak if their weight or temperature changes abnormally.

Providing directions is another example application. For example, a walking listener passes a Bluetooth tag and triggers a voice that seems to play from a life-size cardboard cutout of a person, saying, "Continue walking in your present direction. When you reach the third door, turn left." As the listener continues to walk and reaches the third door he or she hears a voice from back behind them at the SLP of the cardboard cutout, saying, "take a left just there!"

Consider an example of a listener that visits a wax museum and hears a beep from a SLP at a red button object on the wall beside a wax statue of Benjamin Franklin. The location of the SLP alerts the visitor to the location of the button. Activating the button triggers the SLP to move from the button object to the wax mouth of Benjamin Franklin, and to play the voice of Benjamin Franklin from the SLP.

Consider an example of a farmer driving a root vegetable-harvesting tractor. The farmer is guided by the sound from SLPs localizing at RFID tags buried with roots not yet harvested. As the farmer completes the harvest of one batch of roots, an RFID tag detected at the next closest unharvested batch in the vicinity triggers a sound to play from an SLP at ground-level above the location where the RFID tag is buried. In this way the farmer goes from one batch to the next without being distracted by a multitude of more remote crops.

The SLP for a sound source can be assigned or moved to an object as designated by the listener, an electronic device, or a software program. For example, the object is identified when a listener gestures for, points to, touches, looks at, or otherwise indicates or selects an object or area on an object. When the listener designates an object, the location of the object, and the identity of the object are stored in memory along with other information, such as preferred circumstances for localizing sound to this object. This information can also include what visual cue to associate with the object, such as what visual cue to assign to the object.

For example, on Monday Alice designates her large blue coffee mug as the SLP for the voice of a caller. On Tuesday Alice is using her small red coffee mug, and she rests the mug in the usual area on her desk. Also on Tuesday the SLS is requested to localize the voice of another caller. The SLS selects the red coffee mug after determining that the sound type is similar to the sound type on Monday (a voice). The blue coffee mug is absent, but an object with a similar size and shape is present at the SLP of yesterday's call.

A user, an electronic device, or a software program can select a virtual object to function as the SLP. This virtual object can also move around in the virtual space of the user. For example, the user points a tracking wand or 3D controller to select or create a virtual object to augment 3D space at the location of a SLP. The user selects or creates a virtual object in a VR space at the position that matches the coordinates of or perception of the SLP that the user hears. Non-physical visual cues can persist after the sound. For example, a user localizes a ringing phone and places a virtual 3D model of a phone at the point of the SLP that the user perceives. During the phone conversation, the user is able to distinguish the location of the voice of the phone call from other voice SLPs. After the phone conversation, the 3D model of the phone is not erased, but persists at the location.

SLP coordinates can be designated by the sound source providing the sound to the SLS or other software program or process. Alternatively, the SLP coordinates may not be supplied. Further, the SLP coordinates can be designated in another way, such as by a third party, a server, a software application, an IPA, etc.

When the SLP coordinates are supplied to or obtained by the SLS, then the SLS transforms the coordinates to a location on a hardware display that corresponds to the SLP position. For example, an icon or sprite is illustrated on the display to indicate to the listener the location of the SLP. For example, the SLS is requested to localize a sound at $(r, \theta, \phi)$ and provide a visual cue for a sound. The SLS determines that the listener is wearing a VR display and cannot see the physical environment, so the SLS does not consult the table of proximate objects in the environment. Instead, the SLS supplies the spherical SLP coordinates to the visual output system and requests an illustration of a red circle at the coordinates. The listener sees a red circle at the location of the perceived source of the sound.

When coordinates of a SLP are not provided or available, then neither the listener nor the electronic device executing the binaural sound knows the coordinate-specific position of the SLP. In such a case, the listener estimates the position of the SLP according to his interpretation of the binaural cues. The SLS also estimates the unknown SLP coordinates. The SLP is then illustrated with a display system, such as a HMD, AR glasses, or a video projection system. The listener compares his or her perceived position with the position estimated by the SLS and adjusts either or both positions in order to arrive at an auditory perception that matches the listener's visual perception provided by the SLS. If the coordinates of SLPs requiring visual cues are not provided to the SLS, the SLS computes or estimates the coordinates prior to designating or creating a visual cue. For example, the SLS analyzes the binaural audial cues in an incoming sound source in order to determine a localization of the sound. For example, the SLS analyzes the ITD and ILD of the binaural source to compute an approximate azimuth angle.

An icon or image is generated on the listener's display at a position corresponding to the approximate position of the localization.

For example, a listener is unsure of his distance from a SLP that he hears. The SLS estimates the SLP coordinates of the incoming sound that the listener is hearing, and produces a visual indication of the position of the sound localization on the output display that the listener is monitoring. The listener sees the visual indication and the azimuth angle of the visual indication matches the listener's perception of azimuth angle. The listener remarks, "Oh, I thought it was closer. Ok." The distance coordinate appears greater than the listener's perception, but the listener adjusts his perception and is able to accept the sound as originating at the distance estimated by the SLS computation. The listener's acceptance eliminates his possibly less certain ascertainment of the SLP.

As another example, while Bob is working on his computer, he calls Alice by speaking to a dummy head that is two meters away from Bob off to the side. Alice's smartphone analyzes the ITD of Bob's voice and finds the voice localization is probably 45° from center. Alice's OH MD renders a picture of Bob at 45° to Alice. The position of the picture matches the SLP of Bob's voice that Alice perceives. Alice commands the SLP to move to 5° where she prefers the voice of Bob in a configuration that is more similar to a face-to-face conversation. The visual system is updated with the adjusted azimuth coordinate for the SLP of Bob's voice, and Alice sees the visual cue of the picture of Bob at 5°.

In another example, Bob calls Alice from a conference room with six other people while he is wearing binaural microphones. Alice's smartphone estimates relative positions of the six voices around Bob based on ITDs and impulse responses from sound received from the microphones. The smartphone illustrates visual cues at these positions of the estimated SLPs for output by Alice's video projector output device. Alice sees the six visual cues on the wall of her office at their actual relative positions to each other, and at the approximate positions of the SLPs she perceives. Because the relative positions of the SLPs line up on the wall and accurately match the respective SLP locations, Alice does not suffer distraction from inexact placement. Alice is able to understand which person is talking at what time with more accuracy by seeing the approximate visual cue positions, as opposed to hearing the voices without the approximate visual cues.

Virtual microphone points (VMPs) can also be placed at visual cues such as coincident physical objects or areas, or virtual or illustrated objects. VMPs can be placed at the location with an associated SLP.

Trackable physical objects can provide listeners with flexibility and intuitive SLP management. Consider an example in which a listener or an electronic device providing the binaural sound selects a certain object to designate as a SLP. The electronic device includes a sensor that tracks and monitors the position, movement, and orientation of the object. For example, the electronic device includes a camera that captures video of the object, or the object includes an identity tag from which the electronic device determines a position and orientation of the object. The SLS receives this position and orientation information from the electronic device and displays the object. The listener can manually place and move the SLP around the environment by moving the object, and the object can be regarded functionally as a physical SLP (PSLP).

As an example, a SLP is assigned to an object (e.g., a wooden block) that includes an identifier tag. The SLS receives or requests the position and orientation of the identifier tag prior to convolving sound to the position of the identifier tag. This information enables the SLS to track the SLP and the wooden block. The listener moves the SLP by moving the wooden block, and the wooden block functions as a PSLP. A listener conveniently places or moves the wooden block/PSLP to place or move the SLP. Furthermore, consider an example where music localizes to the wooden block/PSLP, and the listener moves the wooden block closer to himself or herself in order to hear the music louder.

In addition to using one or more identifier tags to track an object, an object or device with sufficient sensors can report its position and/or orientation in order to update the coordinates of the SLP assigned to the object. For example, a smartphone functions as a PSLP (e.g., the smartphone includes position and orientation sensors and communicates sensed data to the SLS). The listener moves the SLP by moving the smartphone. A third party (not the listener) also moves the smartphone and hence moves the SLP. A listener will experience the sound source of the SLP as if the sound originates at the smartphone.

Consider an example in which a smartphone is on a table while a listener has a telephone call with a caller. The listener wears wireless earphones with a microphone that captures a voice of the listener. The microphone functions as a VMP during the telephone call, and the smartphone functions as a SLP for the voice of the caller. When the listener walks away from the smartphone during the conversation, the voice of the caller fades as if the listener were walking away from the caller. From the point-of-view of the listener, sound localizes to the location of the smartphone even though the speakers in the smartphone are not generating any sound. The wireless earphones provide the voice of the caller to the listener. Since the smartphone functions as the VMP, the caller hears the voice of the listener as if the listener were walking away from the caller.

An example embodiment uses a proximity sensor to detect the presence of a nearby or proximate object without physically contacting the object. The proximity sensor emits an electromagnetic field or electromagnetic radiation (e.g., infrared) and analyzes changes or disturbances in the electromagnetic field of the reflected signal.

An example embodiment uses two sensors to detect movement of an object. For example, two photoelectric sensors are mounted on opposite sides of a reader. When movement occurs with respect to the object (e.g., either the object and tag move or the reader moves), the two sensors measure a time difference in the receiving signal and estimates a position and/or direction of travel of the signals. A speed and/or direction are estimated by measuring a time difference at two antennas that are separated from each other.

Received power or received signal strength (RSS) of an RFID signal at an antenna can also be used as an indication of distance. Likewise, distance is estimated based on a time-base technique (e.g., round-trip propagation time or time of flight, ToF) or phase-of-arrival (PoA) measurements.

A direction of arrival (DoA) of a signal from a tag can be based on directional antennas, smart antennas, phase arrays, and other methodologies.

Thus, distance and DoA information can be used to localize a tag in 2D or 3D space and to provide a reader with the location. Furthermore, movement or velocity of the tag and/or the object with respect to the tag can be calculated (e.g., based on techniques implementing phase difference of arrival, time domain, spatial domain, and frequency domain). Thus, RFID tags can not only be identified but also be located (e.g., executing a phase-based ranging measurement on backscattering RFID tags).

As noted, an example embodiment also uses a camera to capture an image of an object, analyze this image, and determine a distance to the object and a height of the object. For example, when a camera in a smartphone or other PED focuses on an object, an application executing on the smartphone determines a distance to this object and a dimension of the object (e.g., a height and a width of the object).

For example, the smartphone or PED compares the size of the image of the object with a known size of the object and executes a known perspective scaling ratio to solve for the distance.

Figure 16:
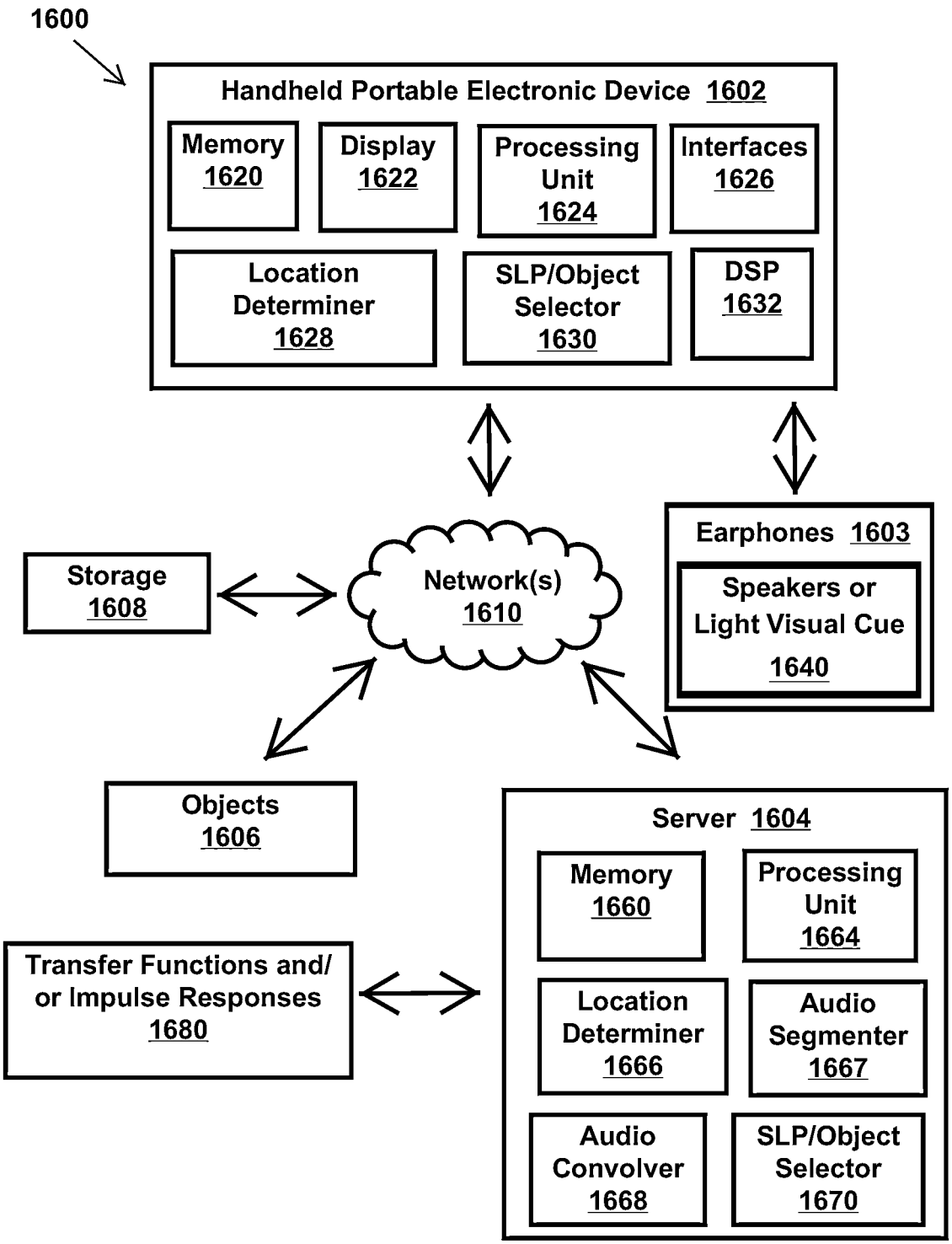
FIG. 16 is a computer system or electronic system in accordance with an example embodiment.

FIG. 16 is a computer system or electronic system 1600 in accordance with an example embodiment. The computer system includes a handheld portable electronic device or HPED 1602, a computer or electronic device (such as a server) 1604, one or more objects 1606, and storage or memory 1608.

The handheld portable electronic device 1602 includes one or more components of computer readable medium (CRM) or memory 1620 (such as memory storing instructions to execute one or more example embodiments), a display 1622, a processing unit 1624 (such as one or more microprocessors and/or microcontrollers), one or more interfaces 1626 (such as a network interface, a graphical user interface, a natural language user interface, a natural user interface, a phone control interface, a reality user interface, a kinetic user interface, a touchless user interface, an augmented reality user interface, and/or an interface that combines reality and virtuality), a location determiner 1628, a sound localization point (SLP) selector and/or object selector 1630, and a digital signal processor (DSP) 1632.

The HPED 1602 communicates with headphones, earphones, or another electronic device 1603 that include speakers 1640 or other electronics (such as microphones, a light to indicate a visual cue, or other electronics).

By way of example, the location determiner 1628 includes one or more of a camera, a sensor, GPS, a tag reader, a processor and/or controller, and software and/or hardware to execute method blocks to determine a location of an object.

The storage 1608 includes one or more of memory or databases that store one or more of audio files, sound information, audio input, SLPs (including other information associated with a SLP such as rich media, sound files and images), user profiles and/or user preferences (such as user preferences for SLP locations and sound localization preferences), impulse responses and transfer functions (such as HRTFs, HRIRs, BRIRs, and RIRs), and other information discussed herein.

The network 1610 includes one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

Electronic device 1604 (shown by way of example as a server) includes one or more components of computer readable medium (CRM) or memory 1660, a processing unit 1664 (such as one or more microprocessors and/or microcontrollers), a location determiner 1666 (software and/or hardware to execute method blocks to determine a location of an object), an audio segmenter 1667 (software and/or hardware that divides, segments, and/or diarizes audio input), an audio convolver 1668, and a SLP selector and/or object selector 1670.

The electronic device 1604 communicates with the HPED 1602 and with storage or memory 1680 that stores transfer functions and/or impulse responses (e.g., HRTFs, HRIRs, BRIRs, etc. for multiple users). Alternatively or additionally, the transfer functions and/or impulse responses are stored in memory 1620.

The objects 1606 include, but are not limited to, physical objects with no electronics (such as a book, coffee mug, table, chair, toy animal, a dog, a cat, etc.), physical objects with an attached location device (e.g., a RFID tag, a chip, a bar code, etc.), and physical objects with electronics (e.g., a smartphone, a smart speaker, home appliances, a tablet computer, electronic headphones, electronic earphones, etc.).

Figure 17:
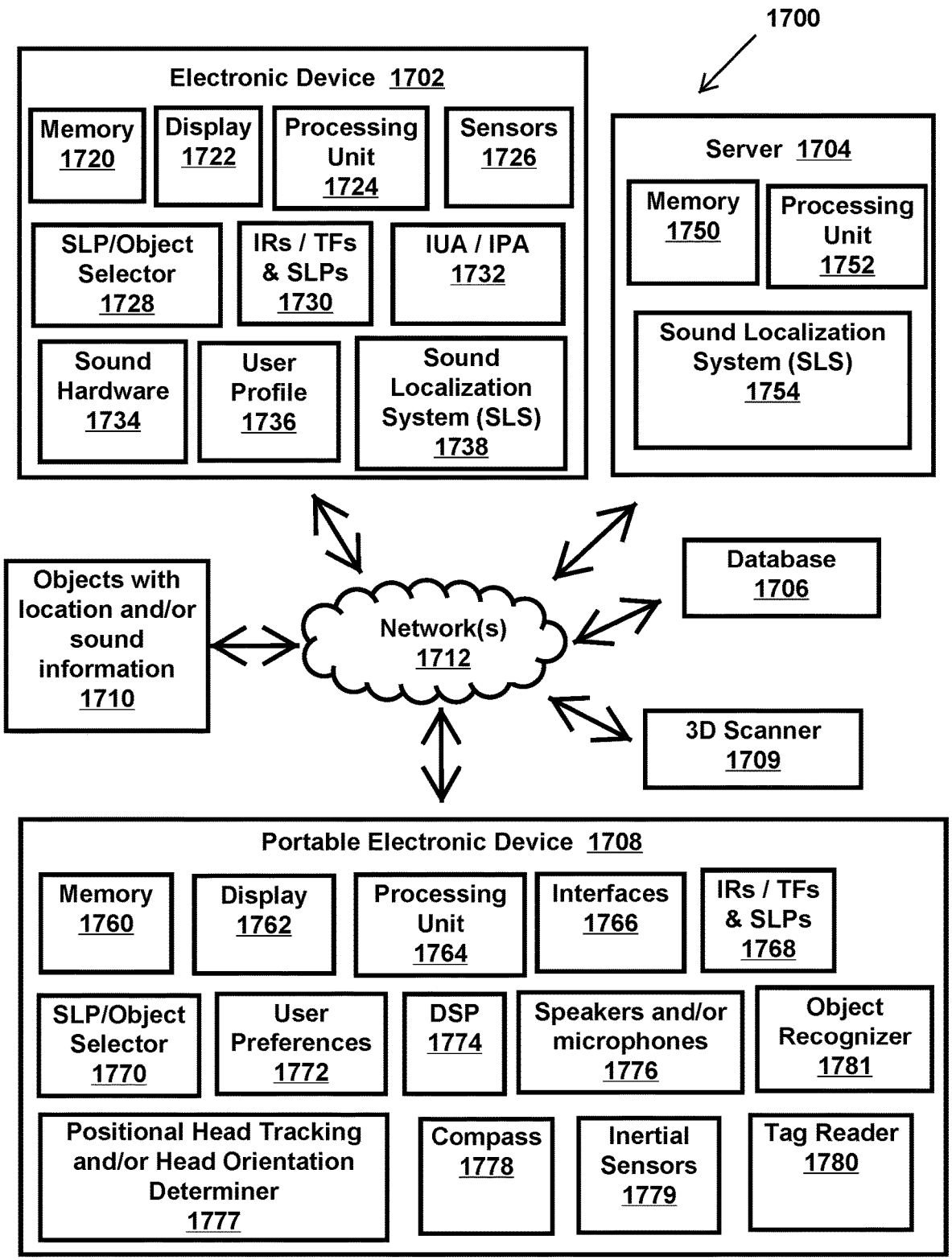
FIG. 17 is a computer system or electronic system in accordance with an example embodiment.

FIG. 17 is a computer system or electronic system in accordance with an example embodiment. The computer system 1700 includes an electronic device 1702, a server 1704, a database 1706, a portable electronic device 1708 (including wearable electronic devices), a 3D scanner 1709, and objects with location and/or sound information 1710 in communication with each other over one or more networks 1712.

Electronic device 1702 includes one or more components of computer readable medium (CRM) or memory 1720, one or more displays 1722, a processor or processing unit 1724 (such as one or more microprocessors and/or microcontrollers), one or more sensors 1726 (such as micro-electromechanical systems sensor, an activity tracker, a pedometer, a piezoelectric sensor, a biometric sensor, an optical sensor, a radio-frequency identification sensor, a global positioning satellite (GPS) sensor, a solid state compass, gyroscope, magnetometer, and/or an accelerometer), a SLP and/or object selector 1728 (such as software and/or hardware (e.g., a processor) to execute example embodiments that predict, provide, determine, or recommend a SLP location and/or an object), impulse responses (IRs), transfer functions (TFs), and/or SLPs 1730, an intelligent user agent (IUA) and/or intelligent personal assistant (IPA) 1732 (also referred to as a virtual assistant), sound hardware 1734, a user preferences and/or user profile 1736, and a sound localization system (SLS) 1738 (such as software and/or hardware (e.g., one or more processors including DSPs) to execute example embodiments that perform functions described herein by the SLS).

The sound localization system 1738 performs various tasks with regard to managing, generating, interpolating, extrapolating, retrieving, storing, and selecting SLPs and can function in coordination with and/or be part of the processing unit and/or DSPs or can incorporate DSPs. These tasks include generating audio impulses, generating audio impulse responses or transfer functions for a person, dividing an area around a head of a person into zones or areas, determining what SLPs are in a zone or area, mapping SLP locations and information for subsequent retrieval and display, selecting SLPs when a user is at a determined location, selecting sets of SLPs according to circumstantial criteria, selecting objects to which sound will localize to a user, designating a sound type, audio segment, or sound source to a SLP, generating user interfaces with binaural sound information, detecting binaural sound, detecting human speech, isolating voice signals from sound such as the speech of a person who captures binaural sound by wearing microphones at the left and right ear, and executing one or more other blocks discussed herein. The sound localization system can also include a sound convolving application that convolves and deconvolves sound according to one or more audio impulse responses and/or transfer functions based on or in communication with head tracking.

A sound localization system (SLS) includes one or more of a processor, microprocessor, controller, memory, specialized hardware, and specialized software to execute one or more example embodiments (including one or more methods discussed herein and/or blocks discussed in a method). By way of example, the hardware includes a customized integrated circuit (IC) or customized system-on-chip (SoC) to select, assign, and/or designate a SLP and/or zone for sound or convolve sound with SLI to generate binaural sound. For instance, an application-specific integrated circuit (ASIC) or a structured ASIC are examples of a customized IC that is designed for a particular use, as opposed to a general-purpose use. Such specialized hardware can also include field-programmable gate arrays (FPGAs) designed to execute a method discussed herein and/or one or more blocks discussed herein. For example, FPGAs are programmed to execute selecting, assigning, and/or designating SLPs and/or objects for sound or convolving, processing, or preprocessing sound so it externally localizes to the listener to the object.

Server 1704 includes computer readable medium (CRM) or memory 1750, a processor or processing unit 1752, and a sound localization system 1754.

By way of example, an intelligent personal assistant (IPA) or an intelligent user agent (IUA) is a software agent that performs tasks or services for a person, such as organizing and maintaining information (such as emails, messaging (e.g., instant messaging, mobile messaging, voice messaging, store and forward messaging), calendar events, files, to-do items, etc.), responding to queries, responding to search requests, information retrieval, performing specific one-time tasks (such as responding to a voice instruction), timely or passive data collection or information gathering from persons or users (such as querying a user for information), data and voice storage, management and recall (such as taking dictation, storing memos, managing lists), memory aid, reminding of users, performing ongoing tasks (such as schedule management and personal health management), and providing recommendations. By way of example, these tasks or services are based on one or more of user input, prediction, activity awareness, location awareness, an ability to access information (including user profile information and online information), user profile information, and other data or information.

The database 1706 stores information discussed herein, such as user profiles (including historic or previous selections as to SLPs and objects), user preferences, SLPs for users, audio files and audio input, transfer functions and impulse responses for users, etc.

The 3D scanner 1709 scans locations, analyzes real-world objects or an environment, collects data, and/or generates models of locations. For example, the device collects data from images and generates three-dimensional models of the images.

Portable electronic device 1708 includes computer readable medium (CRM) or memory 1760, one or more displays 1762, a processor or processing unit 1764, one or more interfaces 1766 (such as interfaces discussed herein), one or more impulse response data sets, transfer functions, and SLPs 1768, a sound localization point (SLP) selector and/or object selector 1770, user preferences 1772, one or more digital signal processors (DSP) 1774, one or more of speakers and/or microphones 1776, positional head tracking (PHT) and/or head orientation determiner 1777 (which can include gaze tracking), a compass 1778, inertial sensors 1779 (such as an accelerometer, a gyroscope, and/or a magnetometer), a tag reader 1780 (such as an RFID reader or optical code reader), and an object recognizer 1781.

Objects with location information and/or sound information include, but are not limited to, a physical object with memory, wireless transmitter, wireless receiver, integrated circuit (IC), system on chip (SoC), tag or device (such as a RFID tag, Bluetooth low energy, near field communication or NFC), bar code or QR code, GPS, sensor, camera, processor, sound to play at a received electronic device, sound identification, and other sound information or location information discussed herein.

By way of example, the sound hardware 1734 includes a sound card and/or a sound chip. A sound card includes one or more of a digital-to-analog (DAC) converter, an analog-to-digital (ATD) converter, a line-in connector for an input signal from a sound source, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier. The sound hardware can be or include customized or specialized hardware that processes and convolves mono and stereo sound into binaural sound.

By way of example, a computer and an electronic device include, but are not limited to, handheld portable electronic devices (HPEDs), wearable electronic glasses, watches, wearable electronic devices (WEDs) or wearables, smart earphones or hearables, voice control devices (VCD), network attached storage (NAS), printers and peripheral devices, virtual devices or emulated devices (e.g., device simulators, soft devices), cloud resident devices, portable electronic devices, computing devices, electronic devices with cellular or mobile phone capabilities, digital cameras, desktop computers, servers, portable computers (such as tablet and notebook computers), smartphones, electronic and computer game consoles, home entertainment systems, handheld audio playing devices (example, handheld devices for downloading and playing music and videos), appliances (including home appliances), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP).

The SLP and object selector 1728 predicts, estimates, determines, and/or recommends events including, but not limited to, switching or changing between binaural, mono, and stereo sounds at a future time, changing or altering binaural sound (such as moving a SLP, reducing a number of SLPs, eliminating a SLP, adding a SLP, starting transmission or emission of binaural sound, stopping transmission or emanation of binaural sound, etc.), selecting an object, sound type, audio segment, or sound source for sound localization, and performing other functions and/or methods discussed herein.

The SLP selector and/or SLS can also execute predictions including, but not limited to, predicting an action of a user, predicting a location of a user, predicting an event, predicting a desire or want of a user, predicting a query of a user (such as a query to an intelligent personal assistant), predicting and/or recommending a SLP or RIR/RTF or an object to a user, etc. Such predictions also include predicting user actions or requests in the future (such as a likelihood that the user or electronic device localizes a type of sound to a particular SLP). For instance, determinations by a software application, an electronic device, and/or user agent is modeled as a prediction that the user will take an action and/or desire or benefit from moving or muting an SLP, from delaying the playing of a sound, from a switch between binaural, mono, and stereo sounds or a change to binaural sound (such as pausing binaural sound, muting binaural sound, selecting an object to localize sound, reducing or eliminating one or more cues or spatializations or localizations of binaural sound). For example, an analysis of historic events, personal information, geographic location, and/or the user profile provides a probability and/or likelihood that the user will take an action (such as whether the user prefers binaural sound or stereo, or mono sound for a particular location, a particular listening experience, or a particular communication with another person or an intelligent personal assistant). By way of example, one or more predictive models execute to predict the probability that a user would take, determine, or desire the action. The predictor also predicts future events unrelated to the actions of the user, for example, the prediction of the times, locations, SLP positions, type or quality of sound, sound source, or identities of incoming callers or requests for sound localizations to the user.

In order to save computational resources and expedite the playing of externalized sound, the SLS caches frequently played sound and convolved sound that predictive algorithms indicate will be requested to play again at a same or near same coordinate. For example, the SLS plays a fifteen second sound (e.g., an auditory cue such as a ring tone indicating an incoming telepresence request) localized to a SLP-1, and retains the convolved sound in memory. Following the playing of the sound, the SLS scans the localization history log and tabulates the number of times that the sound has been played at the same SLP. The SLS finds that the number is greater than ten times in the preceding thirty days, which is the threshold for saving the convolved sound for predicted future playing. The reaching of the threshold triggers the SLS to store the convolved sound that is in the memory into a file storage location that enables retrieval for playing the sound in the event that the sound is again requested to play at the same object or SLP-1. Later, the SLP selector receives a request to localize the sound at the SLP-1. The SLP selector approves the SLP-1 for the localization and notifies the SLS. The SLS, prior to passing the sound and coordinates of SLP-1 to the convolver, scans a table of stored pre-convolved sound and finds a match for the requested sound and requested SLP-1. Finding the match, the SLS does not proceed to trigger the execution of convolving the sound to the coordinates of SLP-1. Instead, the SLS queries the table for the file location of the stored pre-convolved sound and triggers the playing of the stored sound file. By playing the stored file instead of executing convolution, the SLS conserves processing resources and affords more expedient convolution of other SLPs and other processing activities.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

As used herein, an "electronic call," "telephone call," or a "phone call" is a connection over a wired and/or wireless network between a calling person or user and a called person or user. Telephone calls can use landlines, mobile phones, satellite phones, HPEDs, computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, telepresence, etc.

As used herein, "empty space" is a location that is not occupied by a tangible object.

As used herein, "proximate" means near. For example, a sound that localizes proximate to a person occurs between one foot to six feet from the person or up to two meters from the person.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds or audio segments to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, a "user" or a "listener" can be a person (i.e., a human being), an intelligent personal assistant (IPA), a user agent (including an intelligent user agent and a machine learning agent), a process, a computer system, a server, a software program, hardware, an avatar, or an electronic device. A user or a listener can also have a name, such as Alice, Bob, Chip, Hal, and other names as described in some example embodiments. A "caller" or "party" can be a user.

As used herein, a "user agent" is software that acts on behalf of a user. User agents include, but are not limited to, one or more of intelligent user agents and/or intelligent electronic personal assistants (IPAs, software agents, and/or assistants that use learning, reasoning and/or artificial intelligence), multi-agent systems (plural agents that communicate with each other), mobile agents (e.g., agents that move execution to different processors), autonomous agents (e.g., agents that modify processes to achieve an objective), and distributed agents (e.g., agents that execute on physically distinct electronic devices).

As used herein, a "virtual microphone point" or "VMP" is a virtual location or virtual position where sound is captured, recorded, or monitored.

Example embodiments herein can take place in physical spaces, in computer rendered spaces (such as computer games or VR), in partially computer rendered spaces (AR), and in combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS or portions of the SLS include an integrated circuit FPGA that is specifically customized, designed, configured, or wired to execute one or more blocks discussed herein. For example, the FPGA includes one or more programmable logic blocks that are wired together or configured to execute combinational functions for the SLS, such as assigning types of sound to SLPs and/or objects, assigning software applications to SLPs and/or objects, selecting a SLP and/or object for sound to externally localize as binaural sound to the user.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS).

Consider an example in which the SLS, portions of the SLS, the SLP selector, and/or the object selector include one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED includes a customized or dedicated DSP that executes one or more blocks discussed herein. Such a DSP has a better power performance or power efficiency compared to a general-purpose microprocessor and is more suitable for a HPED, such as a smartphone, due to power consumption constraints of the HPED. The DSP can also include a specialized hardware architecture, such as a special or specialized memory architecture to simultaneously fetch or pre-fetch multiple data and/or instructions concurrently to increase execution speed and sound processing efficiency. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which the DSP includes the SLP selector and/or the object selector. For example, the SLP selector, the object selector, and/or the DSP are integrated onto a single integrated circuit die or integrated onto multiple dies in a single chip package to expedite binaural sound processing. This example embodiment could also include the SLS.

Consider an example in which the DSP additionally includes the voice recognition system and/or acoustic fingerprint system. For example, the audio diarization system, acoustic fingerprint system, and a MFCC/GMM analyzer and/or the DSP are integrated onto a single integrated circuit die or integrated onto multiple dies in a single chip package to expedite binaural sound processing Consider another example in which HRTFs (or other transfer functions or impulse responses) are stored or cached in the DSP memory to expedite binaural sound processing.

Consider an example in which a smartphone or other HPED includes one or more dedicated sound DSPs (or dedicated DSPs for sound processing, image processing, and/or video processing). The DSPs execute instructions to convolve sound and display locations of the SLPs of the sound on a user interface of the HPED. Further, the DSPs simultaneously convolve multiple SLPs to a user. These SLPs can be moving with respect to the face of the user so the DSPs convolve multiple different sound signals and sources with HRTFs that are continually, continuously, or rapidly changing.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Tables and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:
   capturing, with one or more cameras in a head mounted display (HMD) worn on a head of a person, video of a physical environment where the person is located;
   displaying, with the HMD, the video of the physical environment where the person is located; and
   assisting the person in locating an object in the physical environment when the object is located outside a field-of-view (FOV) of the person wearing the HMD by playing a binaural sound that localizes to where the object is located in the physical environment outside the FOV.

2. The method of claim 1, wherein the object in the physical environment is a virtual object located outside the FOV of the person wearing the HMD.

3. The method of claim 1, wherein the object in the physical environment is a physical object located outside the FOV of the person wearing the HMD.

4. The method of claim 1 further comprising:
displaying, with the HMD, an augmented reality (AR) image of an intelligent personal assistant (IPA) in the video of the physical environment while the person wears the HMD in the physical environment and views the video of the physical environment; and
changing a size of the AR image of the IPA in the video being viewed by the person in response to detecting a direction of gaze of the person is at the IPA.

5. The method of claim 1 further comprising:
detecting, with one or more cameras or sensors in the HMD, a direction of gaze of the person looking at a virtual object being displayed in the video of the physical environment; and
playing, with speakers in the HMD, binaural sound that localizes to the virtual object being displayed in the video of the physical environment in response to detecting the direction of gaze of the person is looking at the virtual object being displayed in the video of the physical environment.

6. The method of claim 1 further comprising:
detecting, with one or more cameras or sensors in the HMD, a direction of gaze of the person looking at a virtual object being displayed in the video of the physical environment; and
changing a size of the virtual object being displayed and playing a sound that originates from the virtual object being displayed in response to detecting the direction of gaze of the person is looking at the virtual object being displayed in the video of the physical environment.

7. The method of claim 1 further comprising:
displaying, with the HMD, an augmented reality (AR) image of an intelligent personal assistant (IPA) in the video of the physical environment while the person wears the HMD in the physical environment and views the video of the physical environment; and
playing, with speakers in the HMD, a binaural sound that originates from the IPA in the video being viewed by the person in response to detecting a direction of gaze of the person is at the IPA.

8. The method of claim 1 further comprising:
detecting, with one or more cameras or sensors in the HMD, a direction of gaze of the person looking at a physical object in the video of the physical environment; and
playing, with speakers in the HMD, binaural sound that originates from the physical object in the video of the physical environment in response to detecting the direction of gaze of the person is looking at the physical object.

9. A method comprising:
capturing, with cameras in a head mounted display (HMD) worn on a head of a person, video of a room where the person is located;
displaying, with the HMD, one of the video of the room where the person is located;
detecting, with one or more cameras or sensors in the HMD, a direction of gaze of the person looking at an object being displayed in the video of the room; and
playing, with speakers in the HMD, binaural sound that localizes to the object being displayed in the video of the room in response to detecting the direction of gaze of the person is looking at the object being displayed in the video of the room.

10. The method of claim 9 further comprising:
displaying, in the video of the room, an intelligent personal assistant (IPA); and
changing a size of the IPA being displayed in the video of the room in response to the HMD detecting the direction of gaze of the person is looking at the IPA.

11. The method of claim 9 further comprising:
displaying, in the video of the room, an intelligent personal assistant (IPA); and
changing a color of the IPA being displayed in the video of the room in response to the HMD detecting the direction of gaze of the person is looking at the IPA.

12. The method of claim 9 further comprising:
displaying, in the video of the room, an intelligent personal assistant (IPA); and
blinking the IPA being displayed in the video of the room in response to the HMD detecting the direction of gaze of the person is looking at the IPA.

13. The method of claim 9 further comprising:
assisting the person in locating the object in the room when the object is located outside a field-of-view (FOV) of the person wearing the HMD by playing sound that localizes to where the object is located in the room outside the FOV.

14. The method of claim 9 further comprising:
highlighting the object being displayed in the video of the room in response to detecting the direction of gaze of the person is looking at the object being displayed in the room.

15. A head mounted display (HMD) worn on a head of a person, the HMD comprising:
one or more cameras that capture video of a physical environment where the person is located and wearing the HMD on the head;
a display that displays different environments that include the video of the physical environment and a virtual environment; and
one or more cameras that capture a direction of gaze of the person looking at a virtual object displayed in the video of the physical environment,
wherein the display highlights the virtual object displayed in the video of the physical environment in response to the direction of gaze of the person being at the virtual object and plays binaural sound that originates from the virtual object in response to the direction of gaze of the person being at the virtual object.

16. The HMD of claim 15, wherein the HMD assists the person in locating the virtual object when the virtual object is located outside the field-of-view (FOV) of the person by playing the binaural sound that originates from the virtual object that is located outside the FOV.

17. The HMD of claim 15 further comprising:
speakers that play a voice in binaural sound that originates from an augmented reality (AR) image of an intelligent personal assistant (IPA) being displayed in the video of the physical environment,
wherein the speakers automatically play the voice in the binaural sound that originates from the AR image of the IPA in response to the direction of gaze of the person looking at the AR image of the IPA.

18. The HMD of claim 15 further comprising:
speakers that play, during a telephone call with a second person, binaural sound that originates from a virtual object of the second person being displayed in the video of the physical environment,
wherein the HMD assists, during the telephone call, the person in locating the virtual object of the second person in the video of the physical environment when the virtual object of the second person is outside a field-of-view (FOV) of the person by playing, with the speakers, a voice of the virtual object of the second person in the binaural sound that originates where the virtual object of the second person is located outside the FOV.

\* \* \* \* \*